(12) United States Patent
Nimmo

(10) Patent No.: US 12,143,750 B2
(45) Date of Patent: *Nov. 12, 2024

(54) CAMERA POSITIONING DEVICE FOR EYE-TO-EYE ALIGNMENT IN VIDEO CONFERENCE APPLICATIONS

(71) Applicant: CAMBOX INC., Sheridan, WY (US)

(72) Inventor: Stacy Nimmo, Sausalito, CA (US)

(73) Assignee: CAMBOX INC., Sheridan, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,399

(22) Filed: Feb. 10, 2024

(65) Prior Publication Data

US 2024/0187550 A1  Jun. 6, 2024

Related U.S. Application Data

(63) Continuation of application No. 17/804,556, filed on May 28, 2022, now Pat. No. 11,910,127, which is a continuation of application No. 17/412,163, filed on Aug. 25, 2021, now Pat. No. 11,381,776.

(60) Provisional application No. 63/071,256, filed on Aug. 27, 2020.

(51) Int. Cl.
  *G03B 17/56* (2021.01)
  *F16M 13/02* (2006.01)
  *H04N 7/14* (2006.01)
  *H04N 23/50* (2023.01)

(52) U.S. Cl.
  CPC .......... *H04N 7/144* (2013.01); *F16M 13/022* (2013.01); *G03B 17/561* (2013.01); *H04N 23/50* (2023.01)

(58) Field of Classification Search
  USPC ........................................................ 348/373
  See application file for complete search history.

(56) References Cited

U.S. PATENT DOCUMENTS

| | | | |
|---|---|---|---|
| 6,798,457 B2* | 9/2004 | Boyden ............... | H04N 7/144 348/373 |
| 7,126,627 B1* | 10/2006 | Lewis ................ | H04N 7/144 348/14.1 |
| 8,054,378 B2* | 11/2011 | Kao .................. | G06F 1/1607 396/419 |
| 8,670,019 B2* | 3/2014 | Byers ................ | H04N 7/144 348/14.01 |
| 8,754,923 B2* | 6/2014 | Chong ............... | G03B 17/56 348/14.01 |

(Continued)

OTHER PUBLICATIONS

David M. Grayson, Andrew F. Monk, "Are you looking at me? Eye contact and desktop video conferencing", ACM Transactions on Computer-Human Interaction, Sep. 2003.

(Continued)

*Primary Examiner* — Clayton E. LaBalle
*Assistant Examiner* — Warren K Fenwick
(74) *Attorney, Agent, or Firm* — Adam Hipp

(57) ABSTRACT

A camera positioning device for eye-to-eye alignment in video conference applications is provided. The device can include a camera, a cord going from the camera to a computer, and a positioning component (e.g., a bracket) that connects the camera to the computer. The bracket allows manual adjustment of the cord attached to the camera to maintain vertical and horizontal positioning and rotational stability of a camera for improved eye-to-eye alignment in video conference applications.

19 Claims, 15 Drawing Sheets

(56) References Cited

U.S. PATENT DOCUMENTS

| | | | |
|---|---|---|---|
| 8,754,927 B2* | 6/2014 | Fritsch | H04N 7/144 |
| | | | 348/14.08 |
| 8,823,769 B2 | 9/2014 | Sekine | |
| 8,941,715 B1* | 1/2015 | McNelley | H04N 7/15 |
| | | | 348/14.16 |
| 9,270,933 B1* | 2/2016 | Jiang | H04N 23/61 |
| 9,485,414 B2* | 11/2016 | Visosky | H04N 23/50 |
| 9,658,517 B2* | 5/2017 | McElderry | F16M 11/2021 |
| 9,743,040 B1* | 8/2017 | Newstadt | H04N 7/15 |
| 11,174,985 B1* | 11/2021 | Koulopoulos | G06F 1/1607 |
| 11,381,776 B2* | 7/2022 | Nimmo | F16M 11/22 |
| 11,910,127 B2* | 2/2024 | Nimmo | G03B 13/36 |
| 2003/0112325 A1* | 6/2003 | Boyden | H04N 7/144 |
| | | | 348/E7.08 |
| 2006/0077286 A1 | 4/2006 | Wenderski | |
| 2008/0088696 A1* | 4/2008 | Giraldo | H04N 7/144 |
| | | | 348/E7.083 |
| 2012/0257004 A1 | 10/2012 | Smith et al. | |
| 2018/0098036 A1* | 4/2018 | Cassini | H04N 7/152 |
| 2019/0320136 A1* | 10/2019 | Visosky | H04N 23/50 |
| 2021/0006751 A1* | 1/2021 | Visosky | G06V 40/171 |

OTHER PUBLICATIONS

Franc Solina, Robert Ravnik, "Fixing Missing Eye-Contact in Video Conferencing Systems", Proceedings of the ITI 2011 33rd Int. Conf. on Information Technology Interfaces, Jun. 27-30, 2011.

Notice of Allowance, "Notice of Allowance dated Oct. 12, 2023," U.S. Appl. No. 17/804,556, 5 Pages.

Notice of Allowance, "Notice of Allowance dated Apr. 19, 2022," U.S. Appl. No. 17/412,163, 5 Pages.

Roel Vertegaal, Ivo Weevers, Changuk Sohn, Chris Cheung, "Gaze-2: conveying eye contact in group video conferencing using eye-controlled camera direction Share on", CHI '03: Proceedings of the SIGCHI Conference on Human Factors in Computing Systems, Apr. 2003.

* cited by examiner

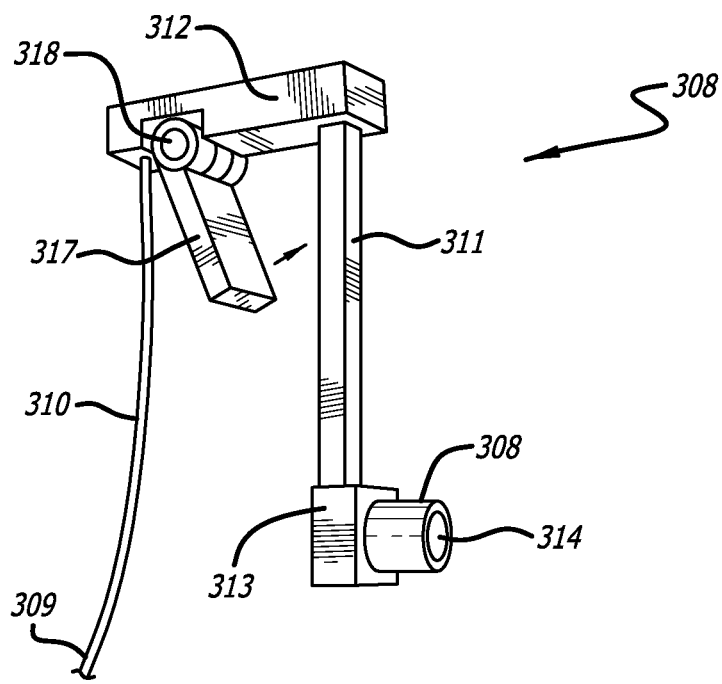
FIG. 3A
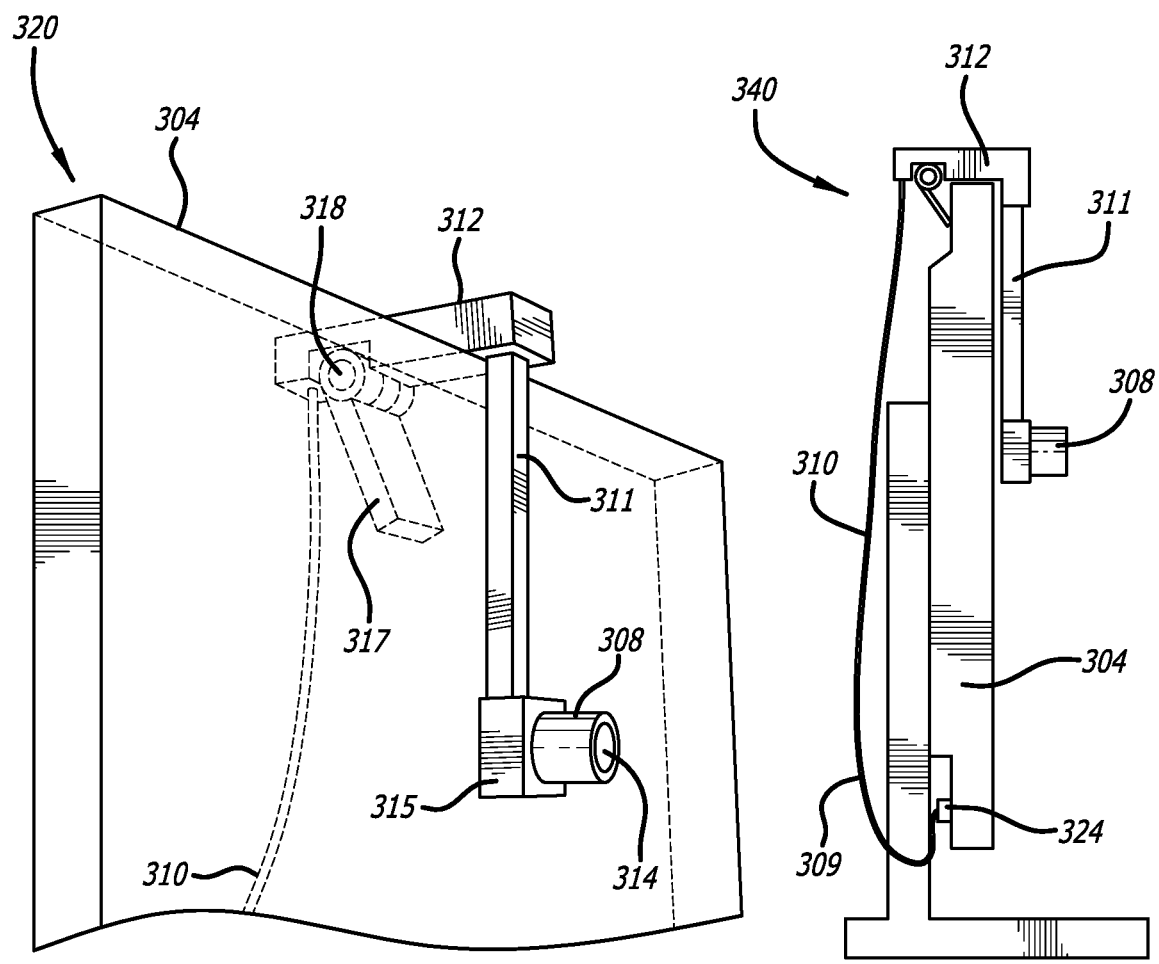
FIG. 3B
FIG. 3C

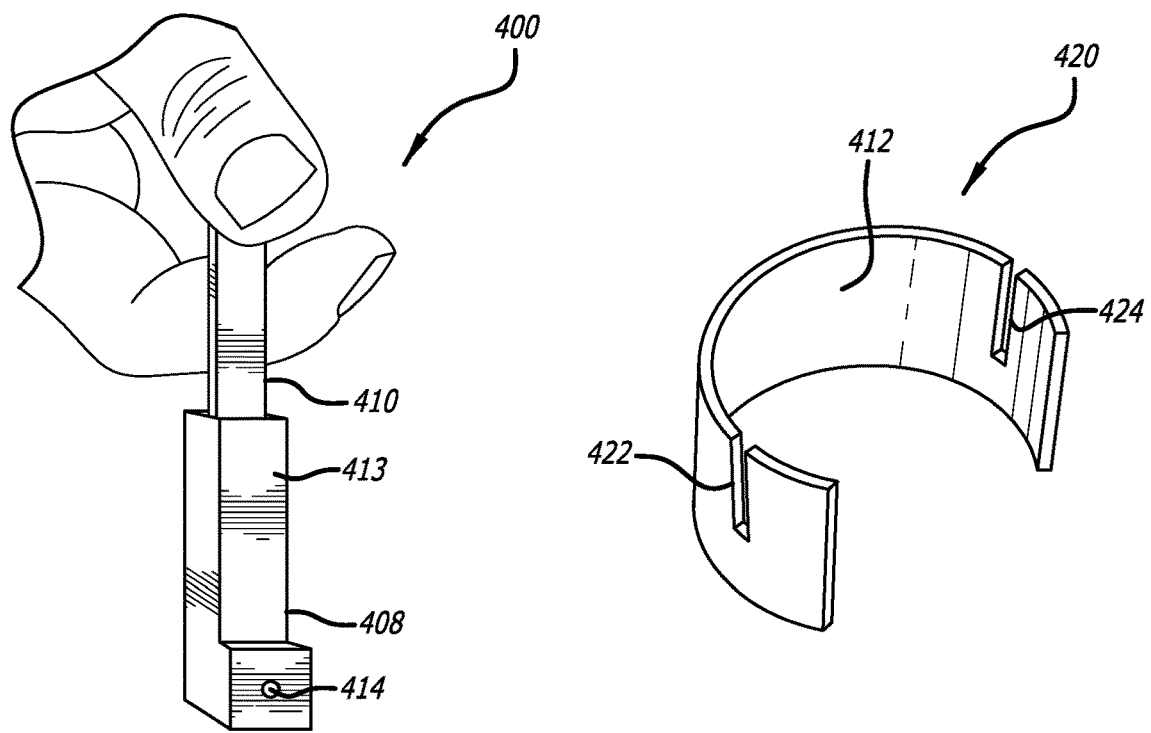
FIG. 4A
FIG. 4B
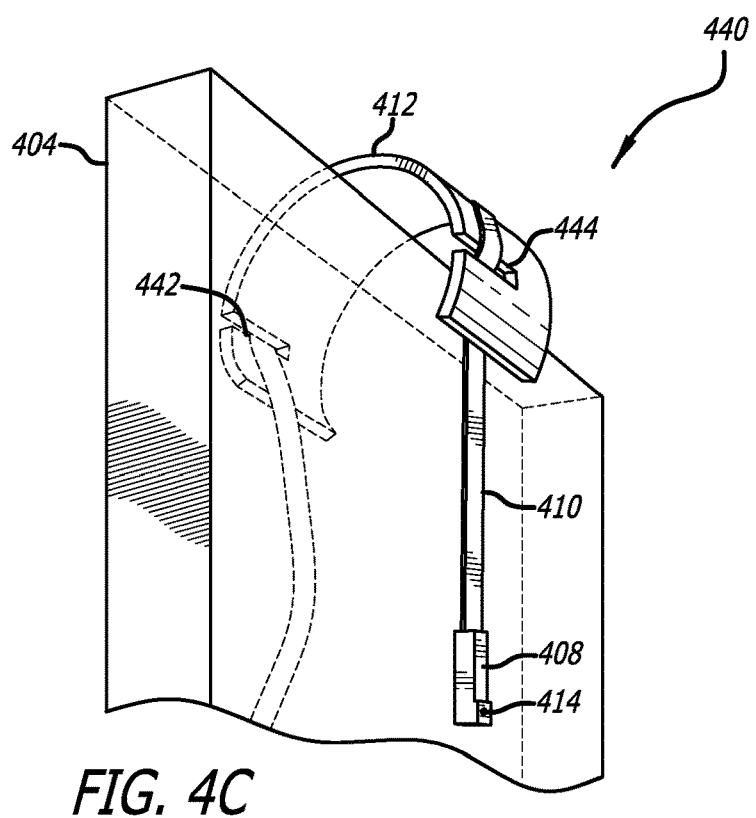
FIG. 4C

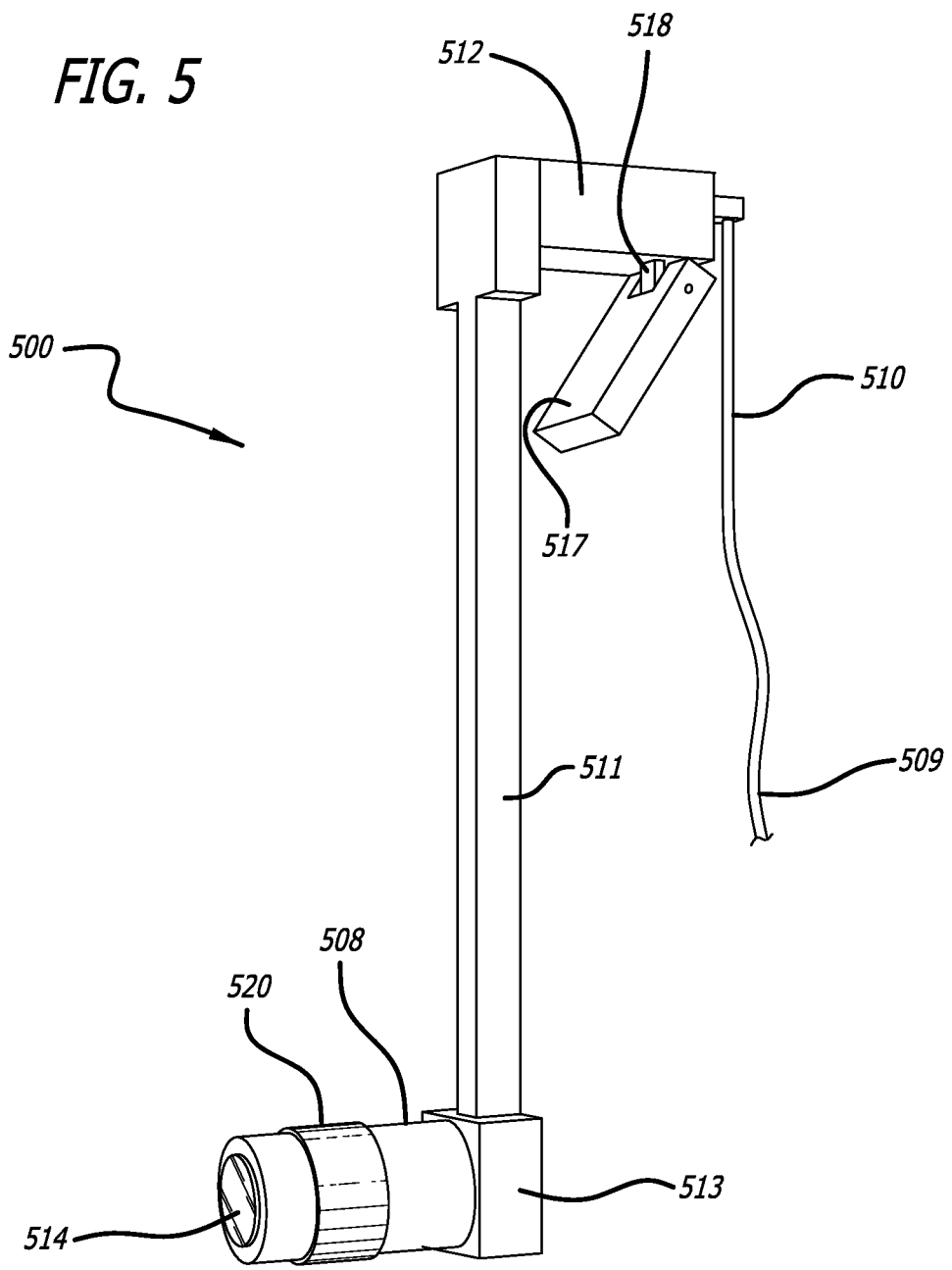

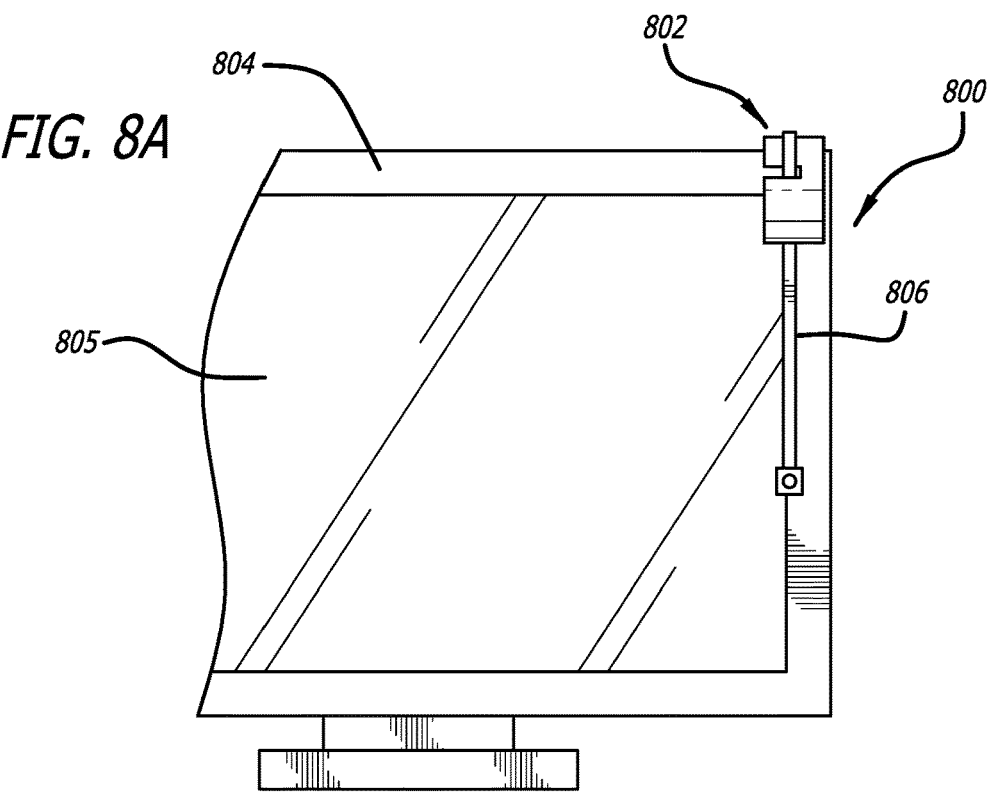
FIG. 8A
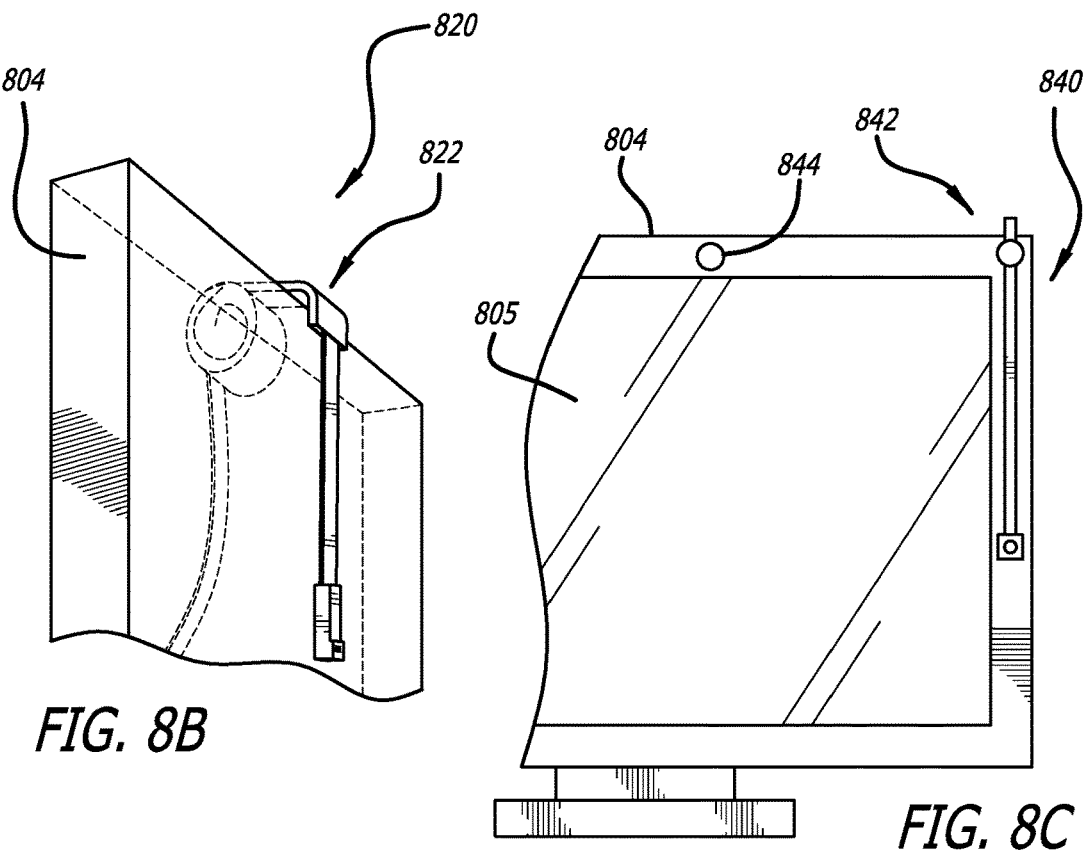
FIG. 8B
FIG. 8C

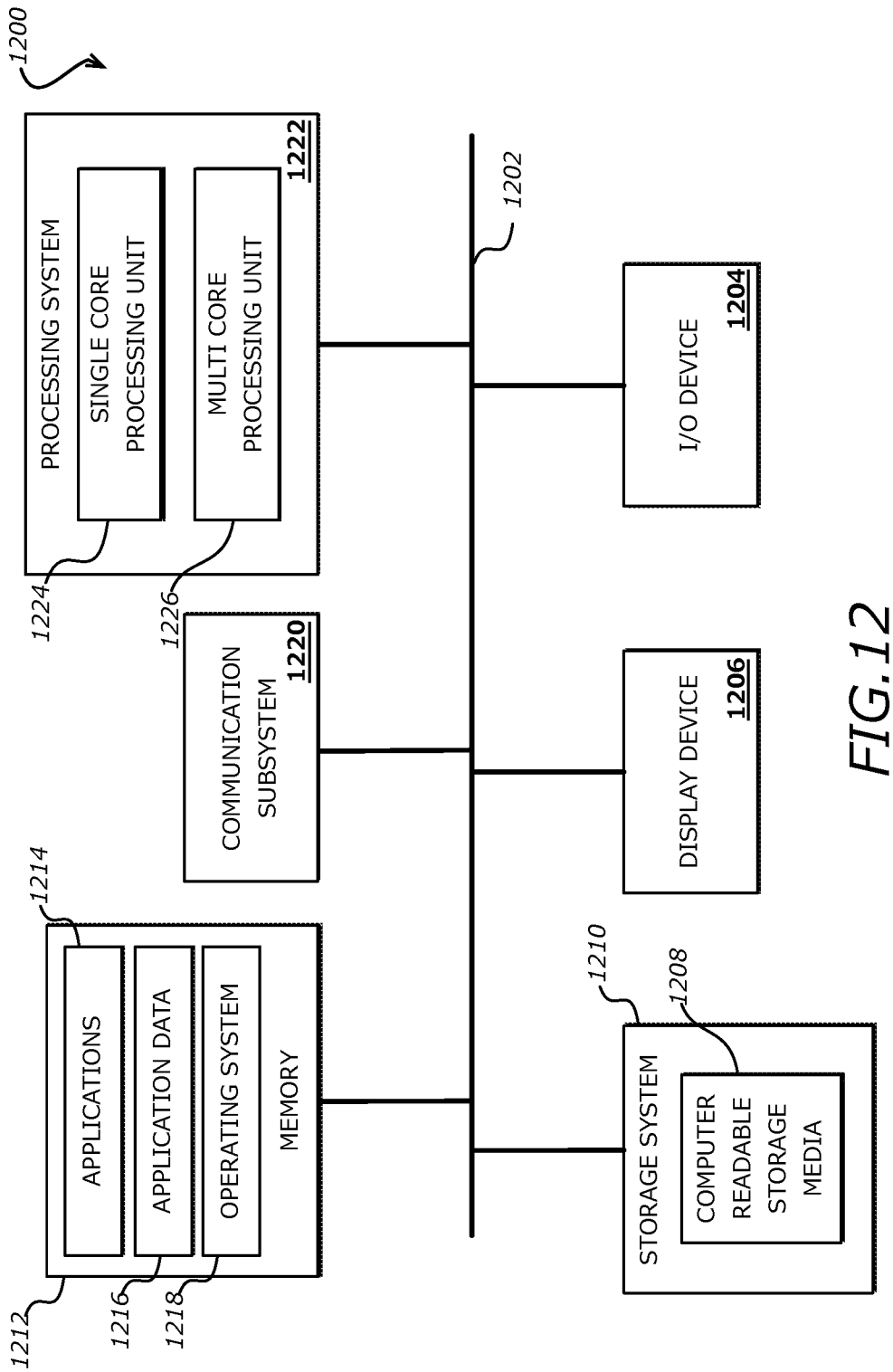

CAMERA POSITIONING DEVICE FOR EYE-TO-EYE ALIGNMENT IN VIDEO CONFERENCE APPLICATIONS

CROSS-REFERENCE TO RELATED APPLICATIONS

This application is a continuation of U.S. application Ser. No. 17/804,556, entitled "CAMERA POSITIONING DEVICE FOR EYE-TO-EYE ALIGNMENT IN VIDEO CONFERENCE APPLICATIONS", filed May 28, 2022, which is a continuation of U.S. application Ser. No. 17/412,163, entitled "CAMERA POSITIONING DEVICE FOR EYE-TO-EYE ALIGNMENT IN VIDEO CONFERENCE APPLICATIONS", filed Aug. 25, 2021, now issued as U.S. Pat. No. 11,381,776, which claims priority to U.S. Provisional Application No. 63/071,256, filed Aug. 27, 2020, and entitled "CAMERA POSITIONING DEVICE FOR EYE-TO-EYE ALIGNMENT IN VIDEO CONFERENCE APPLICATIONS", which the full disclosure of these applications is incorporated herein by reference for all purposes.

BACKGROUND

As video communication between people increases, there is a corresponding increase in the need to interact with one another from separate locations efficiently. For example, it is common for computer devices to have a camera positioned at the top or side of the device for video communication. While this may allow for flexibility for manufacturers in camera placement, the camera and image of the video participant are typically in separate locations, making it difficult and, at times, impossible to establish eye contact. This offset can create the illusion that video participants are looking away from one another. This lack of eye contact can affect the subliminal psychological cues associated with in-person (e.g., face-to-face) conversations. In contrast, in natural face-to-face conversations, meaningful connections are made between people because consistent eye contact is established.

For example, to establish eye contact using conventional cameras and camera placement, a user must constantly alternate between looking up to the camera and down at the screen with the image of the other video participant. Constantly moving the user's eyes up and down for a duration of a video conference can cause eye fatigue, as well as causing the user to miss non-verbal cues of other video participants. As non-verbal cues can make up 90% of human communication, can occur in split seconds, and can be subtle, overlooking even the slightest change in body language of other video participants can lead to miscommunication between the video participants. Throughout the duration of a video communication, a user may alternate between looking up at the camera and down at the screen (displaying the other video participant's image) several times. Looking up and down from the camera to the screen causes the eye contact to be inconsistent, which is disruptive to the communication. For example, each time the user glances at the camera, he is likely to miss at least one non-verbal cue exhibited by the other video participant on the display screen. Thus, by the end of a video communication, the user may have missed multiple non-verbal cues, resulting in a cascade of miscommunications. As such, video conferencing can feel unnatural, possibly causing a breakdown in communication and/or a loss of rapport between video participants, which may limit video communication. Accordingly, it is desirable to improve video communication.

BRIEF DESCRIPTION OF THE DRAWINGS

Various embodiments or examples ("examples") of the invention are disclosed in the following detailed description and the accompanying drawings:

FIGS. 3A, 3B, and 3C illustrate example components of a camera positioning system in accordance with various embodiments;

FIGS. 4A, 4B, 4C, 4D, 4E, and 4F illustrate another example components of a camera positioning system in accordance with various embodiments;

FIG. 5 illustrates an example camera of a camera positioning system in accordance with various embodiments;

FIGS. 8A, 8B, and 8C illustrate examples of stowing a camera positioning system in accordance with various embodiments;

FIG. 12 illustrates example components that can be utilized in accordance with various embodiments described herein.

DETAILED DESCRIPTION

Figure 1A:
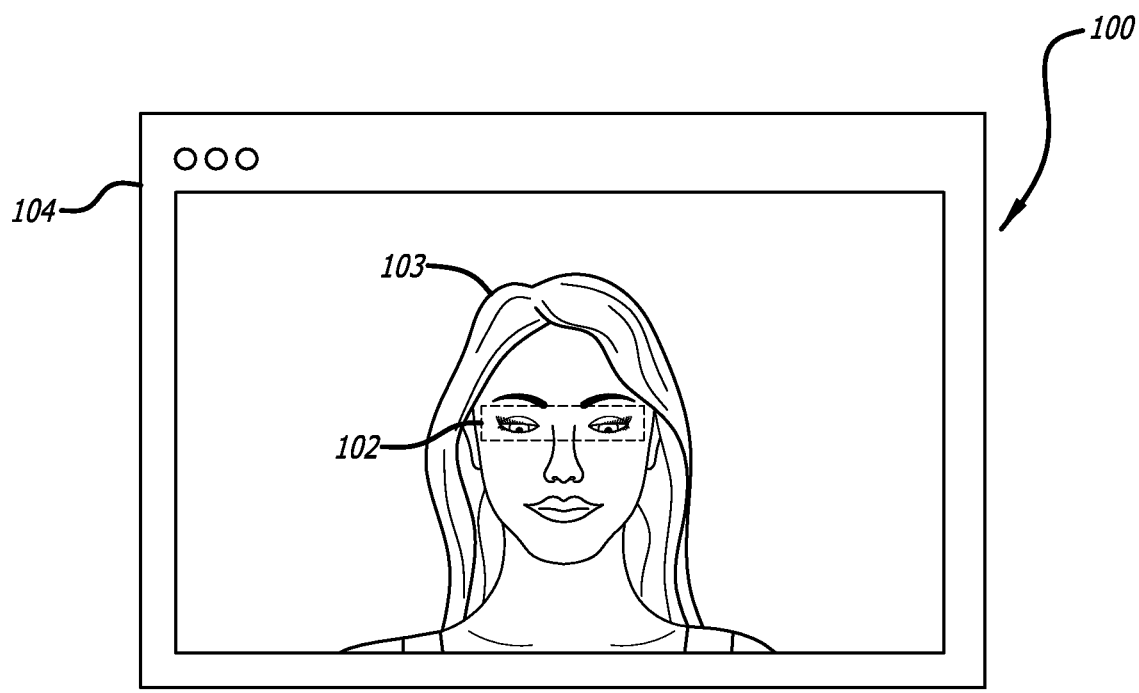
FIGS. 1A and 1B illustrate an example video conference in accordance with various embodiments.

Systems, devices, and methods in accordance with various embodiments of the present disclosure may overcome one or more of the aforementioned and other deficiencies experienced in conventional approaches to video conferencing. In particular, various embodiments describe a camera positioning system that facilitates eye-to-eye alignment for video conference applications. For example, a camera positioning device can include a camera, a cord (e.g., a flexible support member) going from the camera to a computer, and a positioning component (e.g., a bracket) that connects the camera to a display device (also referred to as display screen). The positioning component can allow for manual adjustment of the cord attached to the camera, which can be used to maintain vertical and horizontal positioning and rotational stability of the camera for improved eye-to-eye alignment during a video conference between participants. When the positioning component is coupled with the flexible support member and releasably engaged (e.g., mounted) to the display device, the combined weights of the positioning component and the flexible member exerted on the positioning component can provide a threshold amount of force as to securely maintain the positioning component in its position on the display device.

In an embodiment, a first participant aligns their camera lens with the eyes of the other party (e.g., the second participant) presented on a display screen. With the camera placed near an eye contact target (e.g., the eyes of the onscreen image of the second participant), the first participant and the second participant can simultaneously look at each other's face. Additional adjustments as needed can be performed manually or by relocating the onscreen image of the person the user is speaking with. The length of the cord may be adjusted to fit a variety of visual display sizes, with the excess cord being stowed behind the video display. The camera can be moved away from the display screen when not in use. In certain embodiments, the camera hardware (e.g., image sensor, image processing component, etc.) may be separate from the lens and placed elsewhere on the cord, positioning component, or back behind the computer. The camera hardware may be used in combination with a retractable cord with a spring-loaded retraction on bracket or cord.

In one aspect, embodiments relate to an image capture device positioning system that includes a camera, a flexible support member operable to transmit at least one of power or data between a camera and a computing device, the flexible support member having a body portion, wherein a first end of the body portion includes the camera and a second end of the body portion includes connector components (e.g., video display connector) providing for releasable engagement between the flexible support member and one of the computing device or a component coupled to the computing device; and a positioning component providing releasable engagement with a portion of a display screen and operable to direct the second end of the flexible support member to one of the computing device or the component and the first end of the flexible support member to an operative region of the display screen.

In some embodiments, the positioning component is a bracket, the bracket operable to hang from a top portion of the display screen. In certain embodiments, the positioning component includes a bracket clip, wherein the clip is a spring-loaded hinge and the bracket clip is operable to releasably grip an edge of the display device. A flexible support member may be passed through a back end of a horizontal base (also referred to as a horizontal beam) of the bracket clip, through a front end of the horizontal base. A first end of the flexible support member can be attached to a camera and can hang over in front of the display device from the front end of the horizontal base. The first end of the flexible support member may be a rigid cord, or a flexible cord encased in a hollow rigid structure.

In some embodiments, the positioning component includes notches through which the flexible support member passes, wherein the flexible support member passes through a first notch on a back portion of the positioning component which directs the flexible support member over a top portion of the positioning component and through a second notch on a front portion of the positioning component, the flexible support member passing through the notches providing a threshold amount of force on the positioning component to maintain a secure position on the display screen.

In some embodiments, the system further includes connecting elements that form a recess and a key arrangement between the flexible support member and the positioning component, wherein a magnet is in one of the recess and the key and a material to which the magnet is attracted in the other of the recess and the key. In some embodiments, the system further includes one of a magnetic assist, a friction assist, or an adhesive assist to couple the positioning component to the flexible support member.

In some embodiments, the positioning component includes a repositionable adhesive material, the adhesive material being positioned on a back side of the camera and operable to temporally fix a position of the camera to the display screen.

In some embodiments, the positioning component is a clip operable to couple the flexible support member to the display device, the clip configured to couple to a portion of the display screen.

In some embodiments, the positioning component is a double hook operable to hook onto the display screen, and wherein the double hook includes a gap through with the flexible support member passes, and wherein the flexible support member passes through the gap to facilitate positioning of the camera at the operative region of the display screen. In certain embodiments, the system further includes a raised ridge extending upwardly near a top edge of the display screen, the raised ridge being releasably coupled to the display screen, wherein the positioning component includes one of a front flange hook or a back-flange hook extending transversely near a top edge, and wherein one of the front flange hook or the back-flange hook engages the raised ridge to support the positioning component.

In some embodiments, the system further includes a pin extending from a slider affixed to the flexible support member, wherein the positioning component includes a socket longitudinally defined through a top portion of the positioning component, and wherein the pin is inserted into the socket to support the flexible support member from the positioning component. The system may further include a friction assist to hold the pin and the socket together. In some embodiments, the pin further includes a rod-shaped element having at least one bend to locate the pin parallel to a longitudinal direction of the positioning component and displaced to one side of the positioning component.

In some embodiments, the flexible support member includes at least one bend in the body portion to locate the camera within the operative region of the display screen. The flexible support member may be substantially flat or may be associated with at least a flexibility or pliability property. In some embodiments, the first end of the body portion is hinged to allow radial articulation of a position of the camera.

In some embodiments, the system further includes a storage element hingedly dependent from one of a top edge or a bottom edge of a back portion of the positioning component, wherein the storage element is operable to stow at least a portion of the flexible support member. The storage element can allow for shortening a total length of the flexible support member.

In some embodiments, the system further includes a spring-loaded component configured to retract at least a portion of the flexible support member, the spring-loaded component being coupled to the positioning component.

In some embodiments, the system further includes a wireless transmitter positioned proximate to the second end to receive the data captured by the camera and transmit the data, wherein the data includes one of image data or audio data.

Various other functions and advantages are described and suggested below as may be provided in accordance with the various embodiments.

FIG. 1A illustrates an example 100 video communication in accordance with various embodiments. In the example, a first user 103 (e.g., remote user) is a participant in a video communication (also referred to as video conference) with a second user (e.g., a local user or the second video communication participant, not shown) using a conventional video communication setup, such as one in which a camera is positioned at the top or side of the display screen (not shown) of the first user 103. An onscreen image of the first user 103 is presented on display screen 104 of the second user (e.g., display screen 104 depicts the view of the video communication from the perspective of the second user). In a conventional camera set up, when the first user 103 naturally attempts to make eye contact with the second user, the first user's 103 eyes are directed to an eye contact target (e.g., the eyes of the onscreen image of the second user on the display screen of the first user 103), as opposed to the lens of the camera. Thus, the gaze of the first user 103 as seen from the second user appears to be downward, and is not aligned with that of the other video conference party. As such, there is misaligned eye contact 102, in which a first participant (e.g., first user 103) attempts to look at the eye contact target (e.g., displayed through a video conference application on the first participant's display screen) but fails to make eye-to-eye contact through the video conference application. Misaligned eye contact 102 can negatively impact the communication between first user 103 and the second user because it is unnatural and is contrast with in-person conversations, where eye-to-eye contact is aligned and consistent. Inconsistent eye contact can lead to a breakdown in communication. For example, when the eyes of first user 103 are pointed downward, her expression may be misinterpreted by the second user as a negative emotion, such as boredom, disdain, etc., which can lead to miscommunication.

In order to simulate eye-to-eye contact with conventional camera setups, first user 103 would need to move her eyes toward the lens of her camera, wherever the camera may be located (e.g., mounted on top of her display screen, affixed on the left or right side of her display screen, separately placed on a surface beside her display screen, etc.). To maintain eye contact while observing the nonverbal expressions of the second user, the first user 103 would also need to continually move her eyes back and forth between the camera lens and the eye contact target (e.g., eyes of the onscreen image of the second user), resulting in eye fatigue. Further, during the time periods in which the first user 103 is looking into the camera lens, and when she is moving her eyes away from the eye contact target and toward the lens, the first user 103 misses any nonverbal cues exhibited by the second user.

Figure 1B:
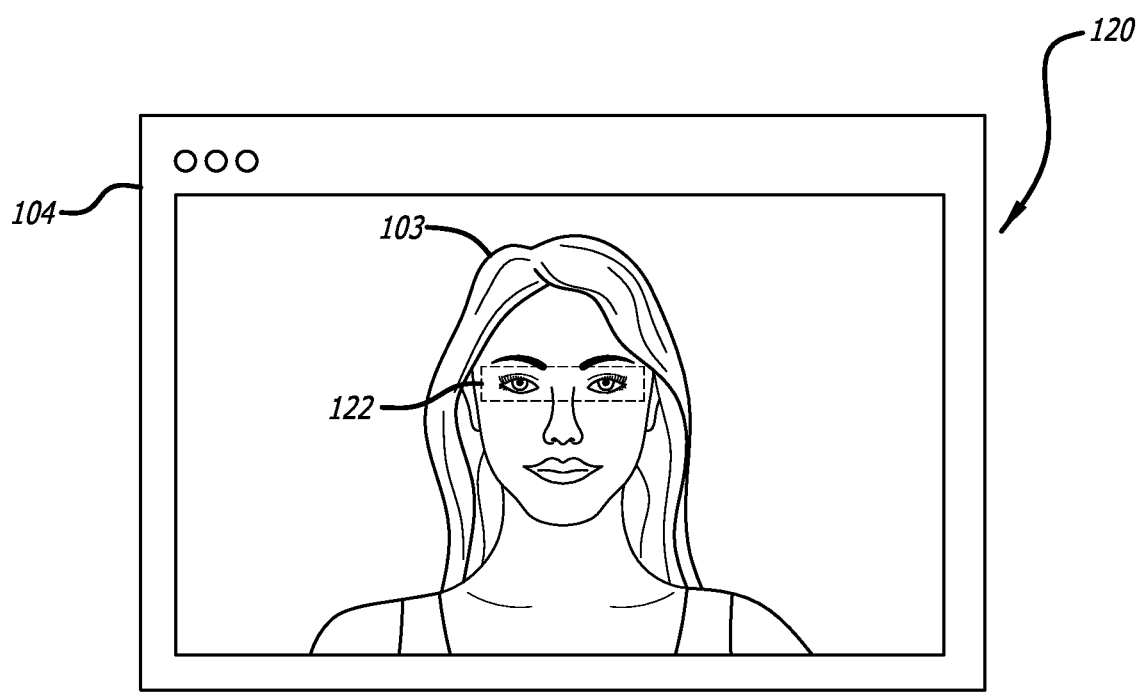

FIG. 1B illustrates another example 120 video communication in accordance with various embodiments. In this example, the first user 103 and the second user (not shown) participate in a video communication, wherein the camera may be positioned over the display screen (not shown) of the first user 103, near the eye contact target (e.g., eyes of the onscreen image of the second user, not shown). When the first user 103 looks at the eye contact target, the gaze of the first user 103 naturally falls within the field of view of the camera lens, resulting in the onscreen image of the first user 103 (e.g., as presented on the display screen 104 of the second user) to appear to be gazing directly forward toward the second user (e.g., as opposed to downward, to the side, etc.), therefore establishing eye-to-eye alignment 122. The camera position may be adjusted to accommodate changes in the position of the eye contact target. For example, if the second user raises his chair to sit at a higher position, the onscreen image of his face and body will appear higher on the display screen of the first user 103, and his eyes (e.g., the eye contact target) will also move higher along the display screen of the first user 103. To maintain eye contact, the camera may be raised to be repositioned near the new location of the eye contact target, such that when first user 103 shifts her gaze to the new location of the eye contact target, eye-to-eye alignment 122 is maintained despite changes in the second user's position on the display screen of the first user 103. In another embodiment, the position of the camera on the display screen of the first user 103 can follow the eye contact target. For example, the image capture device positioning system can determine whether the camera is within a predetermined distance from the eye contact target. If the camera becomes out of range (e.g., the eye contact target has shifted to a new location on the display screen, and beyond the predetermined distance from the camera), the camera may be moved to be within the predetermined distance of the new location of the eye contact target.

Likewise, if the first user 103 changes her position, for example, by shifting to her left, her gaze will still remain on the eye contact target. Therefore, as viewed by the second user, display screen 104 will display the first user 103 as having shifted to her left, yet maintaining the eye-to-eye alignment 122 (e.g., first user 103 will appear as if she is gazing directly at the second user, but from an angle). With eye-to-eye alignment 122, the first user 103 and the second user can establish eye-to-eye contact and engage in improved and more natural video communication through the video conference application.

Figure 2A:
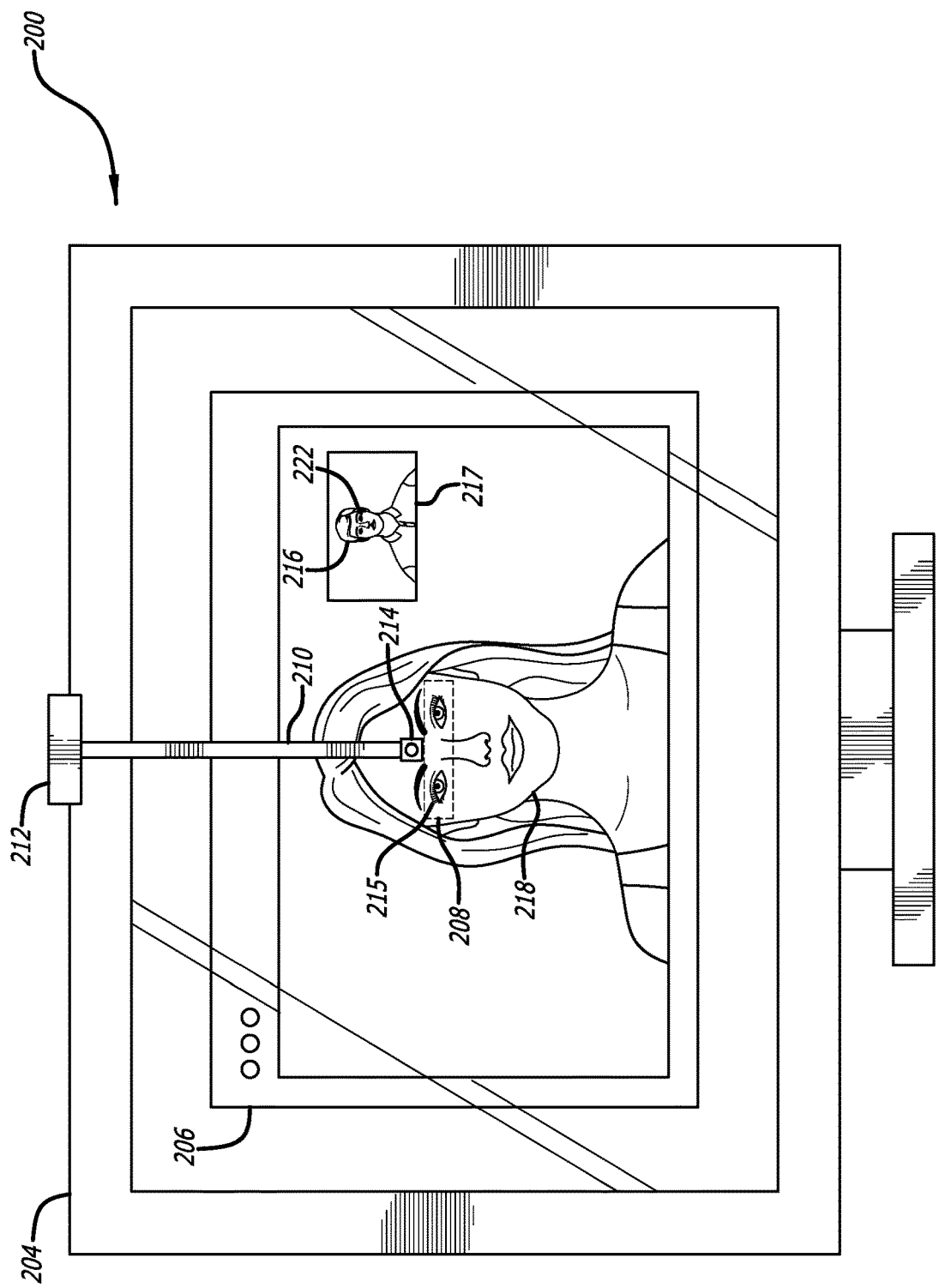
FIGS. 2A and 2B illustrate example views of a camera positioning system in accordance with various embodiments.
Figure 2B:
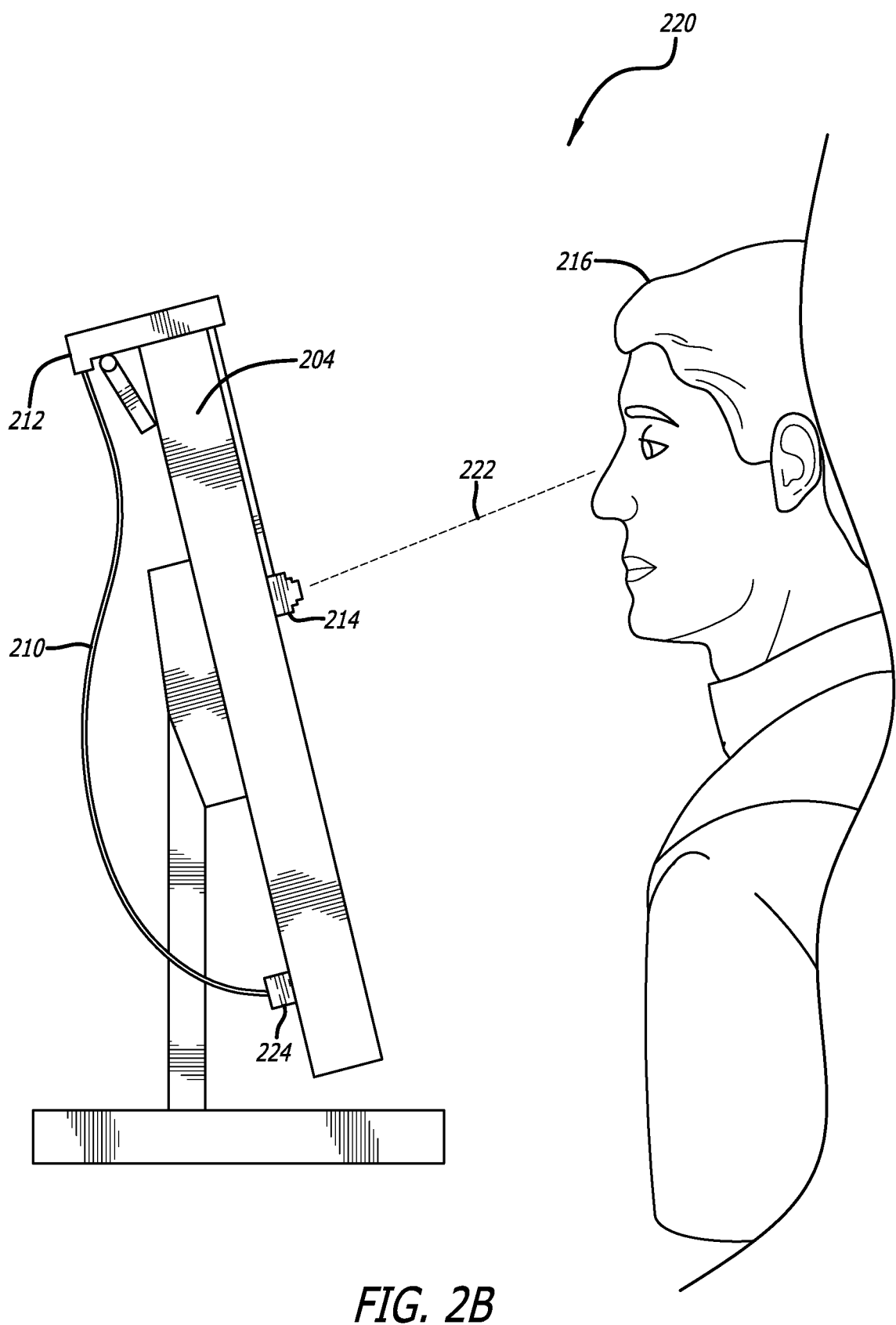

FIG. 2A illustrates an example front view 200 of a camera positioning system in accordance with various embodiments. In the example, a first user 218 (e.g., a remote user) and a second user 216 (e.g., local user) participate in a video communication (also referred to as a video conference) through video conference application window 206. The display screen 204 shows a front view of the video conference application window 206 from the perspective of the second user 216 (e.g., the second user 216 is directly facing display screen 204, as shown in FIG. 2B). Although a desktop computer is shown as the display screen 204, it should be understood that any electronic computing device capable of receiving, determining, and/or processing input can be used in accordance with various embodiments discussed herein, where the device can include, for example, notebook computers, portable computing device (e.g., smart phone, tablet computer), among others. Video conference application window 206 includes an onscreen image of the first user 218 (e.g., from the perspective of the second user 216). A self-view image 217 of the second user 216 is reflected in a floating picture-in-picture window within the video conference application window 206. The self-view image 217 reflects how the onscreen image of the second user 216 is viewed through the video communication from the perspective of the first user 218.

In an embodiment, camera 214 may be attached to a cord 210, and cord 210 may be coupled with positioning component 212, on top of display screen 204. In this example, camera 214 is positioned over the display screen 204 and near the eye contact target 215 (e.g., the eyes of the onscreen image of the first user 218). When the second user 216 looks at the eye contact target 215, his eyes fall within the field of view of camera 214, resulting in the gaze 222 of the second user 216 to appear to be looking directly at the first user 218 (e.g., from the perspective of the first user 218, as reflected in self-view image 217) and establishing eye-to-eye alignment 208 (e.g., simulating eye-to-eye contact between the first user 218 and second user 216 within video conference application window 206). The position of camera 214 may be adjusted to stay within a particular distance of the eye contact target 215. For example, if the first user 218 raises her seat, her onscreen image will move higher in the video conference application window 206, causing her eyes (e.g., the eye contact target 215) move to a higher position on display screen 204 than camera 214. To maintain eye-to-eye alignment 208 when the second user moves his gaze 222 upward and over camera 214 to look at the eye contact target 215 at its new location, camera 214 may be moved upward to maintain the camera 214 within the predetermined distance from the eye contact target 215, such that the gaze of second user continues to be within the field of view of camera 214. Camera 214 may also be lowered or relocated left or right along display screen 204 to follow the eye contact target 215 if the eye contact target 215 shifts onscreen.

FIG. 2B illustrates an example side view 220 of the camera positioning system in accordance with various embodiments. In the example, the second user 216 (e.g., local user) participates in a video communication, and directs his gaze 222 at an eye contact target 215 (as shown in FIG. 2A), wherein camera 214 is positioned within a particular distance from the eye contact target 215 to such that the gaze 222 of the second user 216 falls within the field of view of the camera 214, establishing eye-to-eye contact between the first user 218 and the second user 216 within the video communication. Camera 214 is attached to and supported by cord 210. The cord 210 can be adjusted vertically across the display screen 204 to adjust the vertical position of the camera 214. For example, the position of camera 214 over the display screen 204 can be raised or lowered by pulling cord 210 up or down, respectively.

The cord 210 can be associated with a number of properties, including, for example, a flexibility or pliability property, a stiffness property, a firmness property, an extensibility property, a size or thinness property, etc. For example, cord 210 may be a rigid cord. In another example, cord 210 may be a flexible cord that is encased in or partially encased in a hollow rigid tube. As discussed herein, the cord 210 may be referred to as a flexible support member. The cord 210, as described herein, can include a body portion. A first end of the body portion can include the camera 214. A second end of the body portion can include a video display connector 224 providing for releasable engagement between the cord 224 (and further, the camera 214) and one of the computing device or a component coupled to the computing device, for example, display screen 204. The video display connector 224 connects the cord 210 with display screen 204 to allow for power, image data, and/or audio data to be transmitted between the camera 214 and display screen 204. The video display connector 224 may include a USB port, parallel port, HDMI, Ethernet, or any other way of passing image data between a cable and computing device.

In an embodiment, a positioning component 212 is coupled to the cord 210. The positioning component 212 can provide releasable engagement with a portion of a display screen 204 and configured to direct the second end (wherein the second end includes the video display connector 224) of the cord 210 to one of the computing device or the component (e.g., display screen 204) and the first end (e.g., wherein the first end includes camera 214) of the cord 210 to an operative region of the display screen 204. As shown in the example, positioning component 212 is a bracket clip seated on top of the display screen 204. The positioning component 212 is secured in its position on the display screen 204 through tensioning, wherein the combined weights of the positioning component 212 and the cord 210 (e.g., the cord 210 being coupled to the positioning component 212) provide a threshold amount of force on the positioning component 212 over the edge of the display screen 204 as to securely maintain the positioning component 212 on top of display screen 204. For example, if display screen 204 is tilted downward, upward, to the right or left, etc., the tensioning from the combined weights of the positioning component 212 and the cord 210 will hold positioning component 212 in place as to prevent the positioning component 212 from slipping off the display screen 204 (e.g., maintain positioning component 212 on top of the display screen 204). In another example, weights may be added to the positioning component 212, the first end of the cord 210, the second end of the cord 210, or a combination thereof, to balance the tensioning on the positioning component 212 and cord 210 and the center of gravity of the positioning component 212 and cord 210, so that the combined weights of the positioning component 212 and cord 210 do not cause the positioning component 212 to lean and fall forward or backward off the display screen 204.

Although a bracket clip is shown as the positioning component 212, the positioning component 212 can take the shape of any one of a number of components. For example, in another embodiment, positioning component 212 may be a bracket, wherein the bracket is coupled to the cord 210. The bracket can, for example, hang from a top portion of the display screen 204. In the example, the weight of the bracket combined with the weight of the cord 210 keeps the bracket provides a threshold amount of force on the bracket as to securely maintain the bracket on top of display screen 204. The bracket can be a u-bracket and can include notches through which the cord 210 passes. The cord 210 passes through a first notch on a back portion of the bracket, which directs the cord 210 over a top portion of the bracket and through a second notch on a front portion of the bracket. Passing the cord through the notches in this manner provides a threshold amount of force on positioning component 212 (e.g., the bracket) such that the force pressure exerted on positioning component 212 allows positioning component 212 to maintain a secure position on the display screen 204.

In another example, positioning component 212 may be a clip operable to couple the cord 210 to a display screen 204. The clip can be secured to the display screen 204 under the tensioning on the clip that results from the combined weights of the clip and cord 210 on the display device 204. In yet another example, positioning component 212 is a double hook operable to hook onto a display screen 204. In this example, the double hook includes a gap through which the cord passes, wherein the cord 210 passes through the gap to facilitate positioning of the camera 214 at an operative region of the display screen 204. The weight of the double hook combined with the weight of the cord 210 on the hook result in a tensioning on the double hook to keep the double hook in place on top of the display screen 204. In yet another example, positioning component 212 includes a raised ridge extending upwardly near a top edge of a display screen 204, the raised ridge being releasably coupled to the display screen 204. In this example, positioning component 212 includes one of a front flange hook or a back-flange hook extending transversely near a top edge. One of the front flange hook or the back-flange hook engages the raised ridge to support the positioning component 212. Cord 210 may be passed and hung through the front flange hook (or back-flange hook). The weight of the raised ridge and front flange hook (or back-flange hook) combined with the weight of the cord 210 provide a threshold amount of force on the raised ridge and front flange hook (or on the raised ridge and back-flanged hook) as to securely maintain the raised ridge and front flange hook (or on the raised ridge and back-flanged hook) on top of display screen 204.

In another embodiment, the positioning component 212 and cord 210 may be coupled with connector elements (not shown). The connecting elements can form, for example, a recess and a key arrangement between the cord 210 and the positioning component 212. A magnet can be positioned in one of the recess and the key and a material to which the magnet is attracted in the other of the recess and the key, thereby magnetically coupling the positioning component 212 and cord 210. In the example, when the cord 210 and positioning component 212 are magnetically coupled, the total weight of the cord 210 and positioning component 212 provides a threshold amount of force on the positioning component 212 as to securely maintain the positioning component 212 on top of the display screen 204. In another example, the connecting elements can form a recess and a key arrangement between the cord 210 and the positioning component 212, wherein the recess and the key arrangement can include interlocking elements and at least one element can be configured to release the interlocking elements. In this example, when the cord 210 and positioning component 212 are coupled via interlocking elements, the combined weights of the cord 210 and positioning component 212 exerts the threshold amount of force on the positioning component 212 to securely maintain the positioning component 212 on top of the display screen 204.

The positioning component 212 can allow the camera 214 to be positioned about various points over display screen 204 to fall within the gaze 222 of the second user 216, such that the eye contact target 215 is within the field of view of the camera 214 and eye-to-eye alignment 208 is established between the first user 218 and second user 216. In various embodiments, the positioning component 212 can be moved horizontally across the display screen 204 to adjust the horizontal position of the camera 214, for example, to bring the camera 214 within a specified distance of the eye contact target 215. Positioning component 212 may be disengaged from its current position on display screen 204, relocated to the right or left of its current position along the top edge of display screen 204, and releasably re-engaged with display screen 204 at its new position. For example, in the situation where positioning component 212 is a bracket clip (as shown in the example), the clip may be pulled back to release its grip on the top edge of display screen 204. When the bracket clip is relocated to the right or left of its previous position, the clip may be sprung forward to grip (e.g., releasably re-engage with) the edge of the display screen 204 at its new location. In another example, positioning component 212 may be slid, rolled, etc. along the top edge of display 204 to the right or left of its current position to move the camera 214 horizontally across the display screen 204.

As described above, the cord 210 can also be adjusted vertically across the display screen 204 to adjust the vertical position of the camera 214. For example, the position of camera 214 over the display screen 204 can be raised or lowered by pulling cord 210 up or down, respectively (e.g., by passing the cord 210 through the positioning component 212 to the back or front of display screen 204, respectively). When passing the cord 210 through positioning component 212, the positioning component 212 remains in place (e.g., positioning component 212 remains securely held in its current position on display screen 204, under the tensioning exerted on the positioning component 212 that results from the combined weights of the positioning component 212 and cord 210 exerted on the positioning component 212).

The positioning component 212 and cord 210 can allow for rotational stability of the camera 214. For example, tensioning on the positioning component 212, resulting from the combined weights of the positioning component 212 and cord 210 exerted on the positioning component 212, keeps the positioning component 212 securely positioned on display screen 204. In turn, because positioning component 212 is coupled to cord 210, the positioning component 212 securely maintains the position (e.g., rotational position, vertical, and/or horizontal position) of the cord 210 over the display screen 204. For example, the weight of the cord 210, the tensioning on the positioning component 212 coupled to the cord 210, or a combination thereof, can cause the cord 210 to hang taut over display screen 204, preventing the cord from twisting freely (e.g., about a vertical axis) and thereby keeping the camera 214 from tilting, leaning, rotating, etc., about an axis parallel to the cord 210 (e.g., camera 214 is restricted from rotating about the cord 210 to face away from the second user 216 and toward the display screen 204 or off to the side of display screen 204, and so forth).

FIG. 3A illustrates example 300 of components of a camera positioning system in accordance with various embodiments. In the example, a positioning component 312 is coupled to a cord 310. Positioning component 312 may be coupled to the cord 310 via a magnetic assist, friction assist, an adhesive assist, among others. In an embodiment, the cord is threaded into a back end of a horizontal base (also referred to as horizontal beam) of the positioning component 312 and through a front end of the horizontal base, wherein a front end of the cord can hang down from the front of the horizontal base and attach to a camera 308. The cord 310 can include a first end 311 (e.g., front end) and second end 309, wherein the first end 311 of the cord includes a camera 308, while the second end 309 provides for releasable engagement with a display screen (e.g., 304 as illustrated in FIG. 3B). The camera 308 may include a lens 314. The camera 308 may include in certain embodiments an image processor 313. The cord 310 allows for power to be transmitted from display screen 304 to camera 308, as well as image and/or audio data to be transmitted between the camera 308 and display screen 304. In an embodiment, the first end 311 of cord 310 can be rigid as to maintain the position of the first end 311 (and the position of the camera 308) against the display screen 304. For example, a rigid first end 311 can provide rotational stability to the camera 308, wherein the rigidity of the first end 311 prevents the first end 311 and the attached camera 308 from twisting or spinning freely (e.g., about a vertical axis). Securely maintaining camera 308 in a stable rotational position ensures that camera 308 remains positioned at a particular angle, such as transverse to and away from the face of the display screen 304 (e.g., camera lens 314 is angled directly toward a user, not shown, who is facing display screen 304 in a video communication), to allow lens 314 to continuously capture the gaze of the user within the field of view of the camera 308 throughout the video communication.

In another embodiment, the first end 311 of cord 310 can be a flexible cord encased in a rigid hollow structure that is attached to positioning component 312. In yet another embodiment, cord 310 may be substantially flat, as to maintain its position against the display screen 304. For example, when the first end 311 of a substantially flat cord 310 hangs taut from the positioning component 312, the tautness and the substantial flatness of the cord 310 prevents the first end 311 from twisting or spinning freely (e.g., about a vertical axis) against the display screen 304.

In an embodiment, positioning component 312 is a bracket clip that can be positioned on a top edge of the display screen 304, and includes clip 317 and a hinge 318. In an example, hinge 318 may be held in a closed position by a spring, such as a torsional spring. By default (e.g., when positioning component 312 is disengaged from the display screen 304), the bracket clip is in a closed position. For example, clip 317 can swing shut against (e.g., parallel to) the horizontal base portion of the positioning component 312 by rotating about the hinge 318 (e.g., toward the first end 311 of the cord 310) under the force of the spring within hinge 318. Pulling the clip 317 back (e.g., away from the first end 311 and toward the second end 309 of the cord 310) and resisting the spring will open the bracket clip and prepare the bracket clip to be engaged with (e.g., clip onto) the display screen 304.

FIG. 3B illustrates a perspective view 320 of the camera positioning system positioned on a top edge of display screen 304. In the example, a base portion of positioning component 312 is seated on the top edge of display screen 304, wherein the top edge of the display screen 304 is gripped between the first end 311 of the cord 310 and the clip 317 pressing against the back of the display screen 304 under the pressure of a spring within hinge 318. In an embodiment, the weight of the positioning component 312, combined with the weight of the cord 310 provide a threshold amount of force on positioning component 312 to securely maintain positioning component 312 in its position on the top edge of display screen 304. For example, the weight of positioning component 312 is exerted on the top edge of display screen 304, while the weight of the first end 311 of the cord 310 provides tension on the front end 311 of the positioning component 312 simultaneously while the weight of the second end 309 of the cord 310 provides tension on the back end of the positioning component 312, as to keep positioning component 312 in place on the top edge of the display screen 304. If the position of display screen 304 is adjusted (e.g., tilted downward, upward, left or right), the tensioning from the combined weights of the positioning component 312 and the cord 310 will hold positioning component 312 in place as to prevent the positioning component 312 from slipping off the display screen. The tensioning from the combined weights of the positioning component 312 and the cord 310 can also maintain the threshold amount of force on the positioning component 312 on top of the display screen 304 as to prevent disturbances to the stability of the positioning component 312 on the display screen when adjustments are made to the camera 308 (e.g., camera is lowered or raised vertically across the display screen 304, camera 308 is rotated right or left about a vertical axis, or positioning component 312 is slid to the right or left of the display screen 304 as to change the horizontal position of the camera 308 over the display screen 304, and so forth). In another example, weights may be added to the positioning component 312, the first end 311 of the cord 310, the second end 309 of the cord 310, or a combination thereof, to balance the tensioning on the positioning component 312 and cord 310 and the center of gravity of the positioning component 312 and cord 310, so that the combined weights of the positioning component 312 and cord 310 prevent the positioning component 312 from leaning and falling forward or backward off the display screen 304, or from sliding to the left or right if the top edge of the display screen 304 is not level.

In the example, the position of camera 308 can be adjusted vertically, horizontally, or a combination thereof, to capture the user's gaze at display screen 304, for example, if the user moves his gaze to follow the eye contact target (e.g., the eyes of the onscreen image of the other participant in the video communication) because the eye contact target has moved to a different location on display screen 304. For example, the first end 311 of cord 311 can be lowered (e.g., by pulling the first end 311 of the cord 310 downward across display screen 304, or by affixing additional cord segments to a rigid first end 311, sliding camera 308 and image processor 313 down along the rigid first end 311, etc.) to lower the camera 308, or the first end 311 can be raised (e.g., removing cord segments from a rigid first end 311, sliding the camera 308 and image processor 313 up along the rigid first end 311, etc.) to raise the camera 308. Positioning component 312 may be slid to the left or right across the top edge of display screen 304 to adjust the horizontal position of the camera 308. In another example, positioning component 312 may be disengaged (e.g., open clip 317 to release the grip of the bracket clip from the top edge of display screen 304) from its current position on display screen 304, and releasably re-engaged (e.g., close clip 317 so that the bracket clip can grip the top edge of display screen 304) the positioning component 312 with display screen 304 at a new position.

In another embodiment, the cord 310 may include a hinge to allow radial articulation of the position of camera 308. For example, cord 310 may include a plurality of cord segments. In an embodiment, a cord segment may correspond to different sections of cord 310. The cord segments can be of different lengths. For example, cord segments proximate to the camera 308 end of the cord 310 (e.g., cord segments along the first end 311) may be shorter in length than cord segments near a middle portion of cord 310. In another example, a cord segment can couple with camera 308. In certain embodiments, camera 308 and image processor 313 can be part of the cord segment. The cord segments can be associated with one or more features. For example, a cord segment may include a hinge to bend (e.g., pivot) with respect to adjacent cord segments. The hinge allows a cord segment hanging below the hinge (e.g., a cord segment between the hinge and camera 308) to pivot about the hinge (e.g., about an axis parallel to a longitudinal direction of positioning component 312). The position of camera 308 can be radially articulated about the hinge as desired by the user. For example, camera 308 can be swung by the cord segment (e.g., about an axis through the hinge and transverse to the face of display screen 304) radially across the face of display screen 304.

FIG. 3C illustrates a side view 340 of the camera positioning system positioned on a top edge of display screen 304. In the example, video display connector 324 at the second end 309 of the cord 310 provides for releasable engagement between the cord 310 (and further, the camera 308 and image processor 313) and one of a computing device or a component coupled to the computing device, for example, display screen 304. The video display connector 324 connects the cord 310 with display screen 304. Cord 310 allows for power to be transmitted from display screen 304 to camera 308, as well as image and/or audio data to be transmitted between the camera 308 and display screen 304. The video display connector 324 may include a USB port, parallel port, HDMI, Ethernet, or any other way of passing image data between a cable and computing device.

In the example, positioning component 312 is securely maintained in its position on the top edge of display screen 304 through tensioning (e.g., the combined weights of the positioning component 312 and the cord 310 provide a threshold amount of force on the positioning component 312 on top of display screen 304), wherein display screen 304 is perpendicular to a level horizontal plane. In an embodiment, an equal amount of force can be exerted on the front end of positioning component 312 (e.g., resulting from the weight of the first end 311 of cord 310 hanging down from positioning component 312 in front of display screen 304) as on the back end of positioning component 312 (e.g., resulting from the weight of the second end 309 of cord 310 hanging down from positioning component 312 behind display screen 304), to securely maintain positioning component 312 in its position on top of display screen 304. When display screen 304 is tilted (e.g., tilted upward or downward, or side to side), the equal tensioning on the front and back ends of positioning component 312 keeps positioning component 312 stable (e.g., prevents positioning component 312 from falling off display screen 304).

FIG. 4A illustrates an example 400 camera component in a camera positioning system in accordance with various embodiments. In the example, camera 408 is attached to cord 410. The camera 408 may be positioned over a display device (also referred to as a display screen, such as display device 404 as shown in FIG. 4C) and include a lens 414 to capture the gaze of a first user (e.g., a local user) looking at an eye contact target (e.g., eyes of an onscreen image of a second user, such as a remote user, in a video communication) displayed on the display device 404. The camera 408 may include, in certain embodiments, an image processor 413 to process image data of the user facing display device 404 and communicating through the video communication, for example, image processor 413 processes and transmits to the second user (e.g., via a video communication application) image data of the first user communicating and establishing eye contact with the second user.

The cord 410 can be associated with a number of properties, such as a flexibility or pliability property, a stiffness property, a firmness property, an extensibility property, a size or thinness property, a flatness property, and so forth. In certain embodiments, the cord 410 may be substantially flat, as to maintain its position, and the position of the camera 408, against the display screen 304. For example, the flatness of cord 410 can prevent the cord 410 and the attached camera 408 from twisting or spinning freely (e.g., about a vertical axis, diverting focus of the lens 414 away from the user's gaze). In another embodiment, the housing of the camera 408 may be associated with at least one or more features. For example, camera 408 may have substantially flat edges (e.g., the back of camera 408 may be substantially flat) as to maintain its position (e.g., rotational position) against display device 404.

In another embodiment, the cord 410 may include a hinge to allow radial articulation of the position of camera 408. For example, cord 410 may include a plurality of cord segments. In an embodiment, a cord segment may correspond to different sections of cord 410. The cord segments can be of different lengths. For example, cord segments proximate to the camera 408 end of the cord 410 may be shorter in length than cord segments near a middle portion of cord 410. In another example, a cord segment (e.g., on an end opposite the end of the cord that incudes connecting elements that provide for releasable engagement between the camera 408 and a computing device, such as display device 404) can couple with camera 408. In certain embodiments, camera 408 and image processor 413 can be part of the cord segment. The cord segments can be associated with one or more features. For example, the cord segments may be rigid. A cord segment may include a hinge (not shown) to pivot with respect to adjacent cord segments. The hinge allows a cord segment hanging below the hinge (e.g., a cord segment between the hinge and camera 408) to pivot about the hinge (e.g., about an axis parallel to a longitudinal direction of positioning component 412). The position of camera 408 can be radially articulated about the hinge, for example, camera 408 can swing by the cord segment (e.g., about an axis through the hinge and transverse to the face of display device 404) radially across the face of display device 404.

FIG. 4B illustrates an example 420 positioning component 412 in a camera positioning system in accordance with various embodiments. Positioning component 412 may be associated with one or more features, such as being manufactured from one of a plurality of different materials (e.g., metal, plastic, wood, composite, etc.), frame structure, and so forth. As shown in the example, a frame structure of positioning component 412 is shaped in a u-bracket. It should be noted that although the positioning component 412 is shaped like a u bracket, the positioning component can take the shape of any one of a number of frame structures. For example, the positioning component can be a clip, a magnetic bracket, clamp, and so forth. The positioning component 412 is operable to mount to a display device 404, for example, by fitting the jaws of positioning component 412 over the top edge of the display device 404. Positioning component 412 may also be associated with a brace flexibility score and a brace force score. A brace flexibility score can quantify a level of flexibility of the brace opening (e.g., mouth or jaw) of a positioning component to accommodate different display screens of varying thickness, with respect to a baseline or reference brace flexibility score. For example, a low brace flexibility score can indicate that the jaws of a positioning component are fixed (e.g., cannot open or close beyond its current state, and can therefore be fitted onto a display screen edge of a specific thickness or less), while a high brace flexibility score can indicate that the jaws can be flexibly opened, stretched, unfolded, etc. (e.g., can passively be fitted onto a display screen edge of a specific thickness and can also be stretched open wider to be fitted onto a thicker display screen edge). The brace flexibility score may correspond to a flexibility or pliability property of a material of the positioning component. In an example, a positioning component manufactured from a flexible plastic may have a high brace flexibility score, for example, the jaws of the u-bracket can be stretched wider to accommodate a thicker display screen. In another example, a positioning component manufactured from a stiff metal may have a low brace flexibility score, for example, the jaws of the u-bracket cannot be stretched and can only be passively fitted onto a display screen edge of a limited range of thickness.

A brace force score can quantify a maximum level of force that can be applied by the positioning component 412 onto the display device 404. In other words, the brace force score can quantify how tightly the positioning component grips a display screen with respect to a baseline or reference brace force score (for example, a passive grip exerted by stiff or unmovable jaws). For example, a low brace force score can indicate that the positioning component has a weak or passive grip over the display screen edge, or may require additional support to secure the positioning component over the display screen edge, such as tensioning resulting from the combined weights of a positioning component coupled to the cord, described further below. A high brace force score can indicate that the positioning component exerts at least a threshold level of force in gripping the display screen edge. In an example, a positioning component with a brace force score within a predetermined range may include padding (e.g., silicon pads, rubber pads, and the like) attached to its jaws to prevent damage to the display screen when mounted.

In certain embodiments, positioning component 412 may include at least one notch, such as notches 422 and 424, for coupling the cord 410 to the positioning component 412. The cord 410 passes through notch 422 on a back portion of positioning component 412, which directs cord 410 over a top portion of positioning component 412 and through notch 424 on a front portion of positioning component 412. Passing cord 410 through the notches in this manner provides a threshold amount of force on positioning component 412 (e.g., the bracket) such that the force pressure exerted on positioning component 412 allows positioning component 412 to maintain a secure position on the display device 404.

Referring now to FIG. 4C, example 440 illustrates positioning component 412 coupled to cord 410 in an example arrangement of the camera positioning system on a display screen 404. In this example, the positioning component 412 is coupled to cord 410 at coupling points 442 and 444. Coupling points 442 and 444 may securely couple positioning component 412 with the cord 410 by one of a plurality of coupling means, such as a frictional assist, adhesive assist, magnetic assist, among others. In this example, weaving cord 410 through notches 422 and 424 results in frictional force between cord 410 and positioning component 412 (e.g., where cord 410, while being strapped to its woven position by the weight of positioning component 412, exerts frictional force on top of positioning component 412 between coupling points 442 and 444), wherein the frictional force securely couples the cord 410 and positioning component 412.

In certain embodiments, the position of positioning component 412 over the top edge of display device 404 is securely maintained through tensioning exerted on positioning component 412 by the coupled positioning component 412 and cord 410. Tensioning may be measured by the combined weights of the coupled positioning component 412 and cord 410, wherein the combined weights provide a threshold amount of force on the positioning component 412 over the edge of the display device 404. The threshold amount of force can be an amount force required to hold positioning component 412 in place as to prevent the positioning component 412 from slipping off the display device 404, for example, when display device 404 is stationary, or is tilted backward, forward, etc. In an embodiment, an equal amount of force can be exerted on the front end of positioning component 412 (e.g., resulting from the weight of the cord 410 hanging down from positioning component 412 at coupling point 444) as on the back end of positioning component 412 (e.g., resulting from the weight of the cord 410 hanging down from positioning component 412 at coupling point 442), to securely maintain positioning component 412 in its position on top of display device 404. When display device 404 is tilted (e.g., tilted upward or downward, or side to side), the equal tensioning on coupling points 442 and 444, combined with the weight of positioning component 412 directly over the top edge of display device 404, keeps positioning component 412 stable (e.g., prevents positioning component 412 from falling off display device 404).

In other embodiments, one or more rigid slidable attachments can couple to the cord 410 using, for example, clip fasteners, hook and loop fasteners, adhesive, etc. The rigid slidable attachment, in an example, can assist at least a portion of the cord 410 in maintaining a position and/or direction. For example, the slidable attachment can assist in maintaining a substantially straight hanging position when the camera 408 is hanging from a display device (e.g., display device 404). More specifically, the slidable attachment can reduce bowing or bending of the cord 410 when hanging from the display device 404. The slidable attachment can further provide weight to help maintain a position and keep the cord 410 flat when, for example, the camera 408 is hanging in front of the display device 404 by the cord 410. The slidable attachment may include, for example, a plurality of rubber or other skid resistant feet extending along the cord 410. During use, each skid resistant foot interacts with display device 404 or other support surface to selectively maintain the position of camera 408 upon the display device 404 and to decrease or prevent inadvertent movement of camera 408 with respect to the display device 404.

Figure 4D:
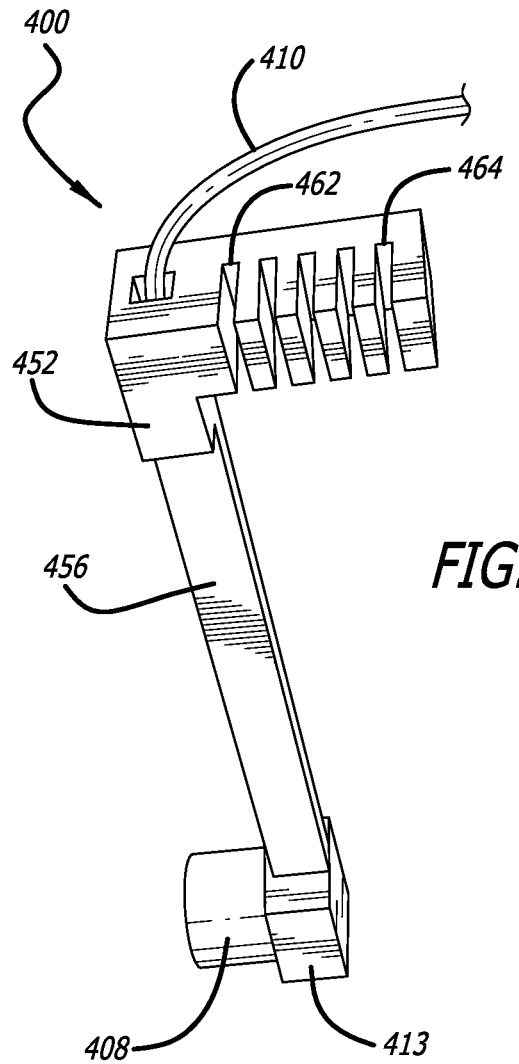

FIG. 4D illustrates another example 450 positioning component 452 in a camera positioning system in accordance with various embodiments. In this example, a frame structure of positioning component 452 is shaped as a notched bracket, wherein the notched bracket includes a horizontal beam (also referred to as a horizontal base), with a series of notches 462, 464 along a length of the horizontal beam, wherein each notch may be associated with a display edge size (e.g., a notch 462 closer to the vertical rigid hollow structure 456 corresponds to a smaller display edge thickness, whereas a notch 464 farther from the vertical rigid hollow structure 456 corresponds to a large display edge thickness). Positioning component 452 includes vertical rigid hollow structure 456 attached to the front of the horizontal beam, wherein the bottom end of the vertical rigid hollow structure 456 is attached to a camera housing. In the example, the camera housing includes camera 408 and image processor 413. Cord 410 is coupled with positioning component 452, by threading cord 410 from a top front end of the horizontal beam and down through the vertical rigid hollow structure 456, wherein cord 410 is coupled to camera 408 (e.g., connected as to allow image and/or audio data to be from camera 408 through cord 410 or vice versa). In an embodiment, cord 410 may be a flexible cord that is encased in or partially encased in the vertical rigid hollow structure 456. The rigidity of the vertical rigid hollow structure 456 prevents the cord 410 from inadvertent movement (e.g., bending or bowing), thereby maintaining camera 408 in a stable position (e.g., preventing inadvertent movement of the camera, such as rotating or swinging) over an operative region of the display screen.

Figure 4E:
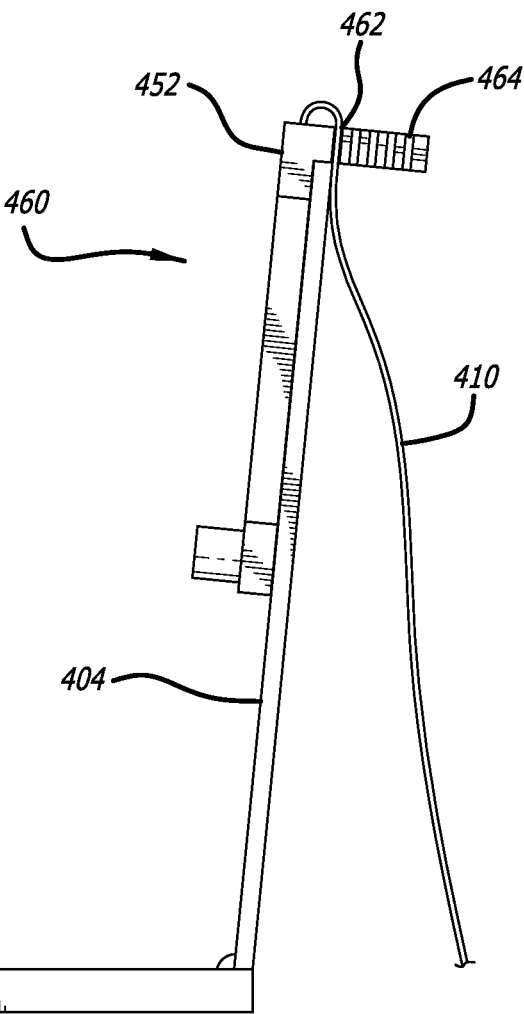

FIG. 4E illustrates example 460 of example 460 of positioning component 452 positioned on a display device 405 in accordance with various embodiments. Although a laptop is shown as display device 405 in the example, any other computing device with a display screen on which image data may appear may be used. In the example, the vertical rigid hollow structure 456 directs camera 408 to an operative region of the display device 405. In the embodiment, the position of positioning component 452 may be secured by a tensioning device. A tensioning device may be a component which has a predetermined weight and, when coupled with the positioning component 452, compounds its weight with the weight of the positioning component 452 into a combined weight and exerts the combined weight on the positioning component 452. In an embodiment, coupling the tensioning device with the positioning component 452 allows the tensioning device to transfer the force of the combined weight onto the positioning component 452, wherein the force is a threshold amount of force needed to securely maintain the positioning component 452 securely its position on the display device 405. In an example, cord 410 is the tensioning device, the cord 410 being coupled to positioning component 452 by passing a second end of the cord 410 through a notch 462 and threading a first end of cord 410 through a length of the vertical rigid hollow structure 456. The weight of the cord 410 combined with the weight of positioning component 452 exerts a threshold amount of force onto positioning component 452 as to maintain positioning component 452 in its secure position on a top edge of display device 405, thereby preventing the positioning component 452 from slipping off the display device 405, for example, when display device 405 is stationary, or is tilted backward, forward, etc.

In another embodiment, an equal amount of force can be exerted on the vertical rigid hollow structure 456 (e.g., resulting from the weight of the cord hanging down from a front end of positioning component 452, through the vertical rigid hollow structure 456) as on the back end of positioning component 452 (e.g., resulting from the weight of the cord hanging from a back end of positioning component 452, such as through notch 462), to securely maintain positioning component 452 in its position on top of display device 804. In yet another embodiment, a video display connector is attached to the second end of cord 410, wherein the video display connector releasably engages the cord 410 with the display device 405. The video display connector allows for power, image data, and/or audio data to be transmitted between the camera 408 and display device 405, through cord 410. Cord 410 may be associated with various levels of tautness along a plurality of portions of the cord 410. For example, the second end of cord 410 may have a first tautness level resulting from releasably engaging the video display connector (e.g., on a second end, also referred to as a back end, of cord 410) and hanging a middle portion of the cord 410 through notch 462. Meanwhile, the first end of cord 410 may have a second tautness level resulting from the weight of the vertical rigid hollow structure 456 and camera 408 coupled to the cord 410 and hanging down from the first end of the cord 410. A combination of the weight of the positioning component 452, the first tautness level and second tautness level of the cord 410, wherein cord 410 is coupled with positioning component 452, distributes a plurality of levels of force along a length of positioning component 452 against the display device 405, wherein the distribution of the plurality of levels of force amounts to the threshold amount of force exerted onto the positioning component 452 as a whole as to securely balance the position of the positioning component 452 on the display device 405.

In an embodiment, the positioning component 452 may also be associated with a mount width threshold. A mount width threshold quantifies the maximum width of a display device edge that the positioning component 452 can accommodate. For example, the mount width threshold of a positioning component may be determined by the width of the portion of the horizontal beam portion of the positioning component that makes contact with a planar surface of an edge of the display device 405 (e.g., width of the horizontal beam of positioning component 452 between the back side of vertical rigid hollow structure 456 and a notch 462 through which cord 410 is passed). In another embodiment, the mount width threshold may be a range of a minimum and maximum widths of various display device edges which positioning component 452 can accommodate. For example, positioning component 452 may include a plurality of notches 462, 464, and so forth, wherein each notch corresponds to a predetermined mount width. Passing cord 410 through a notch 462 closest to the vertical rigid hollow structure 456 can be the minimum mount width of positioning component 452. That is, the thinnest edge of a display device which positioning component 452 can accommodate has a width that can fit between vertical rigid hollow structure 456 and notch 462, such as display device 405 having a thin display screen as shown in the example.

Figure 4F:
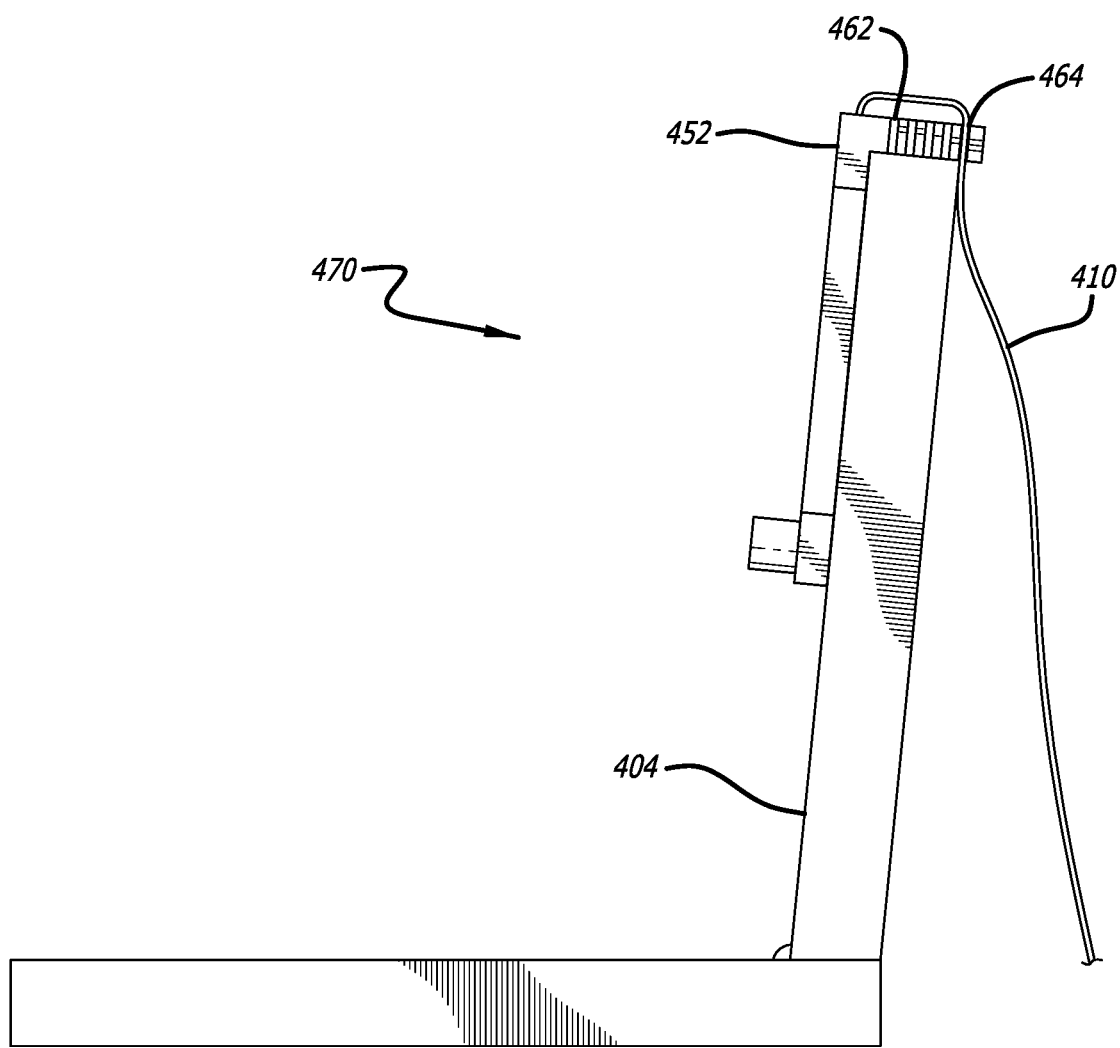

Referring now to FIG. 4F, passing cord 410 through a notch 464 farthest away from the vertical rigid hollow structure 456 can be the maximum mount width of positioning component 452. That is, the thickest edge of a display device which positioning component 452 can accommodate has a width that can fit between vertical rigid hollow structure 456 and notch 464, such as display device 406. In an embodiment, the mount width threshold of positioning component 452 may be adjusted, such that positioning component 452 can be used for a plurality of display devices. For example, cord 410 can be pass through other notches, such as notch 462 to fit positioning component 452 over a display device with a thin edge, notch 464 to fit positioning component 452 over a display device with a thick edge, or other notches in between, to fit positioning component 452 over a display device with an edge having a thickness greater than the minimum mount width and less than the maximum mount width of the positioning component 452. In another embodiment, a cord 410 passed through a notch can be remain coupled to the notch by one of a plurality of coupling means, such as a frictional assist, adhesive assist, magnetic assist, among others. In yet another embodiment, cord 410 can be looped or wrapped around a notch. Also in another embodiment, cord 410 can be passed through a first notch and looped around the remaining notches (e.g., the notches for display devices with edges thicker than the mount width threshold of the first notch). For example, cord 410 can be passed through a notch 462 to fit positioning component 452 over a thin display device 405, while a portion of the remaining cord 410 can be wrapped through the remaining notches through notch 464.

FIG. 5 illustrates example 500 of a camera component in a camera positioning system in accordance with various embodiments. In the example, camera 508 is attached to cord 510, wherein cord 510 includes a first end 511 and second end 509, and wherein cord 510 is coupled to positioning component 512. When positioning component is mounted on a top edge of a display screen (not shown), the camera 508 may be positioned over the display screen. Although positioning component 512 is shown as a bracket clip with hinge 517 supported by a spring hinge 518, positioning component 512 can include other frame structures, as discussed in further detail in FIGS. 6A, 6B, 6C, and 6D. Camera 508 includes a lens 514 to capture the gaze of a first user (e.g., a local user) looking at an eye contact target (e.g., eyes of an onscreen image of a second user, such as a remote user, in a video communication) displayed on the display screen. In the example, the camera 508 may include an image processor 513 to process image data of the user facing the display screen and communicating through the video communication, for example, image processor 513 processes and transmits to the second user (e.g., via a video communication application) image data of the first user communicating and establishing eye contact with the second user. An adapter ring 520 allows for lens 514 to be swapped with a different lens, for example, when a different field of view is desired (e.g., increase or decrease number of degrees of visual angle that can be covered by a lens) or other effects are desired from different lens types (e.g., wide angle lens, specialty lens such as fisheye lens, etc.). In certain embodiments, adapter ring 520 can also adjust focus or magnification of the lens, for example, to sharpen or magnify the image of the user facing display screen.

Cord 510 can be associated with a number of properties, including, for example, a flexibility or pliability property, a stiffness property, a firmness property, an extensibility property, a size or thinness property, etc. For example, cord 510 may be a rigid cord. In another example, cord 510 may be a flexible cord that is encased in or partially encased in a hollow rigid tube. In yet another example, cord 510 may include a plurality of cord segments, wherein one or more cord segments can be flexible. In this example, one or more flexible cord segments can be coupled with camera 508 on an end opposite the end of the cord that includes connecting elements that provide for releasable engagement between the camera and a computing device (or a component coupled to the computing device). The flexible cord segment(s) can be adjusted to vary the position of camera 508. For example, the flexible cord or cord segment(s) can be adjusted to change a location of the camera 508 from a first location to a second location. For example, one or more cord segments may be associated with a rigidity score, which quantifies a level of flexibility of an entire cord, a cord segment, or a combination of cord segments. The rigidity score can measure how rigid the cord or a cord segment is with respect to a baseline or reference rigidity score. For example, a cord with a high rigidity score can indicate that the cord or cord segment(s) is not flexible. Thus, a higher threshold level of adjustment force is needed to bend, shape, or adjust the cord or cord segment(s). In various embodiments, the rigidity score can be set to support a weight of the cord (or at least an appropriate portion of the cord) and camera such that once the cord or cord segment is adjusted, the cord or cord segment maintains position until manually readjusted, such as in the situation of a user readjusting the cord or cord segment. That is, the cord or cord segment(s) is formed of a plastic, wood, metal, composite, or laminated material sufficiently rigid for supporting camera 508. Additionally, the cord can be sized and shaped to sufficiently balance the weight of camera 508 and cord to prevent instability of camera 508. Accordingly, the cord and cord segment(s) can be associated with a rigidity score that enables a stable position of the camera 508 once the cord is adjusted. A stable position, for example, includes the situation where camera movement is within a threshold amount of movement. This can include, for example, decreasing or preventing inadvertent movement of camera 508 with respect to the display screen or other support surface, such as preventing the cord from twisting or spinning freely (e.g., about a vertical axis) and thereby preventing camera 508 from inadvertently changing its rotational orientation (e.g., prevents lens 514 from rotating its focus away from the user facing the display screen). In another example, a stable position can include the situation where the camera cord does not bend or bow once hanging or extending (e.g., substantially perpendicular to a top perimeter of a display screen) from a top portion of a computing device monitor. In accordance with various embodiments, the cord and/or cord segments can be manufactured from one of a plurality of different materials to allow for a plurality of rigidity scores. In yet another example, the housing of the camera 508 may have substantially flat edges (e.g., the back of camera 508 and/or image processor 513 may be substantially flat) as to stably maintain the position (e.g., rotational position) of the camera 508 against the display screen.

In another embodiment, cord 510 may include an adjustable swivel at its first end 511 proximate to the camera 508, to allow for controlled adjustments to the rotational position of the camera 508, for example, to allow camera 508 to capture image data from various orientations that collectively amount to a 180-degree field of view of the display screen. For example, an adjustable swivel may be an adjustable friction swivel, a swivel with click stops, and the like. The adjustable swivel allows camera 508 to be rotated at predefined angles about a vertical axis (e.g., by temporarily locking the camera 508 in its rotational position through a frictional assist, click stop, etc.), while preventing instability of the camera 508 (e.g., preventing camera 508 from spinning freely about a vertical axis).

In certain embodiments, cord 510 includes rigid and flexible portions. In an example, a rigid portion can include a first end and a second end opposite the first end. In an embodiment, the rigid portion can extend from a first end in a substantially vertical manner (i.e., perpendicular to a top portion of a display screen). A flexible portion also includes a first end and a second end opposite the first end. In an embodiment, the first end of the flexible portion can be coupled to the second end of the rigid portion. The portions can range in size. For example, a rigid portion may be eight inches long and a flexible portion may be about 15 inches long. In this example, the flexible portion couples with camera 508. The flexible or gooseneck nature of the flexible portion can allow camera 508 to be adjusted to alter the orientation of camera 508.

In another embodiment, the cord 510 (e.g., the first end 511 of the cord 510) may include a hinge to allow radial articulation of the position of camera 508. For example, cord 510 may include a plurality of cord segments. In an embodiment, a cord segment may correspond to different sections of cord 510. The cord segments can be of different lengths. For example, cord segments along the first end 511 of cord 510 (e.g., cord segments proximate to the camera 508 end of the cord 510) may be shorter in length than cord segments near a middle portion of cord 510 or segments toward a second end 509 of cord 510. In another example, a cord segment (e.g., on the first end 511 of cord 510) can couple with camera 508. In certain embodiments, camera 508 and image processor 513 can be part of the cord segment. The cord segments can be associated with one or more features. For example, a cord segment may include a hinge to bend (e.g., pivot) with respect to adjacent cord segments. The hinge allows a cord segment hanging below the hinge (e.g., a cord segment between the hinge and camera 508) to pivot about the hinge (e.g., about an axis parallel to a longitudinal direction of positioning component 512). The position of camera 508 can be radially articulated about the hinge as desired by the user. For example, camera 508 can be swung by the cord segment (e.g., about an axis through the hinge and transverse to the face of display screen 504) radially across the face of a display screen. The position of camera 508 may also be adjusted horizontally or vertically across a display screen, described in further detail in FIGS. 7A and 7B.

Figure 6A:
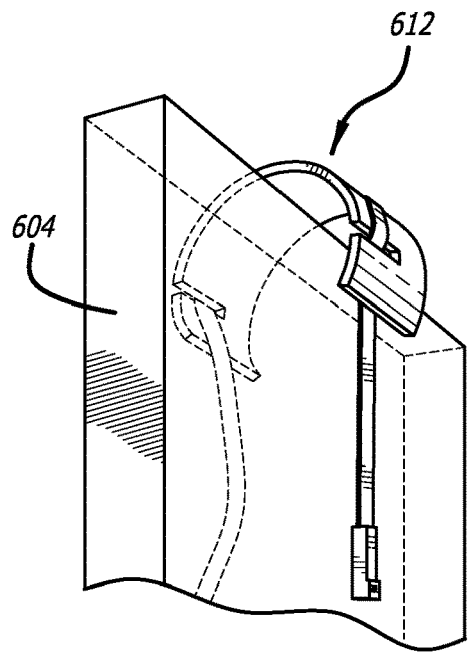
FIGS. 6A, 6B, 6C, and 6D illustrate example positioning components of a camera positioning system in accordance with various embodiments.

FIG. 6A illustrates an example 600 of a positioning component in a camera positioning system in accordance with various embodiments. A positioning component may be associated with one or more features, for example, a frame structure. In the example, a frame structure of positioning component 612 is shaped as a u-bracket. Although the example shows positioning component 612 shaped as a u-bracket, the positioning component can take the shape of any one of a number of frame structures. For example, the positioning component can be a clip, a magnetic bracket, clamp, and so forth, which are described in further detail below. The positioning component 612 is operable to mount to a display screen 604, for example, by fitting the jaws of positioning component 612 over the top edge of the display screen 604.

Positioning component 612 may be associated with a brace flexibility score and a brace force score. A brace flexibility score can quantify a level of flexibility of the brace opening (e.g., mouth or jaw) of a positioning component to accommodate different display screens of varying thickness, with respect to a baseline or reference brace flexibility score. For example, a low brace flexibility score can indicate that the jaws of a positioning component are fixed (e.g., can only fit onto a display screen edge of a specific maximum thickness because the jaws cannot open or close beyond its default state). A high brace flexibility score can indicate that the jaws can be flexibly opened, stretched, unfolded, etc., for example, jaws that can passively be fitted onto a display screen edge of a specific thickness and can also be stretched open wider to be fitted onto a thicker display screen edge. The brace flexibility score may correspond to a flexibility or pliability property of a material of the positioning component. In an example, a positioning component manufactured from a flexible plastic may have a high brace flexibility score, for example, the jaws of the u-bracket can be stretched wider to accommodate a thicker display screen. In another example, a positioning component manufactured from a stiff metal may have a low brace flexibility score, for example, the jaws of the u-bracket cannot be stretched and can only be passively fitted onto a display screen edge of a limited range of thickness.

A brace force score can quantify a maximum level of force that can be applied by the positioning component 612 onto the display device 404. That is, the brace force score can quantify the pressure exerted by the positioning component when gripping a display screen with respect to a baseline or reference brace force score (e.g., a passive grip exerted by stiff or unmovable jaws). For example, a low brace force score can indicate that the positioning component has a weak or passive grip over the display screen edge, or may require additional support to secure the positioning component over the display screen edge, such as tensioning resulting from the combined weights of a positioning component coupled to the cord, described further below. A high brace force score can indicate that the positioning component exerts at least a threshold level of force in gripping the display screen edge. In an example, a positioning component with a brace force score within a predetermined range may include padding (e.g., silicon pads, rubber pads, and the like) attached to its jaws to prevent damage to the display screen when mounted. In the situation where positioning component 612 is composed of a highly flexible material, such as a highly bendable metal or plastic, it may have a low brace force and would have a gentler grip on the display screen 604 edge. On the other hand, in a situation where positioning component 612 is composed of a semi-flexible material, such as a dense yet slightly flexible wood or plastic, it may have a higher brace force and would have a tighter grip on the display screen 604 edge, particularly when jaws of positioning component 612 are stretched wider to accommodate a thicker display screen edge.

A positioning component may also be associated with a mount width threshold. A mount width threshold represents the maximum width of a display screen edge that the positioning component can accommodate. For example, a positioning component 612 (e.g., a u-bracket) that is composed of a flexible material may be stretched wider to fit over a thicker display screen edge and would have a higher mount width threshold than a u-bracket of a same size and shape but composed of an inflexible material. A positioning component may also be associated with a mount depth threshold, which represents the maximum depth of a display screen edge that the positioning component can accommodate (e.g., how much of the edge is covered by positioning component). In an example, a higher mount depth threshold may indicate that the jaws of positioning component 612, when mounted on display screen 604, envelops a deeper portion of the display screen 604 edge than would a positioning component with a lower mount depth threshold. However, a mount depth threshold that is too high may exceed a bezel width of a display screen (or other computing device or component coupled to a computing device), for example, a positioning component with a high mount depth may have jaws, when mounted onto a display screen, that grip the display screen beyond the bezel and obstruct a portion of a viewable area (e.g., an area of a display screen where image content can appear) of the display screen 604.

In certain embodiments, a positioning component may further be associated with a tensioning ratio. A tensioning ratio can quantify the relative weights exerted by a front portion (e.g., first end) of a cord, a back portion (e.g., second end) of the cord, and the positioning component, wherein the combined weights on the positioning component securely maintains its position on top of the display device 604. That is, the tensioning ratio may include a ratio of a first weight (e.g., first end of cord), a second weight (e.g., second end of cord), and a third weight (e.g., positioning component). The tensioning ratio quantifies the distribution of weight in a coupled positioning component and cord combination that is needed to provide a threshold amount of force over the positioning component as to securely maintain the position of the positioning component on the display device. In an example, a tensioning ratio identifies an optimal balance of tensioning on the coupled positioning component 612 and cord combination, and the center of gravity of the coupled positioning component 612 and cord combination, so that the combined weights of the positioning component 612 and cord do not cause the positioning component 612 to lean and fall forward or backward off the display device 604. In an embodiment, the first weight (e.g., of the first end of the cord) may include a weight of the camera attached to the first end. In another embodiment, supplemental weights (e.g., additional cord segments, weighted materials, etc.) may be added to or removed from to at least one of the first end of the cord, second end of the cord, or positioning component to achieve the tensioning ratio required for the positioning component.

In the example, positioning component 612 is a u-bracket with two notches, wherein the cord passes through a first notch on a back portion of the positioning component 612, which directs the cord over a top portion of positioning component 612 and through a second notch on a front portion of the positioning component 612. through which the cord may be passed. In an embodiment, an equal amount of force can be exerted on the front end of positioning component 612 (e.g., resulting from the weight of the cord hanging down from the front notch in positioning component 612 in front of display device 604) as on the back end of positioning component 612 (e.g., resulting from the weight of the cord hanging down from the back notch in positioning component 612 behind display device 604), to securely maintain positioning component 612 in its position on top of display device 604. When display device 604 is tilted (e.g., tilted upward or downward, or side to side), the equal tensioning on of the front and back portions of the cord on both notches of positioning component 612, combined with the weight of positioning component 612 directly over the top edge of display device 604, keeps positioning component 612 stable (e.g., prevents positioning component 612 from falling off display device 604).

Figure 6B:
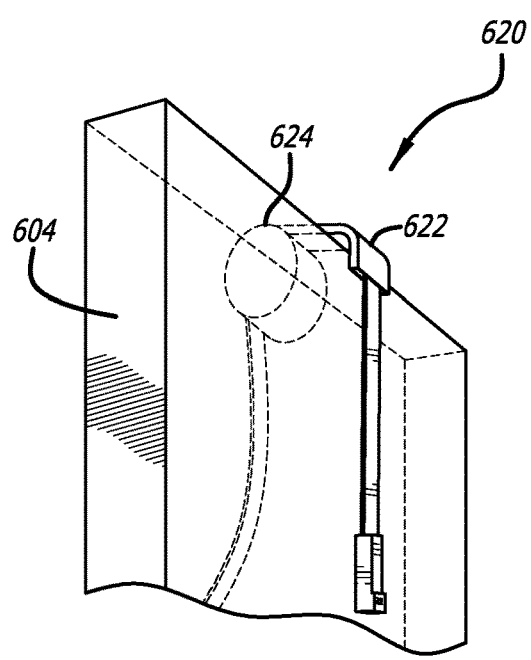

FIG. 6B illustrates example 620 of a positioning component that is a bracket 622 attached to a spring-loaded retractor 624. In the example, the bracket 622 may hang on top and in front of the display device 604. The spring-loaded retractor 624 may hang on top of and behind the display device 604. A cord can be fed through the spring-loaded retractor 624, through a back end to a front end of the bracket 622, and hung down in front of display device. The spring-loaded retractor 624 is operable to retract, roll, and stow excess cord length. A camera attached to the first end of the cord can limit the cord from being removed from the bracket 622 portion when the cord is retracted. In another embodiment, a stopper affixed to a portion of the cord that is proximate to the camera may limit the cord from being removed from the bracket 622 when the cord is retracted. The bracket 622 and spring-loaded retractor 624 allow for the cord to be raised or lowered vertically on the display device 604. In certain embodiments, the cord may be associated with a flexibility or pliability property. In the example, the cord is a flexible or semi-flexible material to allow for pulling and retraction of the cord and stowing of the cord as a rolled cord stored in the spring-loaded retractor 624. The bracket 622 and spring-loaded retractor 624 may also be adjusted horizontally, for horizontal adjustment of the positions of the cord and camera. For example, the bracket 622 may be disengaged from its current position on the display device, and releasably re-engaged with the display device at a new position.

In the example, the mount width threshold of the positioning component may be determined by the width of the portion of the bracket 622 that makes contact with a planar surface of an edge of the display device (e.g., width of the horizontal portion between the spring-loaded retractor 624 and a front lip of the bracket 622). A mount depth threshold can be determined by a height of the front lip (e.g., front edge) of the bracket 622, a diameter of the spring-loaded retractor 624 (and additionally a height of a back edge of the bracket 622 attached to the spring-loaded retractor 624, in some embodiments), or a combination thereof.

Also in the example, a tensioning ratio may be determined by identifying the distribution of weight of the coupled bracket 622 and spring-loaded retractor 624. For example, the weights may include a weight of the spring-loaded retractor 624 on a second end of the cord and a weight of the camera on the first end of the cord that are needed to properly balance the front and back weights of the bracket 622 as to securely maintain the position of the bracket 622 on the display device.

Figure 6C:
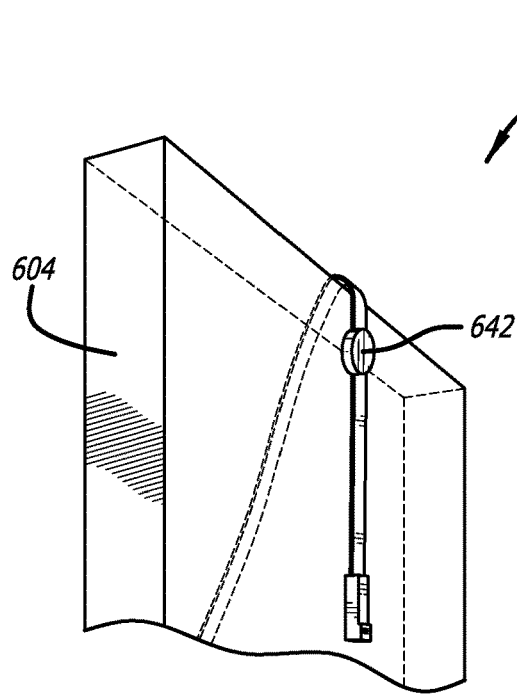

FIG. 6C illustrates an example 640 of a positioning component that is a magnet 642. In the example, the magnet 642 may be magnetically adhered to a cord, in a recess and key arrangement. That is, magnet 642 can be in one of the recess and the key, and a material to which the magnet is attracted can be in the other of the recess and the key. The recess and key arrangement may further include interlocking connector elements. As shown in the example, magnet 642 is affixed to a front surface of a display device. In another embodiment, magnet 642 can be in a recess while the key is a slidable attachment around the cord wherein the cord can slide up or down through the key, enabling the position of the camera (attached to the first end of the cord) to be vertically adjusted across the display device. In yet another embodiment, a magnetically-attracted strip, such as a magnetic strip or a metal strip, or a series of magnetic recesses may be incorporated across a top portion of the front surface of the display device, wherein the back of magnet 642 may be releasably attached to the display device, and may be repositioned horizontally to adjust a horizontal position of the camera.

In the example, the magnet 642 may be securely positioned on the display device when a tensioning ratio is achieved. For example, the tensioning ratio may be determined based on the amount of magnetic force by which the magnet pulls the cord toward the display device, the amount of magnetic force (or other releasably adhesive force) by which the magnet 642 is attached to the display device, and the weight of a back portion, middle portion (e.g., along the top edge of the display device) and front portion of the cord. A balanced distribution of the forces exerted by the magnet 642 and the cord onto the magnet can keep the magnetically coupled cord and magnet 642 securely maintained in their position on display device. In another example, supplemental weights may be applied to, for example, the backend of the cord to balance the force distribution to achieve the appropriate tensioning ratio as to securely maintain the position of the magnet 642 and cord on the display device.

Figure 6D:
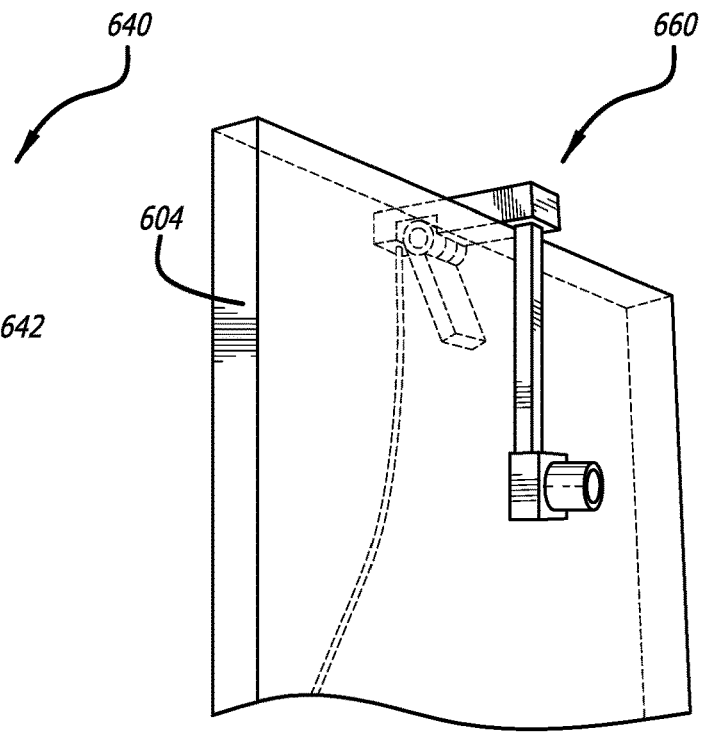

FIG. 6D illustrates an example 660 of a positioning component that is a bracket clip 662. In the example, a cord is threaded into a back end of a horizontal base (also referred to as a horizontal beam) of the bracket clip 662 and through a front end of the horizontal base, wherein a first end of the cord can hang down from the front of the horizontal base and attach to a camera in front of the display device. In an embodiment, the first end of the cord can be rigid as to rotational stability to the camera. That is, a rigid first end can maintain the position of the first end and the position of the camera against the display device, wherein the rigidity of the first end prevents the first end and the attached camera from turning freely (e.g., about a vertical axis). In another embodiment, the first end of the cord can be a flexible cord encased in a rigid hollow structure that is attached to the front end of the bracket clip 662.

In the example, bracket clip 662 can be positioned on a top edge of the display device 604, bracket including a hinge and clip operable to grip the edge of the display device 604. The hinge may be held in a closed position (e.g., under a rotary force) by a spring, such as a torsional spring (for example, a spiral wound torsion spring). That is, when bracket clip 662 is disengaged from the display device 604, the clip can clamp shut against the horizontal base of the bracket clip 662 under the torque of the spring in the hinge. Pulling the clip back (e.g., resisting the torque of the spring) will open the bracket clip 662 to be releasably engaged with (e.g., clip onto) the display device 604. A mount width threshold of the bracket clip 662 identifies the largest width of a display device edge which the bracket clip 662 can accommodate (e.g., fit onto). In this example, the mount width threshold of the bracket clip 662 may be determined by measuring the maximum range of motion of the bracket clip 662, that is, the widest distance the clip can be opened (e.g., when torque of the spring is fully resisted).

In an example, the brace force score of the bracket clip 662 may be correlated with a rotary force (e.g., torque) of the torsional spring in the hinge. Accordingly, a spring with a high torque may have a high brace force score, that is, the bracket clip under the force of the spring can have a forceful grip on a display device. In the situation where a bracket clip 662 exceeds a predetermined or threshold brace force score, padding (e.g., rubberized contact points, silicon pads, and the like) may be incorporated inside the jaws of the bracket clip (e.g., along an edge of clip, under the bottom of the horizontal base, behind a rigid cord, etc.) to prevent damage to the display device when gripped by bracket clip 662.

In certain embodiments, bracket clip 662 may be associated with a tensioning ratio. In the example, the tensioning ratio may be determined by identifying the distribution of weight of the bracket clip 662 coupled with the cord and the force exerted on the bracket clip 662 by the bracket clip 662 and cord. For example, the weights may include a weight of the spring-loaded retractor 624 on a second end of the cord and a weight of the camera on the first end of the cord that are needed to properly balance the front and back weights of the bracket 622 as to securely maintain the position of the bracket 622 on the display device. For example, the weight of bracket clip 662 can be exerted on the top edge of the display device 604, while the weight of the first end of the cord provides tension on the front end of the bracket clip 662 simultaneously while the weight of the second end of the cord provides tension on the back end of the bracket clip 662, as to keep bracket clip 662 in place on the top edge of the device screen 604. If the position of display device 604 is adjusted (e.g., tilted downward, upward, left or right), the tensioning from the combined weights of the bracket clip 662 and the cord will hold bracket clip 662 in place as to prevent the bracket clip 662 from falling off the display device 604. The tensioning ratio can also identify the appropriate distribution of weight between bracket clip 662 and the cord to maintain the threshold amount of force on the bracket clip 662 on top of the display device 604 as to prevent disturbances to the stability of the bracket clip 662 on the display device 604 when adjustments are made to the camera (e.g., camera is lowered or raised vertically across the display device 604, the camera is rotated right or left about a vertical axis, or bracket clip 662 is slid to the right or left of the display device 604 as to change the horizontal position of the camera over the display device 604, and so forth). In an embodiment, an equal amount of force can be exerted on the front end of the bracket clip 662 (e.g., resulting from the weight of the first end of the cord hanging down from bracket clip 662 in front of display device 604) as on the back end of the bracket clip 662 (e.g., resulting from the weight of the second end of the cord hanging down from the bracket clip 662 behind display device 604), to securely maintain the bracket clip 662 in its position on top of display device 604. In another example, supplemental weights may be added to the bracket clip 662, the first end the cord 310, the second end of the cord 310, or a combination thereof, to achieve the tensioning ratio (e.g., balance the tensioning on the bracket clip 662 and cord and the center of gravity of the bracket clip 662 and cord, so that the combined weights of the bracket clip 662 and cord prevent the bracket clip 662 from leaning and falling forward or backward off the display device 604, or from sliding to the left or right if the top edge of the display device 604 is not level).

In another example, the position of the camera can be adjusted vertically, horizontally, or a combination thereof, to capture the user's gaze at display device 604, for example, if the user moves his gaze to follow the eye contact target (e.g., the eyes of the onscreen image of the other participant in the video communication) because the eye contact target has moved to a different location on display device 604. For example, the first end of the cord can be lowered or raised. In the situation where the first end of the cord is composed of flexible material, the cord may be pulled downward (e.g., through toward the front end of bracket clip 662) or upward (e.g., backward through the back end of the bracket clip 662), respectively, across the display device 604. In the situation where the first end of the cord is a rigid cord or is a flexible cord encased in a rigid structure, the first end of the cord may be lowered by affixing additional cord segments to the first end of the cord, or raised by removing cord segments. In another embodiment, the camera may be slid up or down along a rigid cord. Bracket clip 662 may be slid to the left or right across the top edge of display device 604 to adjust the horizontal position of the camera. In another example, bracket clip 662 may be disengaged (e.g., release the clip) from its current position on display device 604, and releasably re-engaged (e.g., clamp the clip) bracket clip 662 with display device 604 at a new position.

In another embodiment, the cord may include a hinge to allow radial articulation of the position of camera. For example, the cord may include a plurality of cord segments, wherein each cord segment corresponds to a different section of the cord. A cord segment can couple with the camera. A cord segment may include a hinge to bend (e.g., pivot) with respect to adjacent cord segments. The hinge allows a cord segment hanging below the hinge (e.g., a cord segment between the hinge and camera) to pivot about the hinge (e.g., about an axis parallel to a longitudinal direction of the horizontal base of bracket clip 662). The position of the camera can be radially articulated about the hinge as desired by the user, for example, by swinging the camera by the cord segment (e.g., about an axis through the hinge and transverse to the face of display device 604) radially across the face of display device 604.

Although the positioning component as shown in FIG. 6D is a bracket clip, positioning component may take the shape of other frame structures. For example, in another embodiment, the positioning component may be a double hook to hook onto the display device, wherein the cord passes through a gap in the double hook. In another embodiment, the positioning component may include a front flange hook or a back-flange hook engaged with a raised ridge on the top edge of the display device.

In yet another embodiment, the positioning component may include a socket. A pin extending from a slider may be affixed to the cord. The pin may be inserted into the socket to support the cord from the positioning component. The pin and socket may be held together by frictional force. In certain embodiments, the pin may include a rod-shaped element having at least one bend to locate the pin parallel to a longitudinal direction of the positioning component and displaced to one side of the positioning component. In various embodiments, the cord includes at least one bend to locate the camera within an operative region of the display screen.

In another embodiment, the positioning component may include a clamp, such as a spring clamp, a vice clamp, and so forth. A first end of the cord may be encased in a pole, wherein a camera is attached to the bottom of the pole and the pole can be adjustably slid vertically through the clamp to adjust a vertical position of the camera across the display device. The pole can be secured in a vertical position along the clamp by one of a plurality of temporary placement locking means, such as a frictional assist, magnetic assist, adhesive assist, and the like.

In yet another embodiment, the positioning component may include a clip that can grip onto an edge of a display device. The clip may include at least one handle with a hole through which the cord may be passed through to hang the camera in front of a display device and direct the cord (and accordingly the attached camera) to an operative region of the display screen and.

Figure 7A:
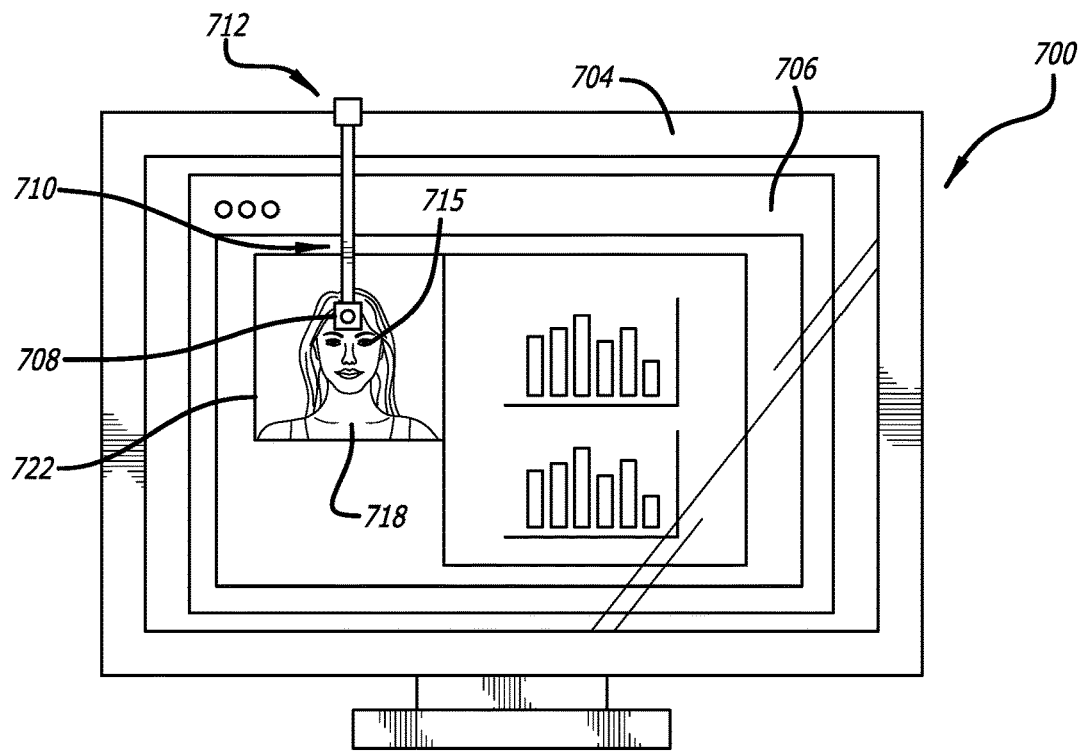
FIGS. 7A and 7B illustrate examples of repositioning a camera of a camera positioning system in accordance with various embodiments.

FIG. 7A illustrates an example 700 position of a camera in a camera positioning system in accordance with various embodiments. In the example, a first user 718 (e.g., a remote user) and a second user (e.g., a local user, not shown, facing forward toward the display device 704) participate in a video communication (also referred to as a video conference) through video conference application window 706. The display device 704 shows a front view of the video conference application window 706 from the perspective of the second user 716. In this example, video conference application window 706 presents an onscreen image of the first user 718 located near a top left portion of the display device 704. In this example, camera 708 is positioned over the display device 704 and within a target range of eye contact target 715 (e.g., the eyes of the onscreen image of the first user 718). The target range can be measured as a threshold distance, such as a maximum distance or optimal distance (e.g., for optimal lens focus), between a point on the display device and the eye contact target required for a camera lens positioned within the threshold distance of the eye contact target to capture the gaze of the onlooking user (e.g., first user facing display device 704) and establish eye-to-eye contact between the users in the video communication. Said differently, the lower limit of the target range can be any point on the display device that is directly on the eye contact target, while an upper limit of the target range is the farthest distance a camera lens may be positioned away from the eye contact target while still enabling the camera to capture the gaze of the onlooking user and establish eye-to-eye alignment. Accordingly, a camera positioned beyond the target range will fail to capture the gaze of the onlooking user, resulting in misaligned eye contact between the users. In other embodiments, a target range may include a horizontal parameter (e.g., x-coordinate), vertical parameter (e.g., y-coordinate), a radial parameter (e.g., points within a radius of the eye contact target), or a combination thereof. For example, the target range may be drawn as a boundary around the eye contact target, wherein the boundary represents the farthest points the camera 708 can be located with respect to the eye contact target and the boundary has the shape of one of a plurality of boundary shapes (e.g., rectangular, circular, etc.).

To facilitate eye-to-eye alignment, the position of the camera may be adjusted horizontally, vertically, radially, rotationally, or a combination thereof, to maintain the camera within the target range of the eye contact target. In various embodiments, the camera may be repositioned horizontally by moving the positioning component 712 horizontally across the top edge of display device 704, wherein the positioning component 712 is coupled to cord 710 and a first end of the cord 710 is attached to camera 708. In an example, positioning component 712 may be disengaged from its current position on display device 704, relocated to the right or left of its current position along the top edge of display device 704, and releasably re-engaged with display device 704 at its new position. For example, in the situation where positioning component 712 is a bracket clip (or spring clamp, vice clamp, and the like), the jaws of bracket clip may be opened to release its grip on the top edge of display device 704. When the bracket clip is relocated to the right or left of its previous position, the jaws of the bracket may grip (e.g., releasably re-engage with) the edge of the display device 704 at its new location. In another example, positioning component 712 may be slid, rolled, etc. along the top edge of display device 704 to the right or left of its current position, for example, in the situation where positioning component 712 is a u-bracket, a magnet that is attached to a horizontal magnetic strip across the top front edge of the display device 704, and the like.

In certain embodiments, the camera 708 may be repositioned vertically by vertically adjusting the cord 710. For example, the position of camera 214 over the display device 704 can be raised or lowered by adjusting a length of a first end (e.g., front end) of the cord, such as by pulling cord 710 up or down, respectively (e.g., by passing the cord 710 through the positioning component 712 to the back or front of display device 704, respectively). For example, if the first user 718 raises her seat, her onscreen image will move higher in the video conference application window 706, causing her eyes (e.g., the eye contact target 715) move to a higher position on display screen 704 than camera 708. To maintain eye-to-eye alignment when the second user moves his gaze upward and over camera 708 to look at the eye contact target 715 at its new location, camera 708 may be moved upward to maintain the camera 708 within the target range of the eye contact target 715, such that the gaze of second user continues to be within the field of view of camera 708. Camera 708 may also be lowered or relocated left or right along display screen 704 to follow the eye contact target 715 if the eye contact target 715 shifts onscreen.

Also in certain embodiments, the position of camera 708 may be adjusted radially (e.g., about a portion of the cord 710). In an example, the first end of cord 710 may include a plurality of cord segments, wherein a cord segment can correspond to different sections of the cord 710. A cord segment (e.g., along the first end of cord 710 proximate to the camera 708) may be coupled with camera 708. In certain embodiments, camera 708 can be part of the cord segment. The cord segments can be associated with one or more features. For example, a cord segment may include a hinge to pivot (e.g., bend) with respect to adjacent cord segments. The hinge allows a cord segment hanging below the hinge (e.g., a cord segment between the hinge and camera 708) to pivot about the hinge (e.g., about a horizontal axis that is orthogonal to the front plane of display device 704). The position of camera 708 can be radially articulated about the hinge. For example, camera 708 can be swung by the cord segment (e.g., about an axis through the hinge and transverse to the face of display screen 704) radially across the face of a display device 704.

Further in certain embodiments, the orientation of camera 704 may be rotated about a vertical axis. In an example, cord 710 may include an adjustable swivel at its first end proximate to the camera 708, to allow for controlled adjustments to the rotational position (e.g., orientation) of the camera 708, for example, to allow camera 708 to capture image data from various orientations that can collectively amount to a 180-degree field of view of the display device 704. For example, an adjustable swivel may be an adjustable friction swivel, a swivel with click stops, and the like. The adjustable swivel allows camera 708 to be rotated at predefined angles about a vertical axis and maintaining (e.g., by temporarily locking the camera 708 in its rotational position through a frictional assist, click stop, etc.), while preventing instability of the camera 708 (e.g., preventing camera 708 from spinning freely about a vertical axis).

Figure 7B:
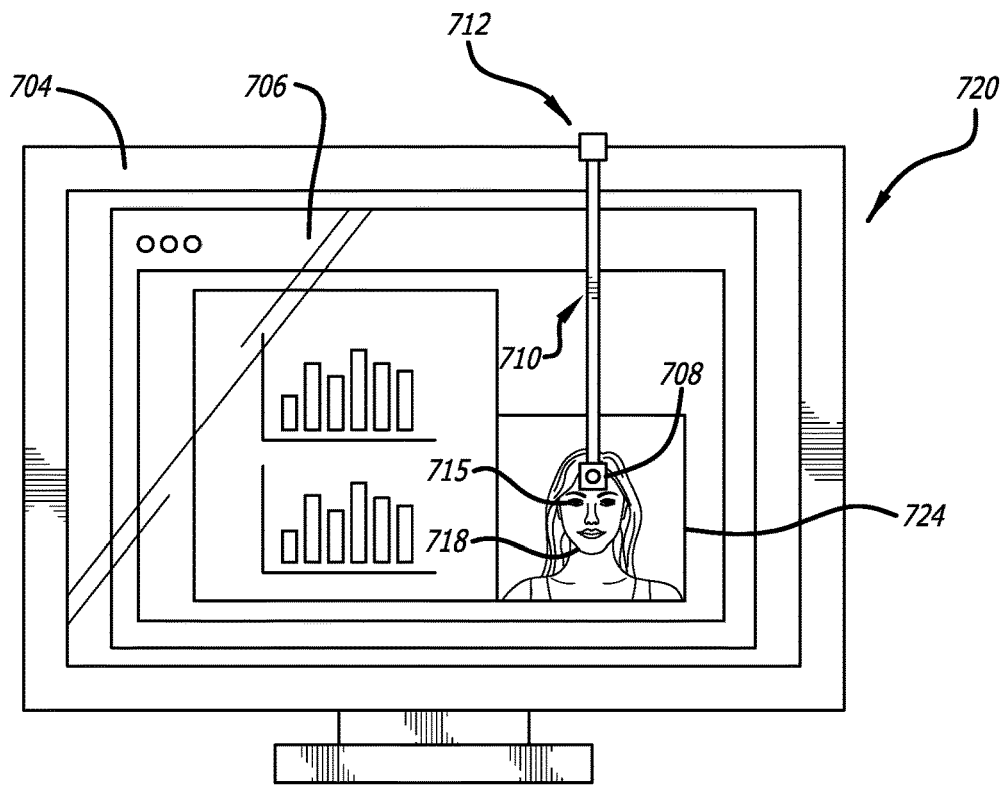

FIG. 7B illustrates example 720 of repositioning the camera 708 of a camera positioning system in accordance with various embodiments. For example, as shown in FIG. 7A, the onscreen image of the first user 718 is displayed in a first position 722 on the upper left corner of the display device 704. Referring now to FIG. 7B, the onscreen image of the first user 718 has moved to a second position 724 in the lower right corner of display device 704. To maintain eye-to-eye alignment between the user in the video communication, the camera 708 must be repositioned from the upper left corner to the lower right corner of the display device 704 (e.g., camera 708 must move downward diagonally to the right). A camera repositioning analyzer may determine a shortest path determined to move camera from a current location (e.g., within target range of the eye contact target 715 at a first position 722) to a new location (e.g., within target range of the eye contact target 715 at the second position 724) over display device 704 and the combination of adjustments to the positioning component 712, cord 710, or camera 708 orientation necessary to execute the shortest path. In this example, the shortest path may include a single diagonal path moving downward to the right. To execute this shortest path, a combination of adjustments to the positions of positioning component 712 and cord 712 must be made. That is, positioning component 712 needs to be repositioned horizontally to the right until the camera 708 is within a horizontal limit of the target range (e.g., within an appropriate range of y-coordinates of the target range), while cord 710 needs to be lowered until the camera 708 is within a vertical limit of the target range (e.g., within an appropriate range of x-coordinates of the target range). In yet another embodiment, the video conference application window 706 may be moved about the display device 704, resized, or a combination thereof, to be within a target range of a current position of the camera 708.

When passing the cord 710 vertically through positioning component 712, or relocating positioning component 712 side to side (e.g., right or left), or a combination thereof, the positioning component 712 remains securely mounted to the display device 704. That is, positioning component 712 remains securely held in its position on display device 704 (e.g., positioning component 712 does not fall off display device 704) under the tensioning exerted on the positioning component 712 that results from the combined weights of the positioning component 712 and cord 710 exerted on the positioning component 712.

FIG. 8A illustrates example 800 for stowing a camera positioning system in accordance with various embodiments. In the example, when the camera positioning system is not in use, the camera positioning system may be stowed, for example, in a stowing area. For example, a stowing area may be an area of display device 804, such as a bezel or display device frame, where the positioning component 802 and cord can be positioned as to minimize obstruction of the viewable area 805 (e.g., an area of a display screen where image content can appear), allowing a user to optimally utilize the display device 804 for other purposes when not actively using the camera positioning system. In an embodiment, obstruction of the viewable area may be minimized when the positioning component and cord are stowed within a threshold zone around the stowing area (e.g., within a particular distance of the stowing area). For example, positioning component 802 is placed along the top right side of a bezel 806 of display device 804 as much as possible, where the borders of the positioning component 802 and the camera have minimal overlap with (e.g., cause minimal obstruction of) the viewable area 805.

The positioning component 802 and cord may be stowed in the stowing area according to a stowing arrangement, wherein the stowing arrangement may include a placement or condition (e.g., engaged, detached, loosened, folded, and the like) for the positioning component 802 and a placement or condition (e.g., retracted, rolled, removed, etc.) of the cord when stowed. In this example, positioning component 802 is a u-bracket that is stowed by maintaining its position on the top edge of the display device 804 (e.g., the jaws of the u-bracket are fitted over the top edge of display device 804) and displacing its horizontal position to an area along the right edge (e.g., bezel 806 on the right) of display device 804. In another example, the stowing area may be along the left bezel of the display device 804. Accordingly, a horizontal position of positioning component 802 may be displaced to the left edge of the display device 804 to be stowed. In an embodiment, the u-bracket can include notches through which a cord is woven. For example, the cord passes through a first notch on a back portion of the u-bracket, which directs the cord over a top portion of the u-bracket and through a second notch on a front portion of the u-bracket. Because the cord, in its current position (e.g., passively hanging from its woven position with the u-bracket), is within a threshold zone around the stowing area (e.g., makes minimal overlap with the viewable area 805), the cord may remain hanging (from the positioning component 802) when stowed, that is, the cord does not need to be retracted upward and coiled, pulled downward, etc.

In an embodiment, the positioning component 802 in a stowed position remains securely in place on the display device 804 under tensioning. In an embodiment, the placement of positioning component 802 over the top edge of display device 804 is securely maintained through tensioning exerted on positioning component 802 by the coupled positioning component 802 and cord. Tensioning may be measured by the combined weights of the coupled positioning component 802 and cord, wherein the combined weights provide a threshold amount of force on the positioning component 802 over the edge of the display device 804. The threshold amount of force can be an amount force required to hold positioning component 802 in place as to prevent the positioning component 802 from slipping off the display device 804, for example, when display 804 is stationary, or is tilted backward, forward, etc. In an embodiment, an equal amount of force can be exerted on the front end of positioning component 802 (e.g., resulting from the weight of the cord hanging down from a front end of positioning component 802) as on the back end of positioning component 802 (e.g., resulting from the weight of the cord hanging down from a back end of positioning component 802), to securely maintain positioning component 802 in its position on top of display device 804. When the orientation of display device 804 is adjusted (e.g., tilted upward or downward, or turned side to side, etc.) while the camera positioning system is not in use, the tensioning on the back end and front end of the positioning component 802, combined with the weight of positioning component 802 directly over the top edge of display device 804, keeps positioning component 802 stable (e.g., prevents positioning component 802 from falling off display device 804) when in a stowed arrangement.

FIG. 8B illustrates another example 820 for stowing a camera positioning system in accordance with various embodiments. In the example, the positioning component 822 is a bracket attached to a spring-loaded retractor. The bracket and spring-loaded retractor allow for the cord to be raised or lowered vertically on the display device 804. In the example, the bracket may hang on top (e.g., in the middle along a top edge) and in front of the display device 804. The spring-loaded retractor may hang on top of and behind the display device 804. A cord is fed through the spring-loaded retractor, through a back end to a front end of the bracket, and hung down in front of display device. The spring-loaded retractor is operable to retract, roll, and stow excess cord length. When the spring-loaded retractor retracts the cord, the first end (e.g., front portion) of the cord is pulled up across display device 804, from the front end of the bracket through the back end of the bracket and into the spring-loaded retractor. That is, when fully retracted, the cord is substantially withdrawn from the viewable area. In an embodiment, a camera attached to the first end of the cord can limit the cord from being removed from the bracket portion when the cord is retracted. In another embodiment, a stopper affixed to a portion of the cord that is proximate to the camera may limit the cord from being removed from the bracket when the cord is retracted. In certain embodiments, the cord may be associated with a flexibility or pliability property. In the example, the cord is a flexible or semi-flexible material to allow for pulling and retraction of the cord and stowing of the cord as a rolled cord stored in the spring-loaded retractor.

In the example, a stowing area for the bracket and spring-loaded retractor may be located on the top middle portion of the bezel of display device 804. In another example, the stowing area can be located over any horizontal point along the top edge of display device 804. In yet another example, the stowing area may be located along a right or left edge of display device 804. In an embodiment, the bracket and spring-loaded retractor may be adjusted horizontally, for horizontal adjustment of the positions of the cord and camera to the right or left of the display device 804 and to be transported to a stowing area. For example, in the situation where the positioning component 822 is placed on a left portion of the top edge of display device 804 for use of the camera in a video communication, and where a stowing area is along the right portion of the top edge, the positioning component 822 may be disengaged from its in-use position (e.g., the left portion of the top edge) on the display device, and releasably re-engaged with the display device at its stowed position (e.g., right portion of top edge).

In an embodiment, a stowing arrangement may include placing positioning component 822 along a top edge of display device 804, for example in the middle of the top edge as shown. The stowing arrangement may also include retracting the cord from the front of display device 804 to the back of display device 804, the excess cord stored as a rolled cord within the housing of the spring-loaded retractor. In the example, the positioning component 822 may remain on the top edge above the viewable area (e.g., as opposed to being repositioned to the right or left edge, to the side of the viewable area), because when the cord is retracted, the attached camera (e.g., at the first end of the cord) will be lifted until it makes contact with (e.g., is stopped by) the front lip of the bracket, such that the camera is repositioned substantially above the viewable area (e.g., within the threshold zone of the stowing area).

In an embodiment, the positioning component 822 in a stowed position remains securely in place on the display device 804 under tensioning exerted by the combined weights of the positioning component 822 and cord onto the positioning component 822. For example, the distribution of the weight of the coupled bracket and spring-loaded retractor may correspond to a first weight of the spring-loaded retractor and a second end of the cord (e.g., wherein a portion of the cord is retracted and stored in the spring-loaded retractor) on the back end of the positioning component 822 and a second weight of the camera on a first end of the cord that has been retracted to the front end of positioning component 822. A balanced distribution of the weight of the bracket and spring-loaded retractor, combined with the weights of both ends of the cord on either end of the positioning component 822 provide a threshold amount of force on the positioning component 822 as to securely maintain the positioning component 822 in its stowed position on the display device 804.

FIG. 8C illustrates yet another example 840 for stowing a camera positioning system in accordance with various embodiments. In the example, the positioning component 842 is a magnet that is magnetically adhered to a cord, in a recess and key arrangement. For example, the magnet can be in one of the recess and the key, and a material to which the magnet is attracted can be in the other of the recess and the key, wherein the material is incorporated in at least a portion of the cord. The recess and key arrangement may further include interlocking connector elements. In another embodiment, magnet can be in a recess while the key includes a slidable attachment around the cord wherein the cord can slide up or down through the key, enabling the position of the camera (attached to the first end of the cord) to be vertically adjusted across the display device.

In an embodiment, the positioning component 842 can be releasably engaged with the display device 804 by a dock. For example, a dock may include at least a magnet, or a material to which the magnet is attracted, and is located on a portion of the display device 804 (e.g., a front surface of a top edge), wherein the back of positioning component 842 may be releasably attached to the dock. In the example, dock 844 can be a magnetic element, such as a magnetic dot or magnetic recess, and the like, attached to a middle of the top edge of display device 804. In another example, dock 844 can include a plurality of docks, such as a linear series of magnetic elements incorporated across a top edge of display device 804, to allow positioning component 842 to be releasably engaged (e.g., magnetically attached) with the display device 804 at any one of the plurality of docks at various horizontal positions, and to allow positioning component 842 to be repositioned horizontally at another one of the plurality of docks. In yet another example, the dock is a docking strip, such as a magnetic strip or a metal strip, wherein positioning component 842 may be magnetically attached to a first point on the docking strip and horizontally repositioned (e.g., by detaching and reattaching the positioning component 842 from the first point to the second point, or by sliding the positioning component 842 from the first point to the second point, and so forth) to a second point on the docking strip. In another embodiment, the positioning component 842 may be a repositionable adhesive material, to releasably attach the positioning component 842 to the display device 804. For example, the back of the positioning component 842 may include a repositionable adhesive material, suction cup, etc.

In the example, a stowing area may include a dock located on a top corner of the display device 804 (e.g., in a corner of the bezel). When the camera positioning system is in use (e.g., the camera is active in a video communication application through display device 804), positioning component 842 may be positioned at dock 844 (e.g., in-use position), such that the camera may be positioned in the middle of the viewable area 805 (e.g., to allow camera to establish eye-to-eye alignment between the video communication participants). To stow the camera positioning system (e.g., once the video communication has terminated), positioning component 842 can be removed from dock 844 and magnetically attached to another dock located in the stowing area (e.g., stowed position), such as a corner of the bezel (e.g., a top left corner, or a top right corner as shown in the example), allowing the cord and camera to hang in front of and parallel with the side bezel (e.g., right side edge) as to minimize obstruction of the viewable area 805 by the positioning component 842, cord, and camera. In another example, the stowing area can be located along any point along the side edge (e.g., the dock can be halfway down a right or left side of the bezel). In yet another example, the stowing area can include a plurality of planes along a side edge of display device 804, for example, wherein a dock is attached to a top side of the top edge in a corner, such that the cord bends over the top side of the top edge and along the front side of a side bezel.

In another embodiment, a storage element (not shown) is hingedly dependent from the top edge or bottom edge of the back part of a positioning component. The storage element may be operable to stow the cord. For example, the storage element can include a storage compartment that can store at least a portion of the length of the cord. In certain embodiments, the entire cord and camera can be stored in the storage compartment. In another example, the storage element may be a hook or clamp that the cord be wrapped around, allowing for the shortening of the length of the cord. In another example, the storage element may be a wrap, bundler, loop and hook fastener, etc. that can be used to shorten a length of the cord. For example, the cord may be folded upon itself or otherwise wrapped such the length of the cord is shortened. The storage element (e.g., a wrap) can wrap the shortened cord such that a length of the cord does not change. The storage element in various embodiments may be used to secure the cord to the storage element, such that the camera and camera cord is no longer positioning in front of the display screen.

Figure 9A:
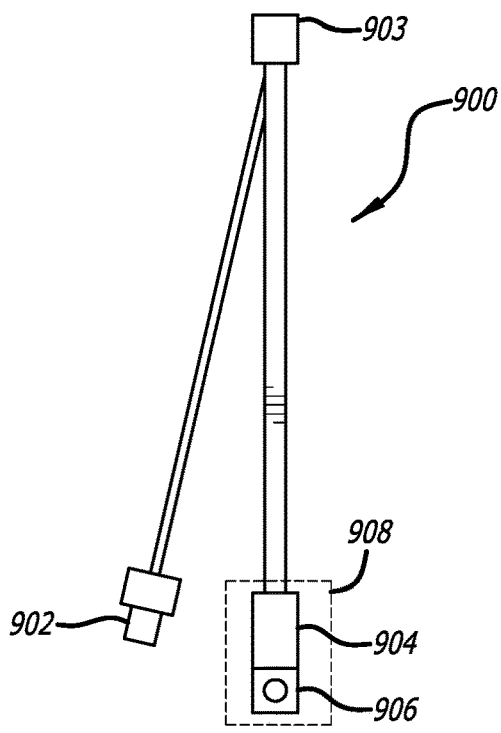
FIGS. 9A, 9B, and 9C illustrate example arrangements of components of a camera positioning system in accordance with various embodiments.

FIG. 9A illustrates an example arrangement 900 of components of a camera positioning system in accordance with various embodiments. It should be noted that any number of other arrangements of the components of the camera positioning system known in the art can be used in accordance with embodiments described herein and the arrangements illustrated are merely for illustrative purposes. In the example, positioning component 903 is coupled to a cord. The positioning component 900 can provide releasable engagement with a portion of a component (e.g., a display screen, also referred to as a display device) coupled to computing device and configured to direct a first end of the cord to an operative region of the display screen (e.g., in front of the display screen) and the second end of the cord to one of the computing device or the component (e.g., behind the display screen). In this example, the first end of the cord can include an image capture device 908, wherein the image capture device 908 includes image processor 904 and image sensor 906 (also referred to as a camera). In an embodiment, image processor 904 is coupled to image sensor 906. Image sensor 906 can include a lens to capture the gaze of a first user looking at an eye contact target (e.g., eyes of an onscreen image of a second user in a video communication) displayed on the display screen. Image processor 904 can process image data of the user facing the display screen and communicating through the video communication, for example, image processor 904 processes and transmits to the second user (e.g., via a video communication application) image data of the first user communicating and establishing eye contact with the second user.

In an embodiment, at least one of the cord or image capture device 908 may maintain a rotational stability of the image capture device 908, that is, maintain the image capture device 908 in a stable position over the display screen to allow for, for example, continuous eye-to-eye alignment between users participating in a video communication. A stable position, for example, includes the situation where movement of the image capture device 908 is within a threshold amount of movement. This can include, for example, decreasing or preventing inadvertent movement of image capture device 908 with respect to the display screen or other support surface, such as preventing the cord from twisting or spinning freely (e.g., about a vertical axis) and thereby preventing image capture device 908 from inadvertently changing its rotational orientation (e.g., prevents image sensor 906 from rotating its focus away from a user facing the display screen). In another example, a stable position can include the situation where the cord does not bend or bow once hanging or extending (e.g., substantially perpendicular to a top perimeter of a display screen) from a top portion of the display screen. For example, the cord in various embodiments can be manufactured from one of a plurality of different materials such that the cord is substantially flat and/or substantially inflexible (e.g., rigid) as to maintain its position, and the position of the image capture device 908, against the display screen. For example, a flatness or a rigidity of the cord can prevent the cord from bending, which accordingly, prevents the image capture device 908 from inadvertently rotating (e.g., diverting focus of the lens of image sensor 906 away from the gaze of the user facing the display screen as to break eye contact with the other user in the video communication). In yet another example, the housing of image capture device 908 may be associated with at least one or more features, such as a flatness feature or a textural feature, among others, as to maintain the image capture device 908 within a threshold amount of movement with respect to the display screen. For example, the housing of the image capture device 908 may have substantially flat edges (e.g., the back of image sensor 906 and image processor 904 may be substantially flat) as to stably maintain the position (e.g., rotational position) of the image capture device 908 against the display screen. In another example, a portion (e.g., back side) of the housing of image capture device 908 may be made of skid resistant material, such as rubber or silicon, as to restrict movement of the image capture deice 908 with respect to the display screen.

In another embodiment, cord may include an adjustable swivel at its first end proximate to the image capture device 908, to allow for controlled adjustments to the rotational position of the image capture device 908, for example, to allow image sensor 906 to capture image data from various orientations that collectively amount to a 180-degree field of view of the display screen. For example, an adjustable swivel may be an adjustable friction swivel, a swivel with click stops, and so forth. The adjustable swivel allows image capture device 908 to be rotated at predefined angles about a vertical axis and maintaining (e.g., by temporarily locking the image capture device 908 in its rotational position through a frictional assist, click stop, etc.), while preventing instability of the image capture device 908 (e.g., preventing image capture device 908 from spinning freely about a vertical axis).

In the example, the second end of the cord can include a connector component, such as a video display connector 902, wherein the video display connector 902 can be releasably engaged with the display device. The video display connector 902 may include a USB port, parallel port, HDMI, Ethernet, or any other way of passing image data between a cable and computing device. When the video display connector 902 is engaged with the computing device, the video display connector 902 allows for power to be transmitted from a computing device through the cord to image capture device 908, and as well as image and/or audio data to be transmitted between the image capture device 908 with the computing device. In accordance with an embodiment, video display connector 902 can be a wireless transmitter that can receive data (e.g., image data or audio data) captured by the image sensor 906 and can transmit the data to a computer or other appropriate processing component (e.g., display screen).

Figure 9B:
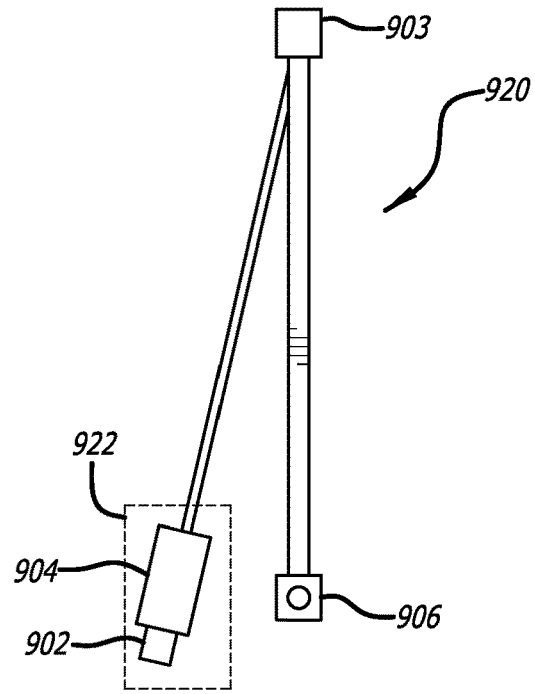

Although the components are arranged such that the image processor 904 and image sensor 906 are coupled as a single unit (e.g., as an image capture device 908) attached to a first end of the cord (e.g., displaced in front of the display screen) and a video display connector 902 attached to a second end of the cord (e.g., displaced behind the display screen), the components may be disposed with respect to the cord in other arrangements. Referring now to FIG. 9B, the illustration shows another example arrangement 920 of components of a camera positioning system in accordance with various embodiments. In this example, the first end of the cord can include an image sensor 906, while the second end of the cord can include an image processor 904 and video display connector 902, wherein the image processor 904 and video display connector 902 are coupled as a single unit 922. In an embodiment, a flatness property and/or inflexibility property of the cord may, or a flatness or textural property of the image sensor 906 (e.g., back of the housing of image sensor 906 is flat or includes skid resistant material), or a combination thereof, may restrict the cord from a threshold amount of movement as to maintain the rotational stability of the image sensor 906. In another embodiment, the cord may include an adjustable swivel (e.g., adjustable friction swivel, a swivel with click stops, etc.) at its first end proximate to the image sensor 906, to allow for controlled adjustments to the rotational position of the image sensor 906. That is, the swivel allows the image sensor 906 to rotate and capture image data from various orientations that collectively amount to a 180-degree field of view of the display screen.

In the example, the second end of the cord can include the single unit 922, wherein the single unit 922 includes image processor 904 coupled to video display connector 902. The single unit 922 can be releasably engaged with the display device. As described above, the video display connector 902 portion of the single unit 922 may include a USB port, parallel port, HDMI, Ethernet, or any other way of passing image data between a cable and computing device. When the video display connector 902 is engaged with the computing device, the video display connector 902 allows for power to be transmitted from a computing device through the cord to image capture device 908, and as well as image and/or audio data to be transmitted between the image capture device 908 with the computing device.

Figure 9C:
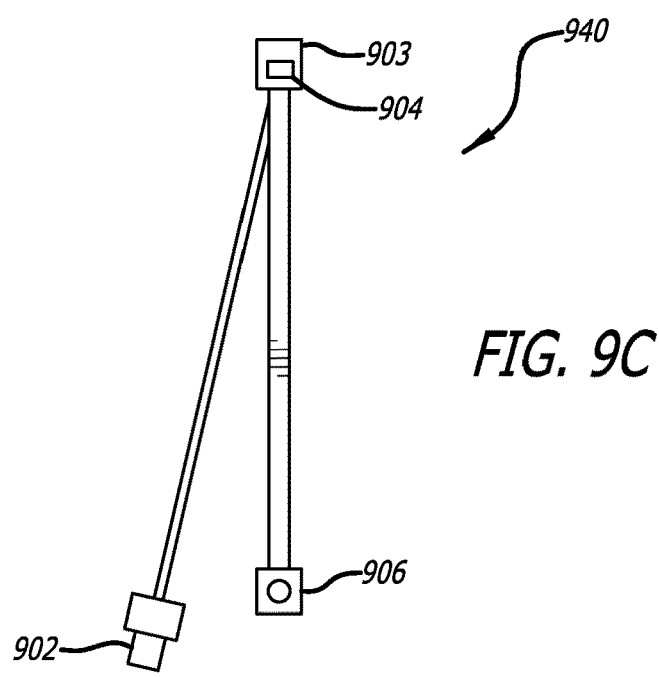

FIG. 9C illustrates yet another example arrangement 940 of components of a camera positioning system in accordance with various embodiments. In this example, the first end of the cord can include an image sensor 906 (e.g., to be displaced in front of display screen and to collect image data, such as the gaze of the user facing the display screen), while the second end of the cord can include a video display connector 902 (e.g., for releasable engagement with the display screen and transmitting image data between the cord and display screen). In an embodiment, the image processor 904 is coupled with the positioning component 903. Accordingly, the weight of the positioning component 903 may include the weight of the image processor 904. In this example, the tensioning on positioning component 903 may result from the combined weights of the positioning component 903, the image processor 904, and the cord, wherein the combined weights are exerted on the positioning component 903 as to secure the positioning component 903 in its position on the display screen.

Figure 10:
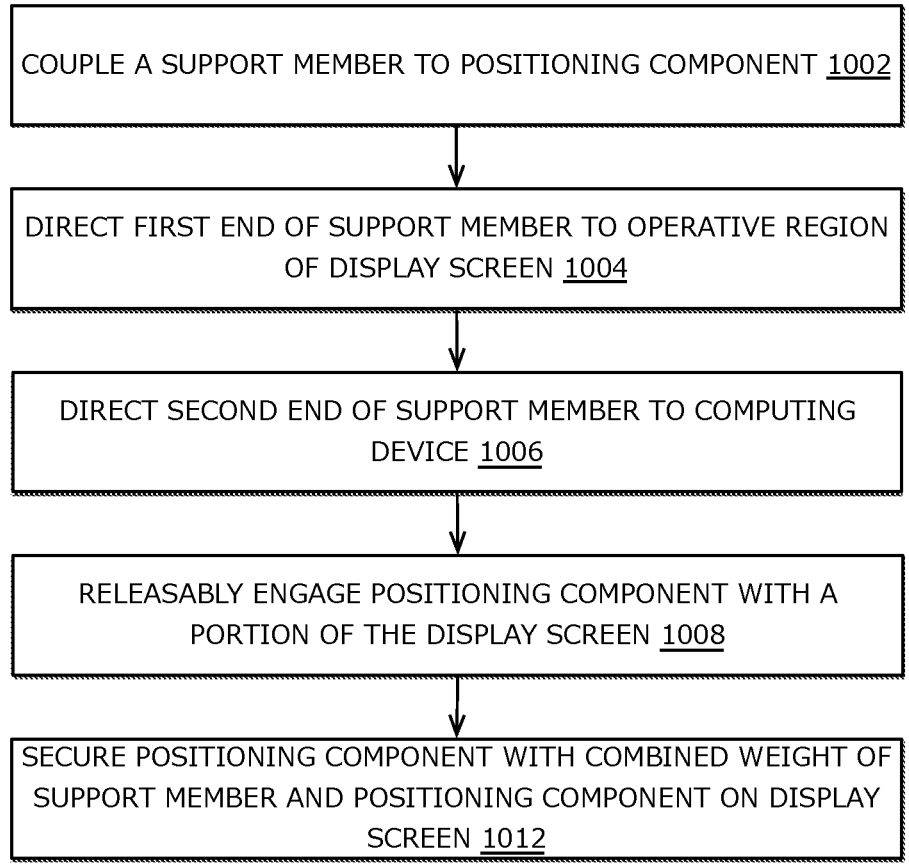
FIG. 10 illustrates an example process for utilizing a camera positioning system in accordance with various embodiments.

FIG. 10 illustrates an example process 1000 for utilizing a camera positioning system in accordance with various embodiments. In the example, the camera positioning system can include a camera, a flexible support member (also referred to as a cord) operable to transmit at least one of power or data between the camera and a computing device, the flexible support member having a body portion, wherein a first end of the body portion includes the camera and a second end of the body portion includes connector components (e.g., video display connector) providing for releasable engagement between the flexible support member and one of the computing device or a component coupled to the computing device; and a positioning component providing releasable engagement with a portion of a display device (also referred to as a display screen), for example, on a top edge of the display device, and operable to direct the second end of the flexible support member to one of the computing device or the component and the first end of the flexible support member to an operative region of the display device to, for example, facilitate eye-to-eye alignment between users in a video communication.

In an embodiment, the positioning component of the camera positioning system is a bracket clip. In this example, the flexible support member is coupled 1002 to the positioning component. The flexible support member may be securely coupled to positioning component by one of a plurality of coupling means, such as a frictional assist, adhesive assist, magnetic assist, among others. The flexible support member may also be coupled with the positioning component by one of a plurality of coupling techniques, the coupling techniques corresponding with a frame structure of the positioning component, wherein the positioning component can take the shape of any one of a number of components (e.g., frame structures), such as a clip, a magnetic bracket, clamp, and so forth. For example, in an embodiment, positioning component is a bracket clip seated on top of the display device, wherein the flexible support member may be passed through from a back end of a horizontal beam (also referred to as a horizontal base) of the bracket clip through a front end of the horizontal beam. The first end of the flexible support member may be a rigid cord, or a flexible cord encased in a hollow rigid structure that is attached to the positioning component. In another embodiment, the flexible support member may be substantially flat, as to maintain its position against the display device.

In another embodiment, positioning component may be a u-bracket, wherein the u-bracket includes at least one notch. The flexible support member passes through a first notch on a back portion of the positioning component, which directs the flexible support member over a top portion of the positioning component and through a second notch on a front portion of positioning component. The flexible support member may be securely coupled at the two notches by a coupling means, such as a frictional assist, etc.

In yet another embodiment, positioning component may be a notched bracket, wherein the notched bracket includes a horizontal beam (also referred to as a horizontal base), with a series of notches along a length of the horizontal beam. The positioning component can include a vertical rigid hollow structure attached to the front of the horizontal beam, wherein the bottom end of the vertical rigid hollow structure is attached to a camera housing. In the example, the flexible support member is coupled with the positioning component by threading the flexible support member from a top front end of the horizontal beam and down through the vertical rigid hollow structure 456, wherein the flexible support member is also coupled to the camera. In an embodiment, the flexible support member may be a flexible cord that is encased in or partially encased in the vertical rigid hollow structure.

In other embodiments, the positioning component is a bracket attached to a spring-loaded retractor, wherein a front portion of the bracket may hang on top and in front of the display device while the spring-loaded retractor may hang on top of and behind the display device. The flexible support member can be fed through the spring-loaded retractor, from a back end to a front end of the bracket, and hung down in front of display device. The spring-loaded retractor is operable to retract, roll, and stow excess length of the flexible support member. The flexible support member may be associated with a flexibility or pliability property, for example, the flexible support member may be made of a flexible or semi-flexible material to allow for pulling and retraction of the flexible support member and stowing of the flexible support member as a rolled cord stored in the spring-loaded retractor.

In another example, the positioning component and flexible support member may be coupled with connector elements. The connecting elements can form, for example, a recess and a key arrangement between the flexible support member and the positioning component. A magnet can be positioned in one of the recess and the key and a material to which the magnet is attracted in the other of the recess and the key, thereby magnetically coupling the positioning component and flexible support member. In another example, the connecting elements can form a recess and a key arrangement between the flexible support member and the positioning component, wherein the recess and the key arrangement can include interlocking elements and at least one element can be configured to release the interlocking elements.

According to certain embodiments, the process directs 1004 a first end of the flexible support member to an operative region of the display device, wherein the first end is attached to a camera. In an example, the camera (e.g., of a first participant in a video communication) is directed to a viewable area (e.g., an operative region of a display screen, for example, where image content can appear) of the display device and aligned with an eye contact target (e.g., the onscreen eyes of a second participant) presented on a display device. With the camera placed near an eye contact target (e.g., the eyes of the onscreen image of the second participant), the first participant and the second participant can simultaneously look at each other's face. The camera can be directed away (e.g., stowed) from the display device when not in use. The camera can be maintained in a stable position over the operative region of the display device. For example, the flexible support member attached to the camera may be associated with a flexibility or pliability property or flatness property. For example, the flexible support member may be rigid or may be encased in a rigid hollow structure, or be substantially flat, as to prevent the flexible support member from inadvertent movement (e.g., bending or bowing), thereby maintaining camera in a stable position (e.g., preventing inadvertent movement of the camera, such as rotating or swinging) over the operative region.

In another example, the flexible support member may be adjusted vertically across the display device to redirect (e.g., adjust) the vertical position of the camera relative to the operative region. For example, the position of the camera over the operative region of the display device can be raised or lowered by pulling, retracting, passing, etc. the flexible support member up or down, respectively, across the operative region. In yet another example, the positioning component may be adjusted horizontally across the display device to adjust the horizontal position of the camera relative to the operative region. For example, the positioning component may be disengaged from its current position on the display device, and releasably re-engaged with the display device at a new position (e.g., a positioning component positioned on a top edge of the display device is moved to the left or right along the display device edge).

In certain embodiments, the process directs 1006 a second end of the flexible support member to one of a computing device or a component coupled to the computing device, for example, the display device. A connecting component, such as video display connector, may be attached to the second end to the flexible support member. For example, where a positioning component is positioned on a top edge of the display device, the video display connector may be directed to an area behind the display device. The video display connector may provide for releasable engagement between the flexible support member (and further, the camera coupled to the first end of the flexible support member) and one of the computing device or a component coupled to the computing device. The video display connector connects the flexible support member with the display device, wherein the flexible support member allows for power to be transmitted from display device to the camera, as well as image and/or audio data to be transmitted between the camera and display device. The video display connector may include a USB port, parallel port, HDMI, Ethernet, or any other way of passing image data between a cable and computing device. In another embodiment, video display connector can be a wireless transmitter that can receive data (e.g., image data or audio data) captured by the camera and can transmit the data to a computer or other appropriate processing component (e.g., display device).

In an embodiment, the positioning component is releasably engaged 1008 with a portion of the display screen. In the situation where the positioning component is a bracket clip, the bracket clip can include a hinge and clip operable to grip an edge of the display device (e.g., a top edge of the display device). The hinge may be held in a closed position (e.g., under a rotary force) by a spring, such as a torsional spring (for example, a spiral wound torsion spring). That is, when the bracket clip is disengaged from the display device, the clip can clamp shut against the horizontal beam of the bracket clip under the torque of the spring in the hinge. Pulling the clip back (e.g., resisting the torque of the spring) will open the bracket clip to be releasably engaged with (e.g., clip onto) the display device. In the situation where the positioning component is a u-bracket, which is operable to mount to a display device, for example, by fitting the jaws of the u-bracket over the top edge of the display device. In the situation where the positioning component is a notched bracket, the notched bracket may be positioned on a top edge of the display device, wherein the flexible support member is passed through one of the plurality of notches such that the edge of the display device is fitted between the vertical rigid hollow structure and the flexible support member. In the situation where the positioning component is a bracket attached to a spring-loaded retractor, the bracket may hang on top and in front of the display device while the spring-loaded retractor may hang on top of and behind the display device.

The positioning component may be associated with a brace flexibility score. A brace flexibility score can quantify a level of flexibility of the brace opening (e.g., mouth or jaw) of a positioning component to accommodate different display screens of varying thickness, with respect to a baseline or reference brace flexibility score. For example, a low brace flexibility score can indicate that the jaws of a positioning component are fixed (e.g., can only fit onto a display screen edge of a specific maximum thickness because the jaws cannot open or close beyond its default state). A high brace flexibility score can indicate that the jaws can be expanded, flexibly opened, stretched, unfolded, etc., for example, jaws that can passively be fitted onto a display screen edge of a specific thickness and can also be stretched open wider to be fitted onto a thicker display screen edge. The brace flexibility score may correspond to a flexibility or pliability property of a material of the positioning component. For example, a positioning component manufactured from a flexible plastic may have a high brace flexibility score, for example, the jaws of a u-bracket can be stretched wider to accommodate a thicker display screen. In another example, the mouth of a notched bracket can be expanded by passing the flexible support member through a notch closer to the backend of the horizontal beam of the notched bracket. In another example, a positioning component manufactured from a stiff metal may have a low brace flexibility score, for example, the jaws of the u-bracket cannot be stretched and can only be passively fitted onto a display screen edge of a limited range of thickness. In another example, a notched bracket with a number of notches below a threshold amount of notched may only be able to accommodate a restricted range of display device edge thicknesses, and may have a low brace flexibility score.

The positioning component may also be associated with a brace force score. A brace force score can quantify a maximum level of force that can be applied by the positioning component onto the display device. That is, the brace force score can quantify the pressure exerted by the positioning component when gripping a display screen with respect to a baseline or reference brace force score (e.g., a passive grip exerted by stiff or unmovable jaws). For example, a low brace force score can indicate that the positioning component has a weak or passive grip over the display screen edge, or may require additional support to secure the positioning component over the display device edge. A high brace force score can indicate that the positioning component exerts at least a threshold level of force in gripping the display device edge. In an example, a positioning component with a brace force score within a predetermined range may include padding (e.g., silicon pads, rubber pads, and the like) attached to its jaws to prevent damage to the display screen when mounted. In the situation where positioning component is composed of a highly flexible material, such as a highly bendable metal or plastic, it may have a low brace force and would have a gentler grip on the display device edge. Contrastingly, in a situation where positioning component is composed of a semi-flexible material, such as a dense yet slightly flexible wood or plastic, it may have a higher brace force and would have a tighter grip on the display device edge, particularly when jaws of positioning component are stretched wider to accommodate a thicker display device edge.

A positioning component may further be associated with a mount width threshold. A mount width threshold represents the maximum width of a display device edge that the positioning component can accommodate. For example, a u-bracket that is composed of a flexible material may be stretched wider to fit over a thicker display device edge and would have a higher mount width threshold than a u-bracket of a same size and shape but composed of an inflexible material. In another example, a notched bracket that has notches along a long horizontal beam may allow for a flexible support member to pass through a notch such that the space between the notch and the vertical rigid hollow structure can fit over a thicker display device edge, and therefore have a higher mount width threshold.

A positioning component may also be associated with a mount depth threshold, which represents the maximum depth of a display screen edge that the positioning component can accommodate (e.g., how much of the edge is covered by positioning component). In an example, a higher mount depth threshold may indicate that the jaws of positioning component when mounted on display screen, envelops a deeper portion of the display screen edge than would a positioning component with a lower mount depth threshold. However, a mount depth threshold that is too high may exceed a bezel width of a display screen (or other computing device or component coupled to a computing device), for example, a positioning component with a high mount depth may have jaws (or mouth, edge, lip, etc.), when mounted onto a display screen, that grip the display device beyond the bezel and obstruct a portion of a viewable area (e.g., an area of a display screen where image content can appear) of the display device.

In certain embodiments, the position of the positioning component on the display device is secured 1012 by tensioning, wherein a combined weight of a first weight of the flexible support member and a second weight of the positioning component is exerted on the positioning component. Tensioning may be measured by the combined weights of the coupled positioning component and flexible support member, wherein the combined weights provide a threshold amount of force on the positioning component over an edge (e.g., top edge) of the display device. The threshold amount of force can be an amount force required to hold positioning component in place as to prevent the positioning component from slipping off the display device (e.g., when display is stationary, or is tilted backward, forward, etc.). In an embodiment, a positioning component may be associated with a tensioning ratio. A tensioning ratio can quantify the relative weights exerted by a first end of a flexible support member, a second end of the flexible support member, and the positioning component, wherein the combined weights as exerted on the positioning component securely maintains the position of the positioning component on top of the display device. That is, the tensioning ratio may include a ratio (e.g., distribution) of a first weight (e.g., first end of the flexible support member), a second weight (e.g., second end of the flexible support member), and a third weight (e.g., positioning component). The tensioning ratio quantifies the distribution of weight in a coupled positioning component and flexible support member that is needed to provide a threshold amount of force over the positioning component as to securely maintain the position of the positioning component on the display device. In an example, a tensioning ratio can identify an optimal balance of tensioning on the coupled positioning component and flexible support member, or the center of gravity of the coupled positioning component and flexible support member, so that the combined weights of the positioning component and flexible support member prevent or substantially restrict the positioning component from leaning or falling forward or backward off the display device. In an embodiment, the first weight (e.g., of the first end of the flexible support member) may include a weight of the camera attached to the first end. In another embodiment, supplemental weights (e.g., additional segments attached to the flexible support member, weighted materials, etc.) may be added to or removed from to at least one of the first end of the flexible support member, second end of the flexible support member, or positioning component to achieve the tensioning ratio required for the positioning component.

Figure 11:
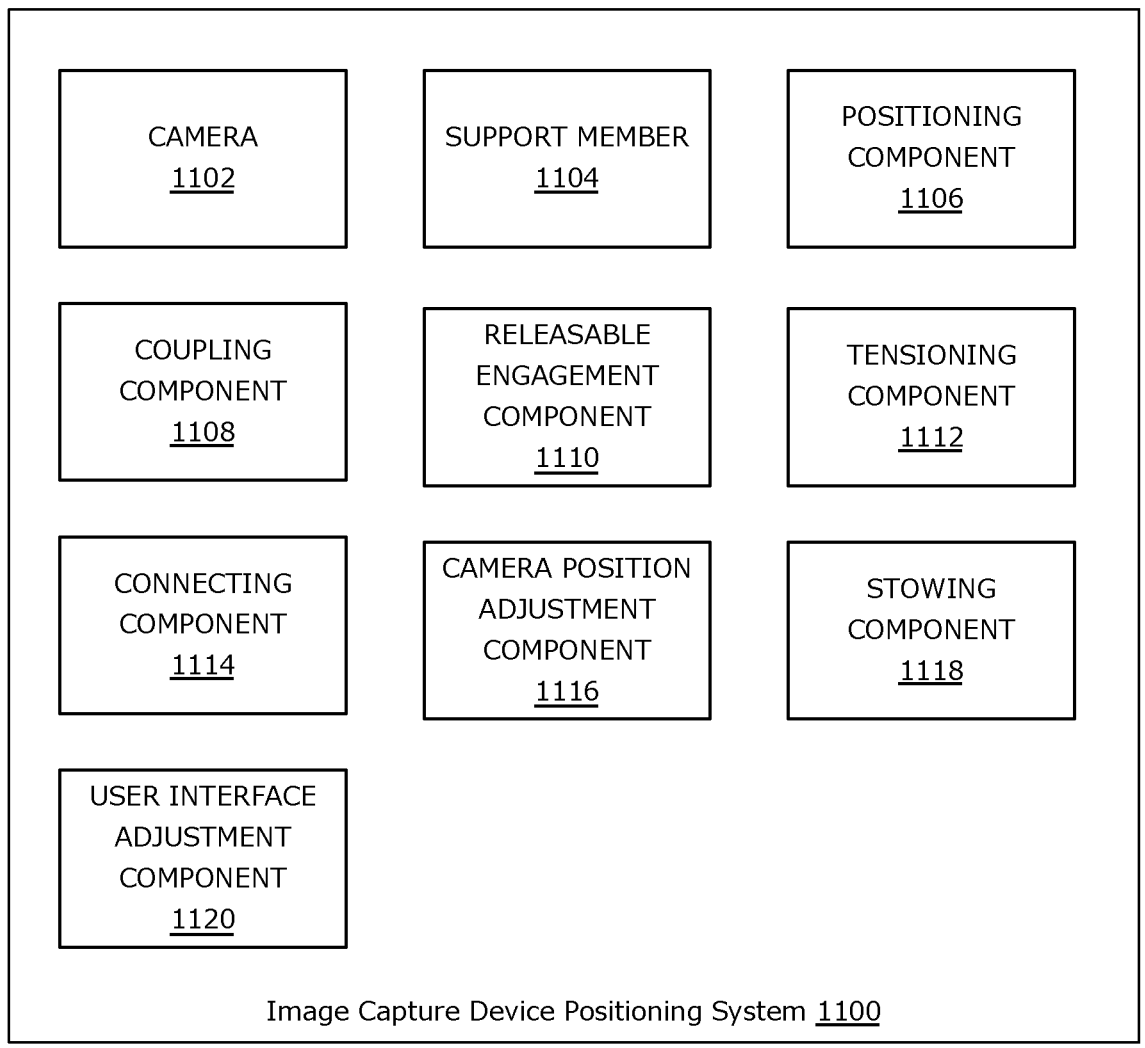
FIG. 11 illustrates example components of a camera positioning system in accordance with various embodiments.

FIG. 11 illustrates example components of an image capture device positioning system 1100, for example, a camera positioning system, in accordance with various embodiments. In the example, the image capture device positioning system 1100 includes a camera 1102, flexible support member 1104, positioning component 1106, coupling component 1108, releasable engagement component, tensioning component 1112, connecting component 1114, camera position adjustment component 1116, stowing component 1118, and user interface adjustment component 1120. In an embodiment, the flexible support member 1104 (also referred to as a cord) can have a body portion, wherein a first end of the body portion includes the camera and a second end of the body portion includes connector components providing for releasable engagement between the flexible support member and one of the computing device or a component coupled to the computing device. A positioning component coupled to the flexible support member provides releasable engagement with a portion of a display device (also referred to as a display screen) and is operable to direct the second end of the flexible support member to one of the computing device or the component and the first end of the flexible support member to an operative region of the display device to, for example, facilitate eye-to-eye alignment between users in a video communication.

According to an embodiment, camera 1102 is operable to capture a gaze of a first user (e.g., a local user) in a video communication looking at an eye contact target (e.g., eyes of an onscreen image of a second user, such as a remote user, in the video communication) displayed on the display device. Camera 1102 may be an image sensor which includes a lens. When the first user looks at the eye contact target, the gaze of the first user naturally falls within the field of view of the lens, resulting in the onscreen image of the first user (e.g., as presented on the display device of the second user) to appear to be gazing directly forward toward the second user (e.g., as opposed to downward, to the side, etc.), therefore establishing eye-to-eye alignment. In the example, the camera 1102 may include an image processor to process image data of the user facing the display device and communicating through the video communication. For example, the image processor can process and transmit to the second user (e.g., through a video communication application) image data of the first user communicating and establishing eye contact with the second user. In another embodiment, camera 1102 may include an adapter ring, for example, to swap the lens from camera 1102 with a different lens, such as when a different field of view is desired (e.g., increase or decrease number of degrees of visual angle that can be covered by a lens) or other effects are desired from different lens types (e.g., wide angle lens, specialty lens such as fisheye lens, etc.). In certain embodiments, the adapter ring can also adjust focus or magnification of the lens, for example, to sharpen or magnify the image of the user facing display screen.

In accordance with an embodiment, flexible support member 1104 is operable to couple to camera 1102. Flexible support member 1104 may also be operable to maintain a stable position of camera 1102, such as a rotational stability. For example, flexible support member 1104 can be associated with a number of properties, including, for example, a flexibility or pliability property, a stiffness property, a firmness property, an extensibility property, a size or thinness property, and so forth. For example, flexible support member 1104 may be a rigid cord. In another example, flexible support member 1104 may be a flexible cord that is encased in or partially encased in a hollow rigid tube. In yet another example, flexible support member 1104 may include a plurality of cord segments, wherein one or more cord segments can be flexible. In this example, one or more flexible cord segments can be coupled with camera 1102 on an end opposite the end of the flexible support member 1104 that includes connecting elements that provide for releasable engagement between the camera and a computing device (or a component coupled to the computing device). The flexible cord segment(s) can be adjusted to vary the position of camera 1102. For example, the flexible cord or cord segment(s) can be adjusted to change a location of the camera 1102 from a first location to a second location. For example, one or more cord segments may be associated with a rigidity score, which quantifies a level of flexibility of an entire cord, a cord segment, or a combination of cord segments. The rigidity score can measure how rigid the flexible support member 1104 or a cord segment is with respect to a baseline or reference rigidity score. For example, a flexible support member with a high rigidity score can indicate that the flexible support member or cord segment(s) is not flexible. Thus, a higher threshold level of adjustment force is needed to bend, shape, or adjust the flexible support member or cord segment(s). In various embodiments, the rigidity score can be set to support a weight of the cord (or at least an appropriate portion of the cord) and camera 1102 such that once the flexible support member or cord segment is adjusted, the cord or cord segment maintains position until manually readjusted (e.g., in the situation where a user readjusts the flexible support member or cord segment). That is, the flexible support member or cord segment(s) is formed of a plastic, wood, metal, composite, or laminated material sufficiently rigid for supporting camera 1102. Additionally, the flexible support member 1104 can be sized and shaped to sufficiently balance the weight of camera 1102 and flexible support member 1104 to prevent instability of camera 1102. Accordingly, the flexible support member 1104 and cord segment(s) can be associated with a rigidity score that enables a stable position of the camera 1102 once the flexible support member 1104 is adjusted. A stable position, for example, includes the situation where camera movement is within a threshold amount of movement. This can include, for example, decreasing or preventing inadvertent movement of camera 1102 with respect to the display screen or other support surface, such as preventing the cord from twisting or spinning freely (e.g., about a vertical axis) and thereby preventing camera 1102 from inadvertently changing its rotational orientation, that is, preventing the lens from rotating its focus away from the user facing the display device. In another example, a stable position can include the situation where the flexible support member 1104 does not bend or bow once hanging or extending (e.g., substantially perpendicular to a top perimeter of a display device) from a top portion of a computing device monitor. In accordance with various embodiments, the flexible support member 1104 and/or cord segments can be manufactured from one of a plurality of different materials to allow for a plurality of rigidity scores. In yet another example, the housing of the camera may have substantially flat edges (e.g., the back of camera and/or image processor may be substantially flat) as to stably maintain the position (e.g., rotational position) of the camera 1102 against the display device.

In another embodiment, flexible support member 1104 is operable to couple with a connecting component (e.g., a video display connector that is releasably engaged with one of the computing device or a component coupled to the computing device), for transmitting at least one of a power or data between the camera 1102 and a computing device.

Positioning component 1106 is operable to couple to flexible support member 1104, releasably engage with a display device (e.g., an edge, such as a top edge, of the display device), and to direct a first end of the flexible support member 1104 (e.g., wherein the first end is attached to camera 1102) to an operative region of the display device. In some embodiments, the positioning component is a bracket, the bracket operable to hang from a top portion of the display screen. In certain embodiments, the positioning component 1106 includes a bracket clip, wherein the clip is a spring-loaded hinge and the bracket clip is operable to releasably grip an edge of the display device. A flexible support member 1104 may be passed through a back end of a horizontal base (also referred to as a horizontal beam) of the bracket clip, through a front end of the horizontal base. A first end of the flexible support member 1104 can be attached to a camera and can hang over in front of the display device from the front end of the horizontal base. The first end of the flexible support member 1104 may be a rigid cord, or a flexible cord encased in a hollow rigid structure. In another embodiment, the positioning component 1106 is a u-bracket that includes at least one notch through which the flexible support member passes, wherein the flexible support member passes through a first notch on a back portion of the positioning component which directs the flexible support member over a top portion of the positioning component and through a second notch on a front portion of the positioning component, the flexible support member passing through the notches providing a threshold amount of force on the positioning component to maintain a secure position on the display screen. In yet another embodiment, positioning component 1106 is a notched bracket, the notched bracket including a horizontal beam with a series of notches along a length of the horizontal beam and a vertical rigid hollow structure attached to the front of the horizontal beam, wherein the bottom end of the vertical rigid hollow structure is attached to a camera. The series of notches may correspond with a size of an edge of a display device. For example, a first end of the flexible support member 1104 is encased in the vertical rigid hollow structure while a second end is passed through one of the series of notches that corresponds to the size of the display device edge. When the notched bracket is positioned over a top edge of a display device, the display device is fitted between the vertical rigid hollow structure and the flexible support member 1104 passing through the notch matching the thickness of the display device edge. In yet another embodiment, positioning component 1106 can be a bracket attached to a spring-loaded retractor, a front portion of the bracket hanging on top and in front of the display device, and the spring-loaded retractor hanging on top of and behind the display device, wherein the flexible support member 1104 can be fed through the spring-loaded retractor, from a back end to a front end of the bracket, and hung down in front of display device.

In some embodiments, the positioning component 1106 is a magnet, wherein the magnet is magnetically adhered to the flexible support member 1104 in a recess and key arrangement. That is, the magnet can be in one of the recess and the key, and a material to which the magnet is attracted can be in the other of the recess and the key. In some embodiments, positioning component 1106 is a clip operable to couple the flexible support member 1104 to the display device, the clip configured to couple to a portion of the display screen. In another embodiment, the positioning component 1106 is a double hook operable to hook onto the display screen, and wherein the double hook includes a gap through with the flexible support member 1104 passes, and wherein the flexible support member 1104 passes through the gap to facilitate positioning of the camera at the operative region of the display screen. In certain embodiments, the system further includes a raised ridge extending upwardly near a top edge of the display screen, the raised ridge being releasably coupled to the display screen, wherein the positioning component 1106 includes one of a front flange hook or a back-flange hook extending transversely near a top edge, and wherein one of the front flange hook or the back-flange hook engages the raised ridge to support the positioning component 1106.

In another embodiment, positioning component 1106 includes a socket longitudinally defined through a top portion of the positioning component 1106, wherein a pin extends from a slider affixed to the flexible support member 1104, and wherein the pin is inserted into the socket to support the flexible support member 1104 from the positioning component 1106. In some embodiments, the pin further includes a rod-shaped element having at least one bend to locate the pin parallel to a longitudinal direction of the positioning component 1106 and displaced to one side of the positioning component 1106.

The positioning component 1106 may be associated with a brace flexibility score, the brace flexibility score quantifying a level of flexibility of the brace opening (e.g., mouth or jaw, other edge that fit over a display device edge, etc.) of a positioning component 1106 to accommodate different display devices of varying thickness, with respect to a baseline or reference brace flexibility score. For example, a low brace flexibility score can indicate that the opening of a positioning component is fixed (e.g., can only fit onto a display screen edge of a specific maximum thickness because the opening cannot open or close beyond its default state). A high brace flexibility score can indicate that the opening can be expanded, flexibly opened, stretched, unfolded, etc., for example, jaws or opening edges that can passively be fitted onto a display device edge of a specific thickness and can also be stretched open wider to be fitted onto a thicker display device edge. The brace flexibility score may correspond to a flexibility or pliability property of a material of the positioning component 1106. For example, a positioning component 1106 manufactured from a flexible plastic may have a high brace flexibility score, for example, the jaws of a u-bracket can be stretched wider to accommodate a thicker display screen. In another example, the mouth of a notched bracket can be expanded by passing the flexible support member 1104 through a notch closer to the backend of the horizontal beam of the notched bracket. In yet another example, a positioning component 1106 manufactured from a stiff metal may have a low brace flexibility score, for example, the jaws of the u-bracket cannot be stretched and can only be passively fitted onto a display screen edge of a limited range of thickness. As another example, a notched bracket with a number of notches below a threshold amount of notched may only be able to accommodate a restricted range of display device edge thicknesses, and may have a low brace flexibility score.

The positioning component 1106 may also be associated with a brace force score, the brace force score quantifying a maximum level of force that can be applied by the positioning component 1106 onto the display device. That is, the brace force score can quantify the pressure exerted by the positioning component 1106 when gripping a display device with respect to a baseline or reference brace force score (e.g., a passive grip exerted by stiff or unmovable jaws). For example, a low brace force score can indicate that the positioning component 1106 has a weak or passive grip over the display screen edge, or may require additional support to secure the positioning component over the display device edge. A high brace force score can indicate that the positioning component 1106 exerts at least a threshold level of force in gripping the display device edge. In an example, a positioning component with a brace force score within a predetermined range may include padding (e.g., silicon pads, rubber pads, and the like) attached to its opening (e.g., jaws) to prevent damage to the display device when mounted. In the situation where positioning component 1106 is composed of a highly flexible material, such as a highly bendable metal or plastic, it may have a low brace force and would have a gentler grip on the display device edge. Contrastingly, in a situation where positioning component 1106 is composed of a semi-flexible material, such as a dense yet slightly flexible wood or plastic, it may have a higher brace force and would have a tighter grip on the display device edge, particularly when the mouth of positioning component 1106 is stretched wider to accommodate a thicker display device edge.

Positioning component 1106 may further be associated with a mount width threshold, the mount width threshold representing the maximum width of a display device edge that the positioning component can accommodate. For example, a u-bracket that is composed of a flexible material may be stretched wider to fit over a thicker display device edge and would have a higher mount width threshold than a u-bracket of a same size and shape but composed of an inflexible material. In another example, a notched bracket that has notches along a long horizontal beam may allow for a flexible support member to pass through a notch such that the space between the notch and the vertical rigid hollow structure can fit over a thicker display device edge, and therefore have a higher mount width threshold.

Positioning component 1106 may also be associated with a mount depth threshold, which represents the maximum depth of a display device edge that the positioning component 1106 can accommodate (e.g., how much of the edge is covered by positioning component). In an example, a higher mount depth threshold may indicate that the jaws of positioning component 1106, when mounted on an edge of a display device, envelops a deeper portion of the display device edge than would a positioning component with a lower mount depth threshold. However, a mount depth threshold that is too high may exceed a bezel width of a display device (or other computing device or component coupled to a computing device), for example, a positioning component with a high mount depth may have jaws (or mouth, edge, lip, etc.), when mounted onto a display device, that grip the display device beyond the bezel and obstruct a portion of a viewable area (e.g., an area of a display screen where image content can appear) of the display device.

Coupling component 1108 is operable to couple the flexible support member 1104 with the positioning component 1106. flexible support member 1104 may be coupled with positioning component 1106 by one of a plurality of coupling means, such as a frictional assist, adhesive assist, magnetic assist, among others. Positioning component 1106 may also be coupled with the flexible support member 1104 by one of a plurality of coupling techniques, the coupling techniques corresponding with a frame structure of the positioning component, wherein the positioning component can take the shape of any one of a number of components (e.g., frame structures), such as a clip, a magnetic bracket, clamp, and so forth. For example, in the situation where positioning component is a bracket clip seated on top of the display device, the flexible support member 1104 may be passed through from a back end of a horizontal beam of the bracket clip and through a front end of the horizontal beam. The first end of the flexible support member 1104 may be a rigid cord, or a flexible cord encased in a hollow rigid structure that is attached to the positioning component. In another embodiment, the flexible support member 1104 may be substantially flat, as to maintain its position against the display device. In the situation where embodiment, positioning component 1106 may be a u-bracket, wherein the u-bracket includes at least one notch. The flexible support member 1104 may pass through a first notch on a back portion of positioning component 1106, which directs the flexible support member 1104 over a top portion of the positioning component and through a second notch on a front portion of positioning component 1106. The flexible support member 1104 may be securely coupled at the two notches by a coupling means, such as a frictional assist, etc. In yet another embodiment, positioning component 1106 may be a notched bracket, wherein the notched bracket includes a horizontal beam with a series of notches along a length of the horizontal beam. The positioning component 1106 can include a vertical rigid hollow structure attached to the front of the horizontal beam, wherein the bottom end of the vertical rigid hollow structure is attached to a camera. In the example, the flexible support member 1104 is coupled with the positioning component 1106 by threading the flexible support member 1104 from a top front end of the horizontal beam and down through the vertical rigid hollow structure, wherein the flexible support member 1104 is also coupled to the camera. In an embodiment, the flexible support member 1104 may be a flexible cord that is encased in or partially encased in the vertical rigid hollow structure.

In another embodiment, the positioning component 1106 can be a bracket attached to a spring-loaded retractor, a front portion of the bracket hanging on top and in front of the display device, and the spring-loaded retractor hanging on top of and behind the display device. The flexible support member 1104 can be fed through the spring-loaded retractor, from a back end to a front end of the bracket, and hung down in front of display device. The spring-loaded retractor is operable to retract, roll, and stow an excess length of the flexible support member 1104. In the example, the flexible support member 1104 may be associated with a flexibility or pliability property, for example, the flexible support member 1104 may be made of a flexible or semi-flexible material to allow for pulling and retraction of the flexible support member 1104 and stowing of the flexible support member as a rolled cord stored in the spring-loaded retractor.

In yet another embodiment, the positioning component 1106 and flexible support member 1104 may be coupled with connector elements. The connecting elements can form, for example, a recess and a key arrangement between the flexible support member and the positioning component. A magnet can be positioned in one of the recess and the key and a material to which the magnet is attracted in the other of the recess and the key, thereby magnetically coupling the positioning component and flexible support member. In another example, the connecting elements can form a recess and a key arrangement between the flexible support member and the positioning component, wherein the recess and the key arrangement can include interlocking elements and at least one element can be configured to release the interlocking elements.

Releasable engagement component 1110 is operable to releasably engage the positioning component 1106 with a display device (e.g., an edge, such as a top edge, of the display device). Additionally, releasable engagement component 1110 is operable to disengage the positioning component 1106 from the display device. For example, in the situation where positioning component 1106 is a bracket clip, releasable engagement component 1110 may disengage the positioning component 1106 from its current position on a display device, relocate the positioning component 1106 to the right or left of its current position along the top edge of the display device, and releasably re-engage the positioning component 1106 with the display device at its new position. In the example, the bracket clip includes a clip attached to the bracket by a hinge with a spring (e.g., a torsional spring, for example, a spiral wound torsion spring). The hinge may be held in a closed position (e.g., under a rotary force) by the spring, that is, when bracket clip is disengaged from the display device, the clip can clamp shut against a horizontal beam of the bracket clip under the torque of the spring in the hinge. Releasable engagement component 1110 may pull back the clip (e.g., resisting the torque of the spring) to release its grip on the top edge of the display device. When the bracket clip is relocated to the right or left of its previous position, the releasable engagement component 1110 may release the clip to allow the clip to spring forward to grip (e.g., releasably re-engage with) the edge of the display device at its new location. In another example (e.g., where positioning component 1106 is a u-bracket, a notched bracket, socket and pin, etc.), releasable engagement component 1110 may slide, roll, etc., the positioning component 1106 along the top edge of device to the right or left of its current position, such as to move the camera horizontally across the display device. In yet another embodiment, where the positioning component 1106 is a notched bracket, releasable engagement component 1110 may pass through a notch corresponding to the size of the display device edge, wherein the display device is fitted between the vertical rigid hollow structure and the (e.g., over a front portion of the display device) and a second end of the flexible support member 1104 (e.g., over a back portion of the display device), and wherein the combined weights of the flexible support member 1104 and the positioning component 1106 exert a threshold amount of force on the positioning component as to securely the position of the positioning component 1106 over the display device edge. Releasable engagement component 1110 may also may unwind the flexible support member 1104 from the notch to release (e.g., releasably disengage) the positioning component 1106 from the display device.

In another embodiment, in the situation where positioning component 1106 is a magnet, a magnetically-attracted strip, such as a magnetic strip or a metal strip, or a plurality of magnetic recesses (e.g., series of magnetic docks) may be incorporated across a top portion of the front surface of the display device. Releasable engagement component 1110 may magnetically attach the back of positioning component 1106 to a point along the magnetically-attracted strip or to one of the plurality of magnetic recesses. Releasable engagement component 1110 may also releasably disengage the positioning component 1106 from the display device by magnetically detaching the back of positioning component 1106 from the magnetically-attracted strip or the one of the plurality of magnetic recesses.

Tensioning component 1112 is operable to secure positioning component 1106 in its position on a display device through tensioning. In an example, tensioning component 1112 may combine a first weight of the flexible support member 1104 and a second weight of the positioning component 1106 into a combined weight, wherein the tensioning component 1112 exerts the combined weight onto the positioning component 1106 against the display device as to securely maintain the position of the positioning component 1106 on the display device (e.g., over an edge, such as a top edge, of the display device). The combined weight provides a threshold amount of force on the positioning component 1106 over the edge of the display device. The threshold amount of force can be an amount force required to hold positioning component in place as to prevent the positioning component 1106 from slipping off the display device (e.g., when display is stationary, or is tilted backward, forward, etc.). In an embodiment, tensioning component 1112 may be associated with a tensioning ratio. A tensioning ratio can quantify the relative weights exerted by a first end of a flexible support member 1104, a second end of the flexible support member 1104, and the positioning component 1106, wherein the combined weights as exerted on the positioning component 1106 securely maintains the position of the positioning component 1106 on top of the display device. That is, the tensioning ratio may include a ratio (e.g., distribution) of a first weight (e.g., first end of the flexible support member 1104), a second weight (e.g., second end of the flexible support member 1104), and a third weight (e.g., positioning component 1106). The tensioning ratio quantifies the distribution of weight in a coupled positioning component 1106 and flexible support member 1104 that is needed to provide a threshold amount of force over the positioning component 1106 as to securely maintain the position of the positioning component 1106 on the display device. In an example, a tensioning ratio can identify an optimal balance of tensioning on the coupled positioning component 1106 and flexible support member 1104, or the center of gravity of the coupled positioning component 1106 and flexible support member 1104, so that the combined weights of the positioning component 1106 and flexible support member 1104 prevent or substantially restrict the positioning component 1106 from leaning or falling forward or backward off the display device. In an embodiment, tensioning component 1112 may include a weight of the camera attached to a first end of the flexible support member 1104 in the first weight in the tensioning ratio. In another embodiment, tensioning component 1112 may add or remove supplemental weights (e.g., additional segments attached to the flexible support member 1104, weighted materials, etc.) to or from at least one of the first end of the flexible support member 1104, second end of the flexible support member 1104, or positioning component 1106 to achieve the tensioning ratio required for the securely maintaining the position of the positioning component 1106 on the display device.

Connecting component 1114 is operable to releasably engage with one of the computing device or a component coupled to the computing device, for example, for transmitting at least one of a power or data between the camera 1102 and a computing device (e.g., display device). In an example, connecting component 1114 may be a video display connector, wherein the video display connector is attached to a second end of the flexible support member 1104. When a positioning component 1106 is positioned on a top edge of the display device, the connecting component 1114 may be directed to an area behind the display device. In an embodiment, the connecting component 1114 connects the flexible support member with the display device, wherein the flexible support member allows for power to be transmitted from display device to the camera, as well as image and/or audio data to be transmitted between the camera and display device. The connecting component 1114 may include a USB port, parallel port, HDMI, Ethernet, or any other way of passing image data between a cable and computing device. In another embodiment, connecting component 1114 can be a wireless transmitter that can receive data (e.g., image data or audio data) captured by the camera and can transmit the data to a computer or other appropriate processing component (e.g., display device).

Camera position adjustment component 1116 is operable to adjust a position of the camera 1102 vertically, horizontally, radially, rotationally, or a combination thereof. For example, camera position adjustment component 1116 may adjust the position of the camera to maintain the camera within a particular range (e.g., distance on the display device) of the eye contact target. That is, the position of the camera 1102 may be adjusted to continuously capture a user's gaze at the display device, for example, if the user moves his gaze to follow an eye contact target (e.g., the eyes of the onscreen image of the other participant in the video communication) that has moved to a different location on the display device. In an example, camera position adjustment component 1116 may reposition the camera 1102 horizontally by moving the positioning component 1106 horizontally across the top edge of the display device (e.g., wherein the positioning component 1106 is coupled to the flexible support member 1104 and a first end of the flexible support member 1104 is attached to camera 1102). For example, camera position adjustment component 1116 may disengage positioning component 1106 from its current position on the display device, relocate the positioning component 1106 to the right or left of its current position along the top edge of the display device, and releasably re-engaged (e.g., clamp, tighten screw vice, etc.) positioning component 1106 with the display device at its new position. For example, in the situation where positioning component 1106 is a bracket clip (or spring clamp, vice clamp, and the like), camera position adjustment component 1116 may open the jaws of bracket clip to release its grip on the top edge of the display device. When the bracket clip is relocated to the right or left of its previous position, camera position adjustment component 1116 may releasably re-engage the jaws of the bracket (e.g., allow the jaws to grip) with the edge of the display device at its new location. In another example, camera position adjustment component 1116 may slide, roll, etc. positioning component 1106 along the top edge of the display device to the right or left of its current position (e.g., in the situation where positioning component 1106 is a u-bracket, a magnet that is attached to a horizontal magnetic strip across the top front edge of the display device, and the like).

In certain embodiments, camera position adjustment component 1116 may reposition the camera 1102 vertically, by vertically adjusting the flexible support member 1104. For example, camera position adjustment component 1116 may raise or lower the position of camera 1102 over the display device by adjusting a length of a first end (e.g., front end) of the flexible support member 1104, such as by pulling, retracting, etc., the flexible support member 1104 up or down, respectively (e.g., by passing the flexible support member 1104 through the positioning component to the back or front of display device, respectively). For example, if a second user in the video communication raises her seat, her onscreen image will move higher in the video conference application window, causing her eyes (e.g., the eye contact target) to move to a higher position on the display device than the camera 1102. To maintain eye-to-eye alignment when the first user moves his gaze upward and over camera 1102 to look at the eye contact target at its new location, camera position adjustment component 1116 may move camera 1102 upward to maintain the camera 1102 within the target range of the eye contact target, such that the gaze of first user continues to be within the field of view of camera 1102. Camera position adjustment component 1116 may also lower or relocate camera 1102 to the left or right along the display device to follow the eye contact target if the eye contact target shifts onscreen.

In another embodiment, the camera position adjustment component 1116 may radially adjust the position of camera 1102 (e.g., radially articulate camera 1102 about a portion of the flexible support member 1104). In an example, the first end of cord flexible support member 1104 may include a plurality of cord segments, wherein a cord segment can correspond to different sections of the flexible support member 1104. A cord segment (e.g., along the first end of flexible support member 1104 proximate to the camera 1102) may be coupled with camera 1102. In certain embodiments, camera 1102 can be part of the cord segment. The cord segments can be associated with one or more features. For example, camera position adjustment component 1116 may be a hinge along a cord segment, the hinge operable to pivot (e.g., bend) with respect to adjacent cord segments. The hinge allows a cord segment hanging below the hinge (e.g., a cord segment between the hinge and camera 1102) to pivot about the hinge (e.g., about a horizontal axis that is orthogonal to the front plane of the display device). The camera position adjustment component 1116 can radially articulate the position of camera 1102 about the hinge. For example, camera position adjustment component 1116 can swing camera 1102 by the cord segment (e.g., about an axis through the hinge and transverse to the face of the display device) radially across the face of the display device.

In yet another embodiment, the camera position adjustment component 1116 may rotate the orientation of camera 1102 about a vertical axis. For example, camera position adjustment component 1116 may be an adjustable swivel incorporated into the flexible support member (e.g., at its first end proximate to the camera 1102), to allow for controlled adjustments to the rotational position (e.g., orientation) of the camera 1102, for example, to allow camera 1102 to capture image data from various orientations that can collectively amount to a 180-degree field of view of the display device. For example, the adjustable swivel may be an adjustable friction swivel, a swivel with click stops, and the like. The adjustable swivel allows camera 1102 to be rotated at predefined angles about a vertical axis and maintaining (e.g., by temporarily locking the camera 1102 in its rotational position through a frictional assist, click stop, etc.), while preventing instability of the camera 1102 (e.g., preventing camera 1102 from spinning freely about a vertical axis).

User interface adjustment component 1120 is operable to make adjustments, such as positional adjustments, size adjustments, and so forth, to the video conference application window in relation to the position of camera 1102. That is, user interface adjustment component 1120 may automatically position the onscreen image of the second user (e.g., as displayed on the display device in the video communication) proximate to the lens of camera 1102, such that the camera 1102 is within a target range of the eye contact target (e.g., the eyes of the onscreen image of the second user). The target range can be measured as a threshold distance, such as a maximum distance or optimal distance (e.g., for optimal lens focus), a camera can be placed from the eye contact target in order to capture the gaze of the local user (e.g., the first user looking at the eye contact target) and establish eye-to-eye contact between the users in the video communication. For example, if camera 1102 is in a fixed position, a preferred position, or the like, user interface adjustment component 1120 may adjust a location of the video conference application window on the display device, a size of the video conference application window as displayed on the display device, or a combination thereof, to align the eye contact target with the camera 1102. For example, if camera 1102 is positioned over the center of the display device, but the video conference application window is positioned away from the camera 1102, such as in a corner of the display device, user interface adjustment component 1120 may relocate the video conference application window toward the center of the display device until the eye contact target that is within the video conference application window is aligned (e.g., within target range) of camera 1102. When relocating the video conference application window along the display device, user interface adjustment component 1120 may move the video conference application window at a smooth rate, rather than a rapid or instantaneous jump. For example, the relocation of the video conference application window from a first location to a second location on the display device may involve a period acceleration leaving the first location, followed by a period of smooth movement toward the second location, followed by deceleration to and arrival at the second location.

In another example, if the camera 1102 and video conference application window are both positioned in the center of the display device, but the video conference application window is too small such that the eye contact target is out of target range from the camera 1102 (e.g., the eye contact target covers a small region on the display device and is positioned proximate to but not directly behind camera 1102), user interface adjustment component 1120 may enlarge the size of the video conference application window as displayed on the display device, such that the eye contact target is large enough to be within the target range of the camera 1102. That is, the eye contact target has been magnified such that the region it originally covered on the display device has been expanded, and the magnified eye contact target is now directly behind the camera 1102.

Image sensors and facial recognition software can be used to locate the onscreen image of the second user on the display device relative to the location of the camera 1102 to determine whether the video conference application window needs to be adjusted (e.g., moved, enlarged, reduced, tilted, etc.). For example, image sensors may be placed behind the screen surface of the display device or a portion thereof, that detect which regions of the display device are actively projecting pixels that belong to the onscreen image of the second user. User interface adjustment component 1120 compares the location of camera 1102 (with respect to the display device) with the region of the display device where the onscreen image of the second user is located, and moves or resizes the video conference application window to align the onscreen image of the second user with the camera 1102. In another embodiment, image sensors may be attached to the back of camera 1102 to determine whether the onscreen image of the second user, or the eye contact target, are currently directly located behind the camera 1102 by confirming, for example, whether a particular combination of pixels, a signature code, etc., are present on the region of the display device directly behind camera 1102. When the sensors or facial recognition software detect that the eye contact target is away from the camera 1102, user interface adjustment component 1120 may automatically move, resize, etc., the video conference application window such that the eye contact target is aligned with (e.g., positioned directly behind) the camera 1102.

FIG. 12 illustrates an example set of basic components of an electronic computing device. In various embodiments, computer system 800 may be used to implement any of the systems, devices, or methods described herein. In some embodiments, computer system 1200 may correspond to any of the various devices described herein, including, but not limited, to mobile devices, tablet computing devices, wearable devices, personal or laptop computers, vehicle-based computing devices, or other devices or systems described herein.

As shown in FIG. 12, computer system 1200 can include various subsystems connected by a bus 1202. The subsystems may include an I/O device subsystem 1204, a display device subsystem 1206, and a storage subsystem 1210 including one or more computer-readable storage media 1208. The subsystems may also include a memory subsystem 1212, a communication subsystem 1220, and a processing subsystem 1222.

In system 1200, bus 1202 facilitates communication between the various subsystems. Although a single bus 1202 is shown, alternative bus configurations may also be used. Bus 1202 may include any bus or other components to facilitate such communication as is known to one of ordinary skill in the art. Examples of such bus systems may include a local bus, parallel bus, serial bus, bus network, and/or multiple bus systems coordinated by a bus controller. Bus 1202 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1204 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1204 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1200 may include a display device subsystem 1206. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1206 may include a controller and/or interface for controlling and/or communicating with an external display, such as any of the above-mentioned display technologies.

As shown in FIG. 12, system 1200 may include storage subsystem 1210 including various computer-readable storage media 1208, such as hard disk drives, solid-state drives (including RAM-based and/or flash-based SSDs), or other storage devices. In various embodiments, computer-readable storage media 1208 can be configured to store software, including programs, code, or other instructions, that is executable by a processor to provide the functionality described herein.

In some embodiments, storage system 1210 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1210 can include a media reader, card reader, or other storage interfaces to communicate with one or more external and/or removable storage devices. In various embodiments, computer-readable storage media 1208 can include any appropriate storage medium or combination of storage media. For example, computer-readable storage media 1208 can include, but is not limited to, any one or more of random-access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 1212 can include various types of memory, including RAM, ROM, flash memory, or other memory. Memory 1212 can include SRAM (static RAM) or DRAM (dynamic RAM). In some embodiments, memory 1212 can include a BIOS (basic input/output system) or other firmware configured to manage initialization of various components during, e.g., startup. As shown in FIG. 12, memory 1212 can include applications 1214 and application data 1216. Applications 1214 may include programs, code, or other instructions, that can be executed by a processor. Applications 1214 can include various applications such as browser clients, campaign management applications, data management applications, and any other application. Application data 1216 can include any data produced and/or consumed by applications 1214. Memory 1212 can additionally include operating system 1218, such as macOS®, Windows®, Linux®, various UNIX® or UNIX- or Linux-based operating systems, or other operating systems.

System 1200 can also include a communication subsystem 1220 configured to facilitate communication between system 1200 and various external computer systems and/or networks (such as the Internet, a local area network (LAN), a wide area network (WAN), a mobile network, or any other network). Communication subsystem 1220 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 1220 can include hardware and/or software components to communicate with satellite-based or ground-based location services, such as GPS (global positioning system). In some embodiments, communication subsystem 1220 may include, or interface with, various hardware or software sensors. The sensors may be configured to provide continuous or and/or periodic data or data streams to a computer system through communication subsystem 1220.

As shown in FIG. 12, processing system 1222 can include one or more processors or other devices operable to control computing system 1200. Such processors can include single-core processors 1224, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 1222, such as processors 1224 and 1226, may be used independently or in combination depending on the application.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:

1. An image capture device positioning system, comprising:
    a camera;
    a support member having a body portion, wherein a first end of the body portion includes the camera and a second end of the body portion includes connecting elements providing for releasable engagement with one of a computing device or a component coupled to the computing device; and
    a positioning component including a pivoting mechanism and a stabilizing element, the positioning component operable to direct the second end of the support member to the one of the computing device or the component and the first end of the support member to a first region of a display screen, wherein the positioning component is operable to retain at least a portion of the support member without obscuring the display screen, wherein the stabilizing element is configured to maintain a position of the positioning component on the display screen, and
    wherein the pivoting mechanism is configured to enable a portion of the support member hanging below the pivoting mechanism to pivot about the pivoting mechanism,
    wherein the pivoting mechanism radially articulates a position of the camera across a face of the display screen to pivot the camera about an axis transverse to the display screen from the first region to at least a second region, the first region being different from the second region.

2. The image capture device positioning system of claim 1, wherein the pivoting mechanism includes at least one of an adjustable friction swivel component or a swivel component with click stops, the pivoting mechanism operable to swing the camera at predefined angles about the axis, and wherein the pivoting mechanism is configured to maintain the camera in a rotational position through at least one of a frictional assist or a click stop.

3. The image capture device positioning system of claim 1, wherein the pivoting mechanism comprises a telescopic arm, the telescopic arm comprising a plurality of segments, wherein segments of the telescopic arm maneuver within each other, facilitating extension of the telescopic arm.

4. The image capture device positioning system of claim 1, wherein the stabilizing element comprises a hinge mechanism and a ridge, the stabilizing element being coupled to the positioning component via the hinge mechanism, wherein a horizontal beam is operable to extend transversely near a top edge of the display screen from the positioning component, the horizontal beam comprising the ridge, and wherein one part of the stabilizing element rests against a back of the display screen and the ridge rests against a front of the display screen, balancing the positioning component.

5. The image capture device positioning system of claim 4, wherein the hinge mechanism comprises one of a spring-loaded hinge or a torsional spring hinge.

6. The image capture device positioning system of claim 1, wherein the camera is operable to releasably fix to a position on the display screen.

7. The image capture device positioning system of claim 1, wherein the camera includes one of a suction cup or an adhesive.

8. The image capture device positioning system of claim 1, wherein the support member includes a rigid structure encasing at least a portion of the body portion.

9. The image capture device positioning system of claim 1, wherein a length of the support member is adjustable.

10. The image capture device positioning system of claim 1, wherein the positioning component is operable to provide for horizontal adjustment of a position of the camera along the display screen.

11. The image capture device positioning system of claim 1, wherein the support member is operable to provide for vertical adjustment of a position of the camera along the display screen.

12. The image capture device positioning system of claim 1, wherein the support member is one of bendable to enable positioning of the camera within at least the first region of the display screen or includes at least one rigid portion, the at least one rigid portion configured to maintain the camera in a substantially planar position with respect to a viewing area of the display screen.

13. The image capture device positioning system of claim 1, further comprising:
a wireless transmitter to receive data captured by the camera and transmit the data, wherein the data includes one of image data or audio data.

14. The image capture device positioning system of claim 1, further comprising:
an adapter ring, the adapter ring operable to adjust one of a focus or a magnification of the camera.

15. The image capture device positioning system of claim 1, further comprising:
an adjustment component operable to adjust a position of the camera based on a user input.

16. The image capture device positioning system of claim 15, wherein the position of the camera is adjusted vertically, horizontally, and/or radially.

17. The image capture device positioning system of claim 1, further comprising:
a user interface adjustment component;
a computing device processor; and
a memory device including instructions that, when executed by the computing device processor, enables the image capture device positioning system to:
utilize the user interface adjustment component to adjust one of a location or a size of an onscreen image of a video communication participant based on a user input.

18. The image capture device positioning system of claim 1, further comprising:
an attachment interface for mechanically securing and electrically connecting interchangeable accessories.

19. An image capture alignment device, comprising:
a camera;
a support member having a body portion, wherein a first end of the body portion includes the camera and a second end of the body portion includes connecting elements providing for releasable engagement with one of a computing device or a component coupled to the computing device; and
a positioning component including a pivoting mechanism and a stabilizing element, the positioning component operable to direct the second end of the support member to the one of the computing device or the component and the first end of the support member to a first region of a display screen, wherein the positioning component is operable to retain at least a portion of the support member without obscuring the display screen,
wherein the stabilizing element is configured to maintain a position of the positioning component on the display screen, and
wherein the pivoting mechanism is configured to enable a portion of the support member hanging below the pivoting mechanism to pivot about the pivoting mechanism,
wherein the pivoting mechanism radially articulates a position of the camera across a face of the display screen to pivot the camera about an axis transverse to the display screen from the first region to at least a second region, the first region being different from the second region.

* * * * *